(12) United States Patent  
Fan et al.

(10) Patent No.: US 11,385,857 B2  
(45) Date of Patent: Jul. 12, 2022

(54) METHOD FOR DISPLAYING UI COMPONENT AND ELECTRONIC DEVICE

(71) Applicant: Huawei Technologies Co., Ltd., Shenzhen (CN)

(72) Inventors: Zhenhua Fan, Nanjing (CN); Yuan Cao, Nanjing (CN); Tianyu Shao, Nanjing (CN); Jing Zhang, Nanjing (CN); Youhui Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/436,541

(22) PCT Filed: Feb. 28, 2020

(86) PCT No.: PCT/CN2020/077130  
§ 371 (c)(1),  
(2) Date: Sep. 3, 2021

(87) PCT Pub. No.: WO2020/177622  
PCT Pub. Date: Sep. 10, 2020

(65) Prior Publication Data  
US 2022/0050656 A1  Feb. 17, 2022

(30) Foreign Application Priority Data  
Mar. 6, 2019 (CN) .......................... 201910169513.8

(51) Int. Cl.  
*G06F 3/0484* (2022.01)  
*G06F 3/14* (2006.01)

(52) U.S. Cl.  
CPC .......... *G06F 3/1454* (2013.01); *G06F 3/0484* (2013.01)

(58) Field of Classification Search  
None  
See application file for complete search history.

(56) References Cited

U.S. PATENT DOCUMENTS

| | | | |
|---|---|---|---|
| 8,560,976 B1 * | 10/2013 | Kim ................. | H04N 21/41265 715/708 |
| 2007/0229465 A1 * | 10/2007 | Sakai ..................... | H04B 1/202 345/173 |
| 2010/0219976 A1 * | 9/2010 | Park ....................... | G08C 17/02 340/12.54 |
| 2012/0089946 A1 * | 4/2012 | Fukui ............... | H04N 21/42204 715/822 |
| 2014/0181683 A1 | 6/2014 | Lim et al. | |

(Continued)

FOREIGN PATENT DOCUMENTS

| | | |
|---|---|---|
| CN | 102841790 A | 12/2012 |
| CN | 103513978 A | 1/2014 |

(Continued)

*Primary Examiner* — Rinna Yi  
(74) *Attorney, Agent, or Firm* — Leydig, Voit & Mayer, Ltd.

(57) ABSTRACT

In a method for displaying a user interface (UI) component of a source device on a destination device, at least one function control of a first application of the source device may be combined into a UI component, and the UI component is displayed on the destination device. In addition, an operation may be performed on the function control on the destination device, and an operation result may be transmitted to the source device for execution.

20 Claims, 43 Drawing Sheets

(56) References Cited

U.S. PATENT DOCUMENTS

| | | | |
|---|---|---|---|
| 2015/0082241 A1* | 3/2015 | Kang | ................. H04N 7/15 |
| | | | 715/803 |
| 2015/0346925 A1 | 12/2015 | Yang et al. | |
| 2016/0182603 A1 | 6/2016 | Chung et al. | |
| 2017/0155720 A1 | 6/2017 | Song et al. | |
| 2017/0242648 A1 | 8/2017 | Engel | |
| 2017/0280185 A1 | 9/2017 | Lee | |
| 2018/0070122 A1* | 3/2018 | Baek | ............. H04N 21/43637 |

FOREIGN PATENT DOCUMENTS

| | | |
|---|---|---|
| CN | 107071551 A | 8/2017 |
| CN | 107111470 A | 8/2017 |
| CN | 107423062 A | 12/2017 |
| CN | 108021310 A | 5/2018 |
| CN | 108268197 A | 7/2018 |
| CN | 108491131 A | 9/2018 |
| CN | 108829320 A | 11/2018 |
| CN | 110377250 A | 10/2019 |
| CN | 110389736 A | 10/2019 |

* cited by examiner

1300

Determine a first UI component, where the first UI component includes at least one function control of a first application of the source device
— 1301

Obtain configuration information of the first UI component, where the configuration information of the first UI component is used to indicate a manner of displaying the first UI component on the destination device
— 1302

Send the configuration information of the first UI component to the destination device, so that the destination device displays the first UI component based on the configuration information of the first UI component
— 1303

A destination device receives configuration information of a first UI component sent by a source device, where the configuration information of the first UI component is used to indicate a manner of displaying the first UI component on the destination device
— 1401

The destination device displays the first UI component based on the configuration information of the first UI component
— 1402

FIG. 14

METHOD FOR DISPLAYING UI COMPONENT AND ELECTRONIC DEVICE

CROSS-REFERENCE TO RELATED APPLICATIONS

This application is a national stage of International Application No. PCT/CN2020/077130, filed on Feb. 28, 2020, which claims priority to Chinese Patent Application No. 201910169513.8, filed on Mar. 6, 2019. Both of the aforementioned applications are incorporated herein by reference in their entireties.

TECHNICAL FIELD

This application relates to the field of electronic technologies, and in particular, to a method for displaying a user interface (UI) component of a source device on a destination device, a destination device, and a source device.

BACKGROUND

With popularization of intelligent terminal devices and development of communications technologies, there are more types of intelligent terminal devices, and a plurality of intelligent terminals may be interconnected to form a network, so that a capability and a service of one device can be used on another device for wide use. For example, a mobile phone device is interconnected to a vehicle-mounted device. With development of the internet of things (IoT), internet of everything (IoE) is a development trend in the future. The internet of everything implements free connection between a mobile phone, a watch, a tablet computer, a smart television, a personal computer, and a vehicle-mounted terminal.

When various intelligent terminal devices of a user are interconnected, a general scenario is that one intelligent terminal device uses a capability and a service of another intelligent terminal device. For example, when an intelligent terminal device A uses a capability of another intelligent terminal device B, the device A may be required to directly display an interface of the device B and perform an operation. However, in a specific use process, because a display screen size and a function of the device A are different from those of the device B, an interface of the device A is directly displayed on the device B. Consequently, a poor display effect is caused, and an operation of the device A cannot be performed on the device B.

SUMMARY

This application provides a method for displaying a UI component, a source device, and a destination device. In the method, a user interface and a service can be freely transmitted between a plurality of terminal devices; and a function control of an application is split and combined, and transmitted between the plurality of terminal devices, to adapt to a plurality of screen sizes of the terminals. This facilitates use and improves user experience.

According to a first aspect, a method for displaying a UI component of a source device on a destination device is provided. The method includes: The source device determines a first UI component. The first UI component includes at least one function control of a first application of the source device. The source device obtains configuration information of the first UI component. The configuration information of the first UI component is used to indicate a manner of displaying the first UI component on the destination device. The source device sends the configuration information of the first UI component to the destination device, so that the destination device displays the first UI component based on the configuration information of the first UI component.

According to the foregoing solution, a display mode of an inherent interface of an application may be changed in a process of displaying the UI component from the source device to the destination device. The inherent interface of the application is partially split, and transmitted between a plurality of terminal devices. In the method, a user can view functions of a plurality of applications on one interface, and the user is supported to perform operations on the plurality of applications at the same time. The user can perform an operation on an operation interface at a destination device end. An operation result is transmitted to the source device for execution, to ensure operation consistency between the source device and the destination device. In addition, the split interface can adapt to a plurality of display screen sizes of the terminal devices, to implement more perfect display and improve user experience.

For example, during housekeeping or cooking, it is inconvenient to use a mobile phone to change music that is being played or set a play mode, but can set to display some function controls of a music application of the mobile phone on an output device of a smartwatch. The user may tap a control such as Next on the output device of the smartwatch to change the song that is being played, or tap a Stop control to stop music playing. This greatly facilitates use of the user. Various possible application scenarios are not limited in this application.

With reference to the first aspect, in some implementations of the first aspect, that the source device determines a first UI component includes: The source device displays a first interface; detects a first operation of a user on the first interface; and the source device determines the first UI component in response to the first operation.

With reference to the first aspect and the foregoing implementations, in some implementations of the first aspect, the first interface includes at least one function control of the first application, and the first operation is an operation that the user selects the first UI component to be displayed on the first interface; or the first interface includes a UI component list of the first application, each UI component in the UI component list includes at least one function control of the first application, and the first operation is an operation that the user selects the first UI component in the UI component list.

With reference to the first aspect and the foregoing implementations, in some implementations of the first aspect, the configuration information of the first UI component includes first information. The first information is used to indicate display information of each of the at least one function control on the destination device, and the first information includes information about position coordinates, a display width, and a display height of each of the at least one function control on the destination device. That the source device sends the configuration information of the first UI component to the destination device includes: The source device sends the first information to the destination device.

With reference to the first aspect and the foregoing implementations, in some implementations of the first aspect, the configuration information of the first UI component further includes second information. The second information is used to indicate identifier information of each of the at least one function control.

With reference to the first aspect and the foregoing implementations, in some implementations of the first aspect, the method further includes: The source device receives operation information of a second operation sent by the destination device. The second operation is used to trigger a first function control in the first UI component displayed on the destination device. The operation information of the second operation includes second information of the first function control. The source device determines an identifier of the first function control based on the operation information of the second operation. The source device determines the first function control based on the identifier of the first function control. The source device executes a function corresponding to the first function control.

With reference to the first aspect and the foregoing implementations, in some implementations of the first aspect, the second operation is used to trigger the first function control in the first UI component to be displayed on the destination device in a first state. That the source device executes a function corresponding to the first function control includes: The first application of the source device executes, based on the operation information of the second operation and the first function control, a function corresponding to the first state of the first function control. The first function control is displayed in the first state.

According to a method for displaying a UI component provided in this application, a part of the original application interface of the source device may be split into different function controls or a combination of a plurality of function controls. The different function controls or the combination of the plurality of function controls are or is used to generate a new operation interface. The operation interface may be displayed on the another destination device. An operation is performed on any function control included in the operation interface of the destination device, and an operation result is transmitted to the source device for execution, to ensure operation consistency between the source device and the destination device. In the method, a user interface and a service can be freely transmitted between the plurality of terminal devices; a bottleneck between different devices is broken; and the original application interface is partially split, and transmitted between the plurality of terminal devices. The split interface can more easily adapt to the plurality of screen sizes of the terminals and achieve more perfect display. The new operation interface displayed at the destination device end may include function controls of a same application or function controls of different applications. This breaks a boundary between different applications, so that the user can view the functions of the plurality of applications on one interface, and perform the operations on the plurality of applications at the same time. Therefore, all operations are transmitted to an original application service of the source device. The user may control the application service on both the source device and the destination device at the same time. This facilitates use and improves user experience.

With reference to the first aspect and the foregoing implementations, in some implementations of the first aspect, the configuration information of the first UI component further includes third information. The third information is used to indicate information about a name and a function of each of the at least one function control.

With reference to the first aspect and the foregoing implementations, in some implementations of the first aspect, the configuration information of the first UI component further includes fourth information. The fourth information is information used to identify whether each function control in the first UI component supports displaying on the destination device. That the source device determines a first UI component further includes: The source device determines, based on the fourth information, that each function control in the first UI component supports displaying on the destination device.

According to a second aspect, a method for displaying a UI component of a source device on a destination device is provided. The method includes: The destination device receives configuration information of a first UI component sent by the source device. The configuration information of the first UI component is used to indicate a manner of displaying the first UI component on the destination device. The first UI component includes at least one function control of a first application of the source device. The destination device displays the first UI component based on the configuration information of the first UI component.

With reference to the second aspect, in some implementations of the second aspect, the configuration information of the first UI component includes first information. The first information includes information about position coordinates, a display width, and a display height of each of the at least one function control on the destination device. That the destination device receives configuration information of a first UI component sent by the source device includes: The destination device receives the first information sent by the source device.

With reference to the second aspect and the foregoing implementations, in some implementations of the second aspect, the configuration information of the first UI component further includes second information. The second information is used to indicate identifier information of each of the at least one function control.

With reference to the second aspect and the foregoing implementations, in some implementations of the second aspect, the method further includes: The destination device detects a second operation of a user. The second operation is used to trigger a first function control in the first UI component displayed on the destination device. The destination device determines an identifier of the first function control based on the second operation. The destination device sends operation information of the second operation to the source device. The operation information of the second operation includes the identifier of the first function control.

With reference to the second aspect and the foregoing implementations, in some implementations of the second aspect, the second operation is used to trigger the first function control in the first UI component to be displayed on the destination device in a first state. The operation information of the second operation is further used to indicate the first application of the source device to execute a function corresponding to the first state of the first function control. The first function control is displayed on the source device in the first state.

With reference to the second aspect and the foregoing implementations, in some implementations of the second aspect, the configuration information of the first UI component further includes third information. The third information is used to indicate information about a name and a function of each of the at least one function control.

With reference to the second aspect and the foregoing implementations, in some implementations of the second aspect, the configuration information of the first UI component further includes fourth information. The fourth information is information used to identify whether each function control in the first UI component supports displaying on the destination device. That the destination device displays the first UI component based on the configuration information of the first UI component further includes: The destination device displays, based on the fourth information, each function control in the first UI component that supports displaying on the destination device.

According to a third aspect, an electronic device is provided. The electronic device includes one or more processors, one or more memories, a plurality of applications, and one or more programs. The one or more programs are stored in the one or more memories. When the one or more programs are executed by the one or more processors, the electronic device is enabled to perform the following steps: determining a first UI component, where the first UI component includes at least one function control of a first application of the electronic device; obtaining configuration information of the first UI component, where the configuration information of the first UI component is used to indicate a manner of displaying the first UI component on a destination device; and sending the configuration information of the first UI component to the destination device, so that the destination device displays the first UI component based on the configuration information of the first UI component.

With reference to the third aspect, in some implementations of the first aspect, when the instructions are executed by the one or more processors, the electronic device is enabled to further perform the following steps: displaying a first interface; detecting a first operation of a user on the first interface; and determining the first UI component in response to the first operation.

With reference to the third aspect and the foregoing implementations, in some implementations of the first aspect, the first interface includes at least one function control of the first application, and the first operation is an operation that the user selects the first UI component to be displayed on the first interface; or the first interface includes a UI component list of the first application, each UI component in the UI component list includes at least one function control of the first application, and the first operation is an operation that the user selects the first UI component in the UI component list.

With reference to the third aspect and the foregoing implementations, in some implementations of the first aspect, the configuration information of the first UI component includes first information. The first information includes information about position coordinates, a display width, and a display height of each of the at least one function control on the destination device. When the instructions are executed by the one or more processors, the electronic device is enabled to further perform the following step: sending the first information to the destination device.

With reference to the third aspect and the foregoing implementations, in some implementations of the first aspect, the configuration information of the first UI component further includes second information. The second information is used to indicate identifier information of each of the at least one function control.

With reference to the third aspect and the foregoing implementations, in some implementations of the first aspect, when the instructions are executed by the one or more processors, the electronic device is enabled to further perform the following steps: receiving operation information of a second operation sent by the destination device, where the second operation is used to trigger a first function control in the first UI component displayed on the destination device, and the operation information of the second operation includes second information of the first function control; determining an identifier of the first function control based on the operation information of the second operation; determining the first function control based on the identifier of the first function control; and executing a function corresponding to the first function control.

With reference to the third aspect and the foregoing implementations, in some implementations of the first aspect, the second operation is used to trigger the first function control in the first UI component to be displayed on the destination device in a first state. When the instructions are executed by the one or more processors, the electronic device is enabled to further perform the following step: executing, by the first application based on the operation information of the second operation and the first function control, a function corresponding to the first state of the first function control, where the first function control is displayed in the first state.

With reference to the third aspect and the foregoing implementations, in some implementations of the first aspect, the configuration information of the first UI component further includes third information. The third information is used to indicate information about a name and a function of each of the at least one function control.

With reference to the third aspect and the foregoing implementations, in some implementations of the first aspect, the configuration information of the first UI component further includes fourth information. The fourth information is information used to identify whether each function control in the first UI component supports displaying on the destination device. When the instructions are executed by the one or more processors, the electronic device is enabled to further perform the following step: determining, based on the fourth information, each function control in the first UI component that supports displaying on the destination device.

According to a fourth aspect, an electronic device is provided. The electronic device includes one or more processors, one or more memories, a plurality of applications, and one or more programs. The one or more programs are stored in the one or more memories. When the one or more programs are executed by the one or more processors, the electronic device is enabled to perform the following steps: receiving configuration information of a first UI component sent by a source device, where the configuration information of the first UI component is used to indicate a manner of displaying the first UI component on the electronic device, and the first UI component includes at least one function control of a first application of the source device; and displaying the first UI component based on the configuration information of the first UI component.

With reference to the fourth aspect, in some implementations of the first aspect, the configuration information of the first UI component includes first information. The first information includes information about position coordinates, a display width, and a display height of each of the at least one function control on the electronic device. When the one or more programs are executed by the one or more processors, the electronic device is enabled to perform the following step: receiving the first information sent by the source device.

With reference to the fourth aspect and the foregoing implementations, in some implementations of the first aspect, the configuration information of the first UI component further includes second information. The second information is used to indicate identifier information of each of the at least one function control.

With reference to the fourth aspect and the foregoing implementations, in some implementations of the first aspect, when the one or more programs are executed by the one or more processors, the electronic device is enabled to perform the following steps: detecting a second operation of a user, where the second operation is used to trigger a first function control in the first UI component displayed on the electronic device; determining an identifier of the first function control based on the second operation; and sending operation information of the second operation to the source device, where the operation information of the second operation includes the identifier of the first function control.

With reference to the fourth aspect and the foregoing implementations, in some implementations of the first aspect, the second operation is used to trigger the first function control in the first UI component to be displayed on the electronic device in a first state. The operation information of the second operation is further used to indicate the first application of the source device to execute a function corresponding to the first state of the first function control. The first function control is displayed on the source device in the first state.

With reference to the fourth aspect and the foregoing implementations, in some implementations of the first aspect, the configuration information of the first UI component further includes third information. The third information is used to indicate information about a name and a function of each of the at least one function control.

With reference to the fourth aspect and the foregoing implementations, in some implementations of the first aspect, the configuration information of the first UI component further includes fourth information. The fourth information is information used to identify whether each function control in the first UI component supports displaying on the electronic device. When the one or more programs are executed by the one or more processors, the electronic device is enabled to perform the following step: displaying, based on the fourth information, each function control in the first UI component that supports displaying on the electronic device.

According to a fifth aspect, this application provides an apparatus. The apparatus is included in an electronic device, and the apparatus has a function of implementing behavior of the electronic device in the foregoing aspects and the possible implementations of the foregoing aspects. The function may be implemented by hardware, or may be implemented by hardware by executing corresponding software. The hardware or the software includes one or more modules or units corresponding to the foregoing function, for example, a receiving module or unit, a sending module or unit, a display module or unit, a detection module or unit, or a processing module or unit.

According to a sixth aspect, this application provides an electronic device, including a touchscreen. The touchscreen includes a touch-sensitive surface and a display, a camera, one or more processors, a memory, a plurality of applications, and one or more computer programs. The one or more computer programs are stored in the memory, and the one or more computer programs include instructions. When the instructions are executed by the electronic device, the electronic device is enabled to perform a method for displaying a UI component in any possible implementation of any one of the foregoing aspects.

According to a seventh aspect, this application provides an electronic device, including one or more processors and one or more memories. The one or more memories are coupled to the one or more processors. The one or more memories are configured to store computer program code. The computer program code includes computer instructions. When the one or more processors execute the computer instructions, the electronic device is enabled to perform a method for displaying a UI component in any possible implementation of any one of the foregoing aspects.

According to an eighth aspect, this application provides a computer storage medium, including computer instructions. When the computer instructions are run on an electronic device, the electronic device is enabled to perform a method for displaying a UI component in any possible implementation of any one of the foregoing aspects.

According to a ninth aspect, this application provides a computer program product. When the computer program product runs on an electronic device, the electronic device is enabled to perform a method for displaying a UI component in any possible implementation of any one of the foregoing aspects.

BRIEF DESCRIPTION OF DRAWINGS

FIG. 13 is a schematic flowchart of a method for displaying a UI component according to an embodiment of this application;

FIG. 14 is a schematic flowchart of another example of a method for displaying a UI component according to an embodiment of this application;

DESCRIPTION OF EMBODIMENTS

The following describes technical solutions in embodiments of this application with reference to the accompanying drawings. In descriptions of embodiments of this application, "I" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of embodiments of this application, "a plurality of" means two or more than two.

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of the embodiments, unless otherwise stated, "a plurality of" means two or more than two.

Embodiments of this application provide a method for displaying a UI component. The method may be applied to an electronic device, or an independent application. The application may display different interface components between a plurality of terminal devices. Specifically, in this method, a part of an original application interface of a source device may be split into different function controls or a combination of a plurality of function controls. The different function controls or the combination of the plurality of function controls are or is used to generate a new operation interface. The operation interface may be displayed on another destination device. An operation is performed on any function control included in the operation interface of the destination device, and an operation result is transmitted to the source device for execution, to ensure operation consistency between the source device and the destination device.

A method for rereading a word or a sentence in a video provided in embodiments of this application may be applied to an electronic device such as a mobile phone, a tablet computer, a wearable device, a vehicle-mounted device, an augmented reality (AR) device/a virtual reality (VR) device, a notebook computer, an ultra-mobile personal computer (UMPC), a netbook, or a personal digital assistant (PDA). A specific type of the electronic device is not limited in embodiments of this application.

Figure 1:
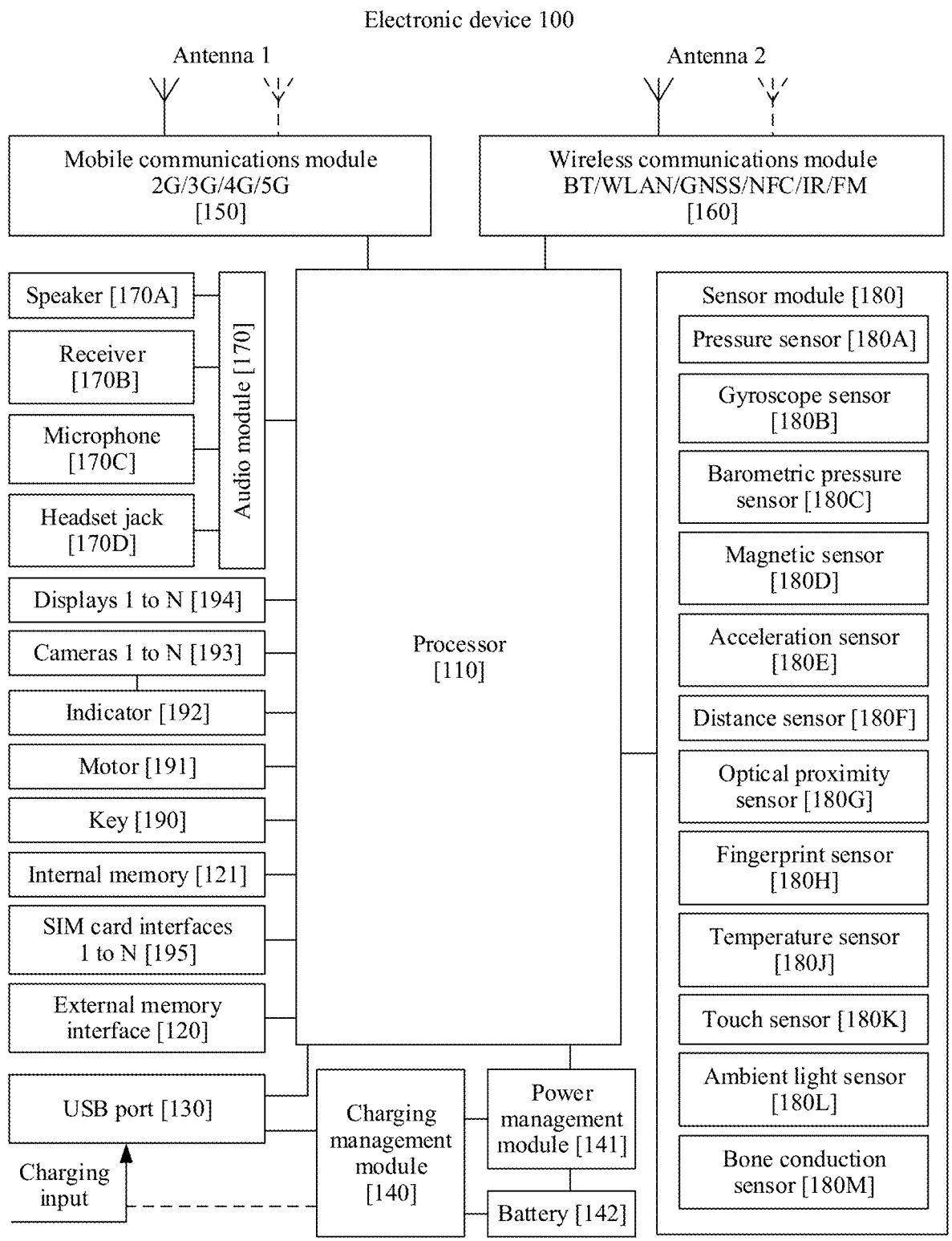
FIG. 1 is a schematic diagram of a hardware structure of an electronic device according to an embodiment of this application.

For example, FIG. 1 is a schematic diagram of a structure of an electronic device 100.

The electronic device 100 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent devices, or may be integrated into one or more processors.

The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, thereby improving system efficiency.

In some embodiments, the processor 110 may include one or more interfaces. The interface may include an integrated circuit (inter-integrated circuit, I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call by using the Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using the Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB port 130 is a port that conforms to a USB standard specification, and may be specifically a mini USB port, a micro USB port, a USB type-C port, or the like. The USB port 130 may be configured to connect to the charger to charge the electronic device 100, may be configured to transmit data between the electronic device 100 and a peripheral device, or may be configured to connect to a headset to play audio by using the headset. Alternatively, the port may be configured to connect to another electronic device, for example, an AR device.

It may be understood that an interface connection relationship between the modules that is shown in this embodiment of the present invention is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive charging input from the charger. The charger may be a wireless charger or a wired charger. In some embodiments of wired charging, the charging management module 140 may receive charging input from the wired charger through the USB port 130. In some embodiments of wireless charging, the charging management module 140 may receive wireless charging input through a wireless charging coil of the electronic device 100. The charging management module 140 may further supply power to the electronic device through the power management module 141 while charging the battery 142.

The power management module 141 is configured to connect the battery 142 and the charging management module 140 to the processor 110. The power management module 141 receives input of the battery 142 and/or input of the charging management module 140, and supplies power to the processor 110, the internal memory 121, the display 194, the camera 193, the wireless communications module 160, and the like. The power management module 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 100 may be configured to cover one or more communication bands. Different antennas may be further multiplexed, to increase antenna utilization. For example, the antenna 1 may be multiplexed as a diversity antenna in a wireless local area network. In other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communication solution that includes a wireless local area network (wireless local area networks, WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 100. The wireless communications module 160 may be one or more components integrated into at least one communications processor module. The wireless communications module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode or active-matrix organic light emitting diode (AMOLED), a flexible light-emitting diode (flex light-emitting diode, FLED), a Miniled, a MicroLed, a Micro-oLed, quantum dot light emitting diodes (QLED), or the like. In some embodiments, the electronic device 100 may include one or N displays 194, where N is a positive integer greater than 1.

The electronic device 100 can implement a photographing function by using the ISP, the camera 193, the video codec, the GPU, the display 194, the application processor, and the like.

The ISP is configured to process data fed back by the camera 193. For example, during shooting, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to compress or decompress a digital video. The electronic device 100 may support one or more video codecs. In this way, the electronic device 100 can play or record videos in a plurality of encoding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and a video are stored in the external memory card.

The internal memory 121 may be configured to store computer-executable program code. The executable program code includes instructions. The internal memory 121 may include a program storage area and a data storage area.

The program storage area may store an operating system, an application required by at least one function (for example, a sound playing function or an image playing function), and the like. The data storage area may store data (for example, audio data, and a phone book) created in a process of using the electronic device 100, and the like. In addition, the internal memory 121 may include a high-speed random access memory, and may further include a nonvolatile memory, for example, at least one magnetic disk storage device, a flash memory device, or a universal flash storage (UFS). The processor 110 runs the instructions stored in the internal memory 121 and/or the instructions stored in the memory disposed in the processor, to perform various function applications of the electronic device 100 and data processing.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into analog audio signal output, and is also configured to convert analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "horn", is configured to convert an electrical audio signal into a sound signal. The electronic device 100 may be configured to listen to music or answer a hands-free call by using the speaker 170A.

The receiver 170B, also referred to as an "earpiece", is configured to convert an electrical audio signal into a sound signal. When a call is answered or speech information is received by using the electronic device 100, the receiver 170B may be put close to a human ear to receive a speech.

The microphone 170C, also referred to as a "mike" or a "microphone", is configured to convert a sound signal into an electrical signal. When making a call or sending speech information, the user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to implement a noise reduction function, in addition to collecting a sound signal. In some other embodiments, three, four, or more microphones 170C may alternatively be disposed in the electronic device 100, to collect a sound signal, reduce noise, identify a sound source, implement a directional recording function, and the like.

The headset jack 170D is configured to connect to a wired headset. The headset jack 170D may be the USB port 130, or may be a 3.5 mm open mobile electronic device platform (open mobile terminal platform, OMTP) standard interface or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor.

The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on an SMS message application icon, an instruction for creating an SMS message is executed.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a clamshell by using the magnetic sensor 180D. Further, a feature such as automatic unlocking upon opening of the flip cover is set based on a detected opening or closing state of the leather case or a detected opening or closing state of the flip cover.

The acceleration sensor 180E may detect accelerations in various directions (usually on three axes) of the electronic device 100, and may detect magnitude and a direction of gravity when the electronic device 100 is still. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that the user holds the electronic device 100 close to an ear for a call, so that the electronic device 100 automatically turns off a screen to save power. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during shooting. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based shooting, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142, to avoid abnormal shutdown due to a low temperature.

The touch sensor 180K is also referred to as a "touch component". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. Visual output related to the touch operation may be provided by using the display 194. In some other embodiments, the touch sensor 180K may alternatively be disposed on a surface of the electronic device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The key 190 includes a power key, a volume key, and the like. The key 190 may be a mechanical key, or may be a touch key. The electronic device 100 may receive key input, and generate key signal input related to user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 can support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external memory card. The electronic device 100 interacts with a network through the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

A software system of the electronic device 100 may use a layered architecture, an event-driven architecture, a microkernel architecture, a micro service architecture, or a cloud architecture. In this embodiment of the present invention, an Android system with the layered architecture is used as an example to illustrate a software structure of the electronic device 100.

Figure 2:
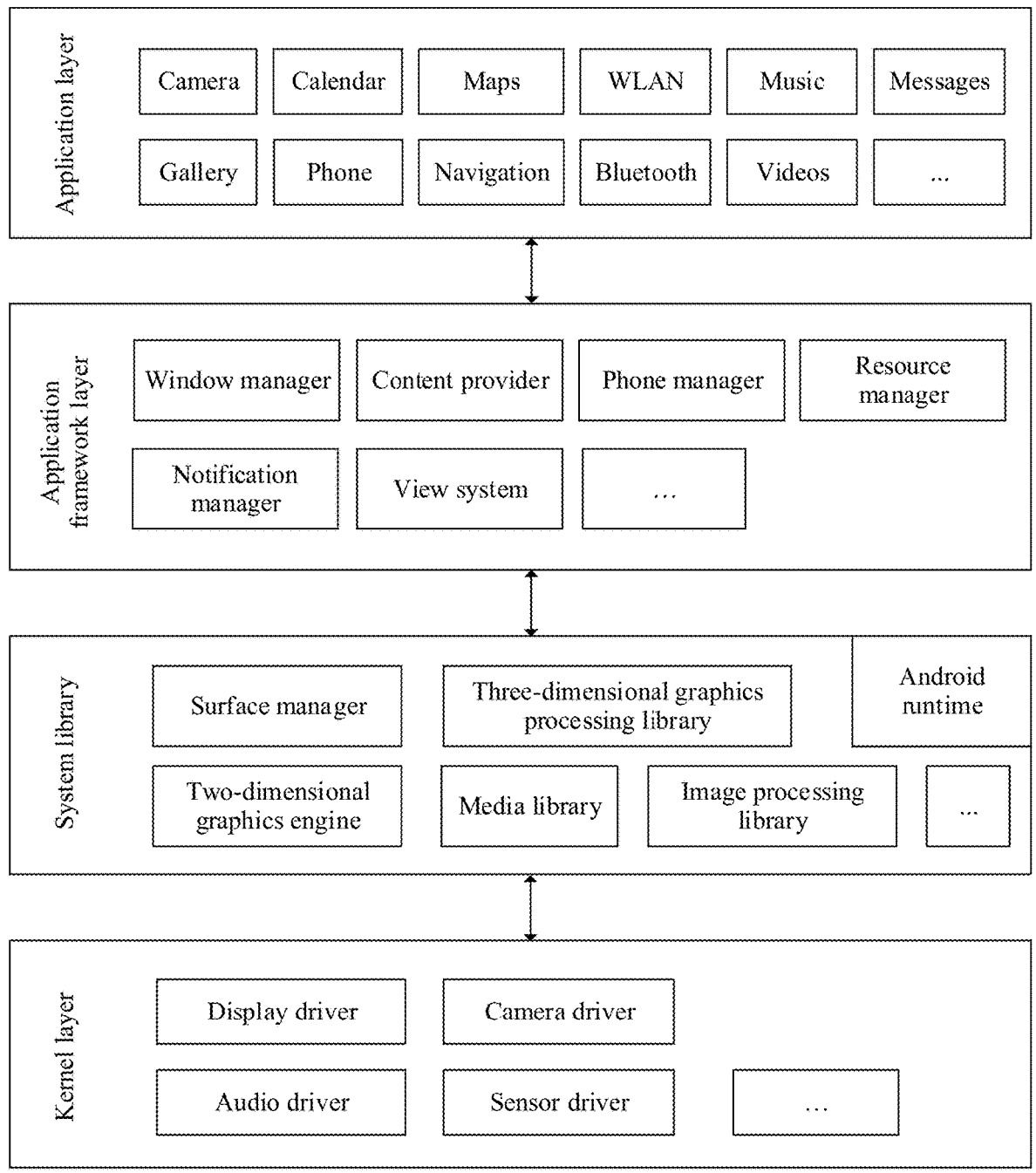
FIG. 2 is a schematic diagram of a software structure of an electronic device according to an embodiment of this application.

FIG. 2 is a block diagram of the software structure of the electronic device 100 according to this embodiment of this application.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom. The application layer may include a series of application packages.

As shown in FIG. 2, the application packages may include applications such as "camera", "gallery", "calendar", "phone", "maps", "navigation", "WLAN", "Bluetooth", "music", "videos", and "messages".

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether to present a status bar, lock a screen, capture a screen, and the like.

The content provider is configured to: store and obtain data, and enable the data to be accessed by an application. The data may include a video, an image, audio, calls that are made and received, a browsing history and a bookmark, a phone book, and the like.

The view system includes a visual component such as a component for displaying a text, or a component for displaying a picture. The view system may be configured to construct an application. A display interface may include one or more views. For example, a display interface including a message notification icon may include a text display view and a picture display view.

The phone manager is configured to provide a communication function of the electronic device 100, for example, management of a call status (including answering or declining).

The resource manager provides various resources for an application, such as a localized character string, an icon, a picture, a layout file, and a video file.

The notification manager enables an application to display notification information in a status bar, and may be configured to convey a notification type message. The notification manager may automatically disappear after a short pause without user interaction. For example, the notification manager is configured to provide notifications of download completing, a message prompt, and the like. The notification manager may alternatively be a notification that appears in a top status bar of the system in a form of a graph or a scroll bar text, for example, a notification of an application running on the background or a notification that appears on the screen in a form of a dialog window. For example, text information is prompted for in the status bar, an announcement is produced, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java language and a core library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager, a media library (media libraries), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording of a plurality of commonly used audio and video formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

For ease of understanding, in the following embodiments of this application, an electronic device having the structures shown in FIG. 1 and FIG. 2 is used as an example to describe in detail, with reference to the accompanying drawings and application scenarios, a method for displaying the interface component provided in embodiments of this application.

As described in the background, to enable a device A to use a capability and a service of a device B, first, an interface of the device B needs to be directly displayed on the device A. Screen projection is an operation in which a display interface of a source device is directly projected and displayed on a destination device. Currently, there are a plurality of screen projection solutions in the market, mainly including a wireless audio and video transmission technology, such as Miracast that is based on a Wi-Fi direct wireless direct connection technology and that is introduced by the digital living network alliance (DLNA). Screen projection requires that both a television end and an application at a mobile phone end comply with a corresponding protocol, to project and display a file, such as a photo, audio, and a video from a mobile phone to the television end.

The screen projection technology can only be used to directly map and display the interface of the source device on the destination device, without considering a size and a resolution of an interface of the destination device and a specific requirement for the display interface of the destination device. In addition, in a screen projection process, there is only a single application interface displayed at a time, a plurality of interface functions cannot be combined for display, and some interface n components cannot be split and separately displayed. In most cases, the screen projection technology does not support performing an operation on the source device from the destination device.

In addition to the foregoing screen projection technology, a vehicle-mounted system CarPlay released by Apple Inc. can seamlessly integrate user's iOS device and iOS use experience with a dashboard system. CarPlay can use most of basic features of iPhone by using a control panel of a car. Some of these features include a voice assistant tool Siri, a music player iTunes, Apple maps, and a message service. Based on CarPlay, a driver can make and receive a call without leaving a steering wheel, and listen to a voice mail. A user can easily and securely make a call, listen to music, send and receive a message, use navigation, and the like. In a process of connecting the iPhone to the vehicle-mounted system CarPlay, a user can touch the driving control panel in the car to control the iPhone.

However, CarPlay is limited to a vehicle-mounted device and supports only a specific application. In addition, display on the control panel in the car is also totally copied display on a current application interface of the iPhone, and some components of the application interface of the iPhone cannot be split and separately displayed.

This application provides a method for displaying a UI component by using a UI component. In the method, some functions of an application or some function controls of an interface of the source device can be separated into an independent operation interface, to display on the destination device; or some functions of a plurality of applications or a plurality of function controls of an interface are combined to form an independent operation interface, to display on the destination device. In addition, according to the method for displaying a UI component in this application, an operation may be performed on the operation interface displayed on the destination device to implement an operation on the application corresponding to the source device, and an operation result is transferred from the destination device to the source device. Therefore, a user may perform, in various different scenarios, an operation on the application included in the operation interface. This is convenient for the user to use.

Before a method for displaying a UI component in this application is described, a UI component display function of an electronic device needs to be enabled. In this application, a mobile phone is used as the source device for description.

Figure 3A:
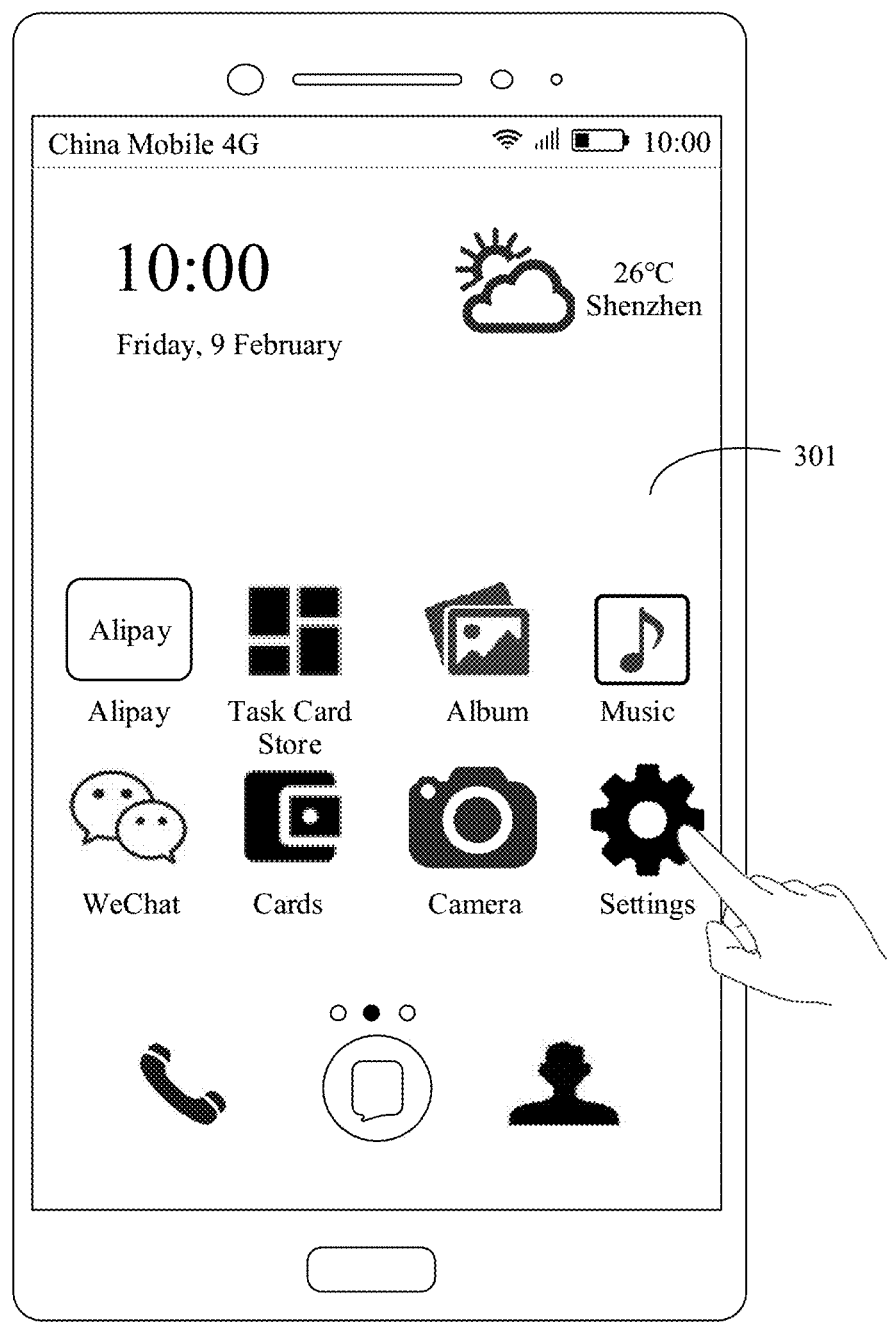
FIG. 3(a) to FIG. 3(i), FIG. 3(k), FIG. 3(m) and FIG. 3(n) are schematic diagrams of an example of enabling a UI component display function of a mobile phone according to an embodiment of this application.

In a possible implementation, as shown in FIG. 3(a) to FIG. 3(i), FIG. 3(k), FIG. 3(m) and FIG. 3(n), the UI component display function of the mobile phone may be enabled. FIG. 3(a) to FIG. 3(i), FIG. 3(k), FIG. 3(m) and FIG. 3(n) are schematic diagrams of an example of a graphical user interface (GUI) used to enable a UI component display function of a mobile phone according to an embodiment of this application. As shown in FIG. 3(a), a screen display system of the mobile phone displays currently output interface content 301 in an unlock mode of the mobile phone. The interface content 301 is a home screen of the mobile phone. The interface content 301 displays a plurality of third-party applications (application, App), such as Alipay, Task Card Store, Weibo, Album, Music, WeChat, Cards, Settings, and Camera. It should be understood that the interface content 301 may further include more applications. This is not limited in this application. A user can enable the UI component display function by operating "Settings".

For example, as shown in FIG. 3(a), a user operation is performed on "Settings", and the user operation may include an operation that the user taps an icon of "Settings" displayed on the mobile phone, such as a tap operation shown in FIG. 3(a). In response to the tap operation of the user, the mobile phone enters an interface of "Settings".

Figure 3B:
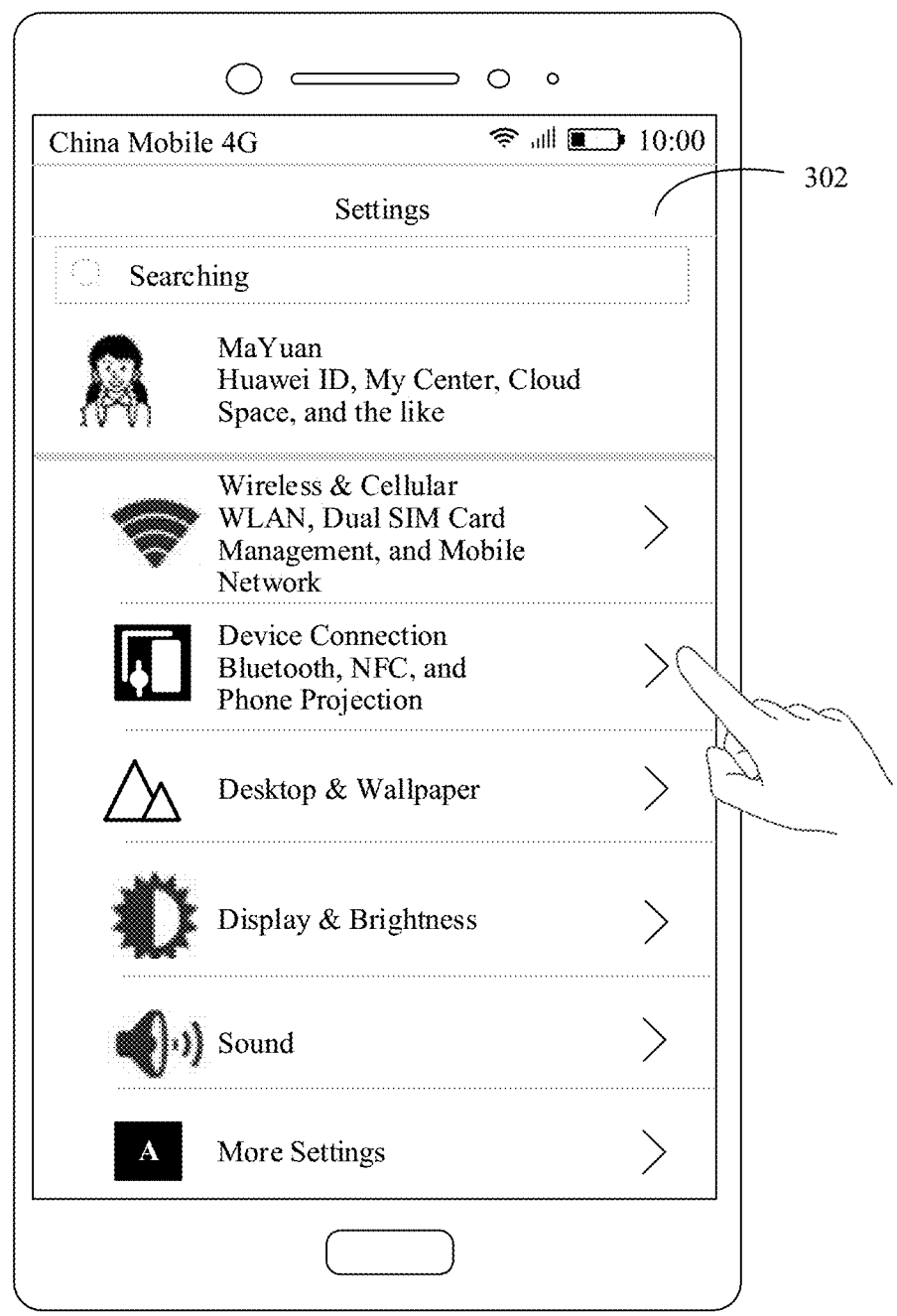
Figure 3C:
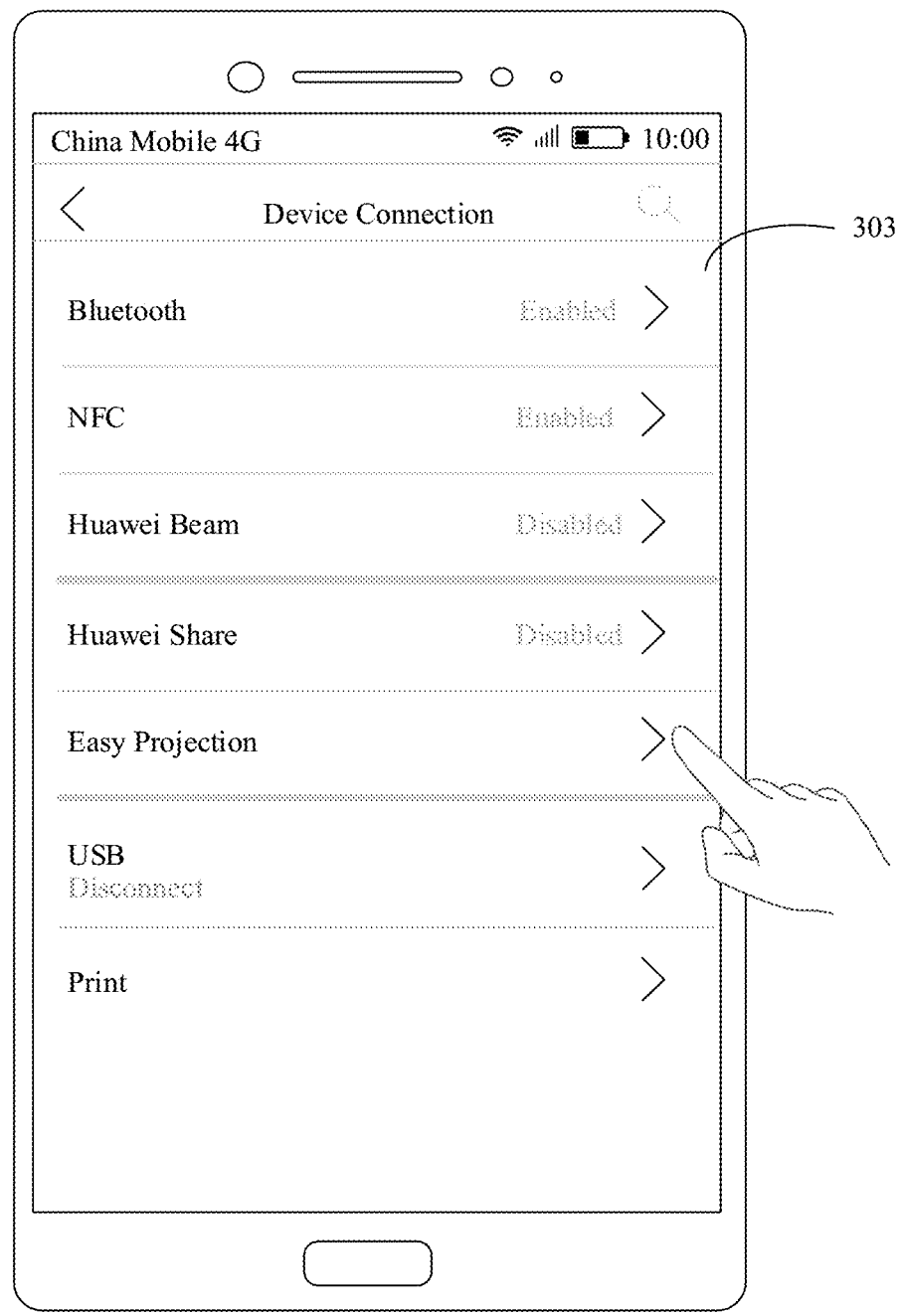

An interface 302 shown in FIG. 3(b) is a schematic diagram of an example of the interface of "Settings" according to this application. The interface 302 may include a plurality of menu bars, and different functions may be set for each menu bar. For example, the interface 302 includes a Wireless & Cellular menu bar, a Device Connection menu bar, a Desktop & Wallpaper menu bar, a Display & Brightness menu bar, a Sound menu bar, and a More Settings menu bar. A function of each menu bar is not described herein again.

The user may perform an operation of tapping the Device Connection menu bar shown in FIG. 3(b). In response to the tap operation, the mobile phone enters an interface 303 shown in FIG. 3(c). The interface 303 may include a plurality of menu bars, for example, a Bluetooth menu bar, a Near Field Communication (near field communication, NFC) menu bar, a Huawei Share menu bar, an Easy Projection menu bar, a USB setting menu bar, and a Print menu bar. The user performs an operation of tapping the Easy Projection menu bar of the mobile phone shown in FIG. 3(c). In response to the tap operation, the mobile phone enters an interface 304 shown in FIG. 3(d). The interface 304 may include a plurality of function areas, for example, an Easy Projection mode setting area and a Wireless Projection setting area. An available device list is searched for by tapping enable "Wireless Projection" control (the control selection box in the figure is in an ON state). Devices in the available device list are all devices that can support projection, for example, a mobile phone that can receive a touch operation of the user, such as a smartwatch device or a vehicle-mounted terminal in this application.

Figure 3D:
Figure 3E:
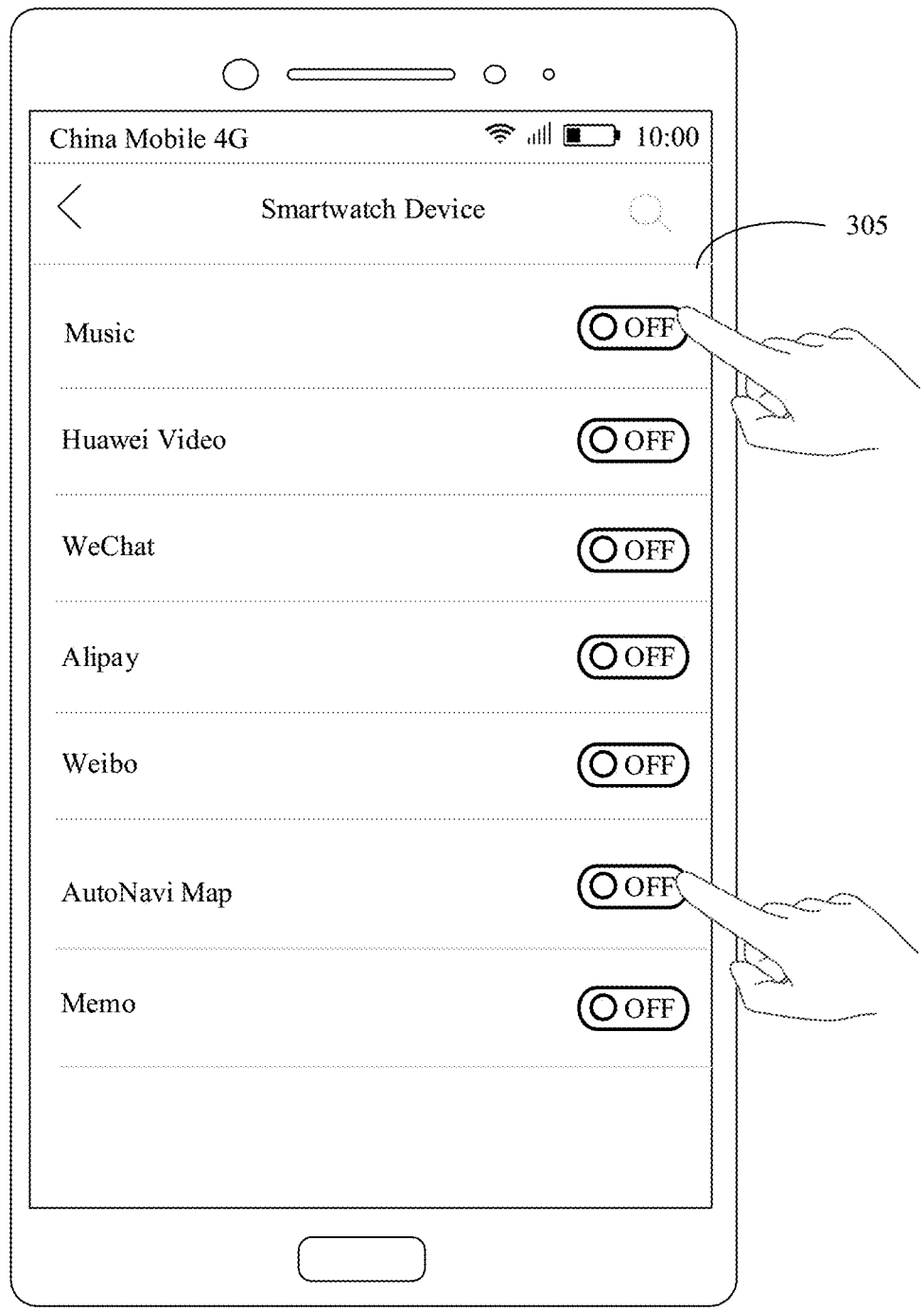
Figure 3F:
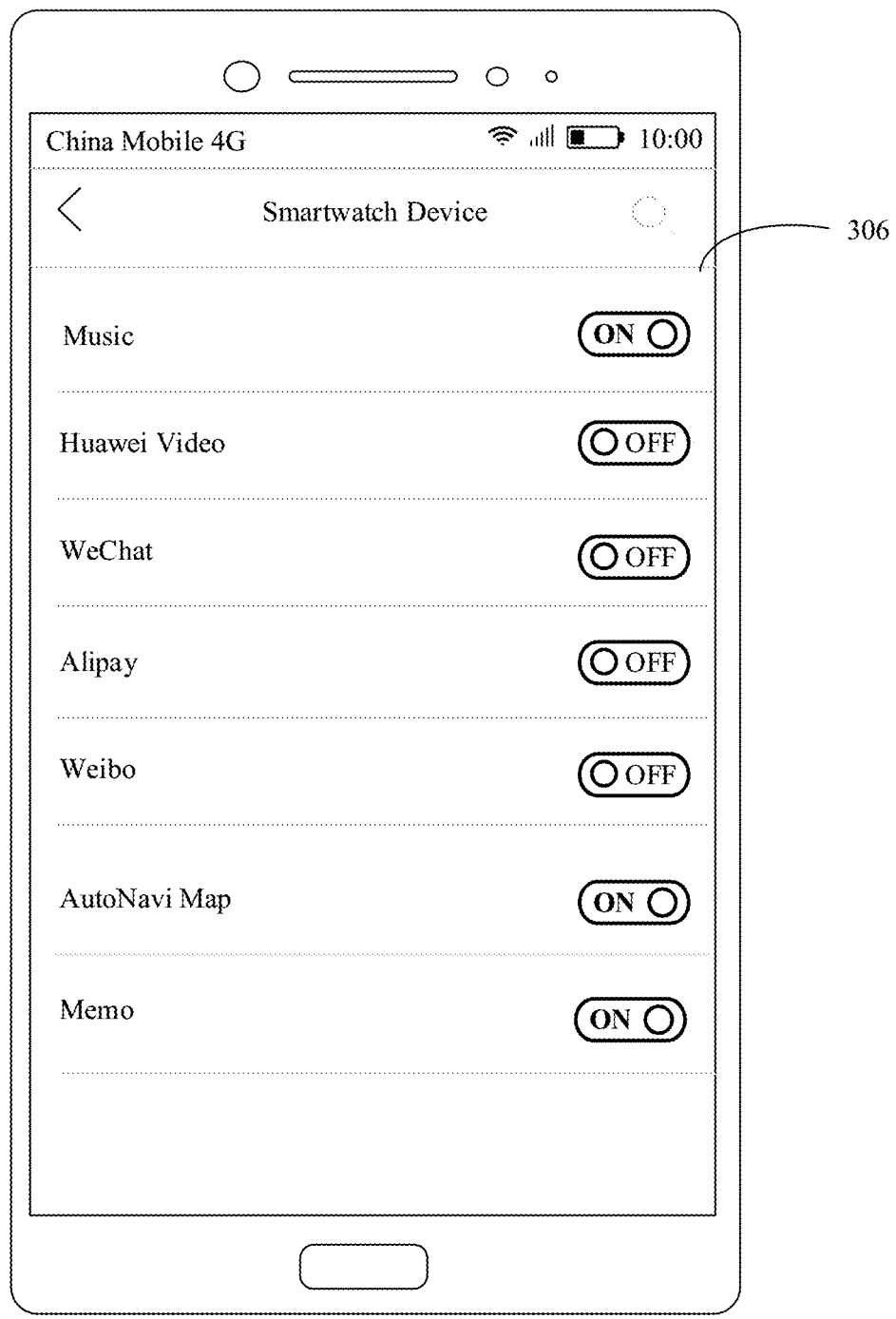

The user performs an operation of tapping a Smartwatch Device menu bar shown in FIG. 3(d). In response to the tap operation, the mobile phone enters an interface 305 shown in FIG. 3(e). The interface 305 may include an application list and a switch control that enables a display function of a UI component of the application, for example, for different application types such as Music, Huawei Video, WeChat, Alipay, Weibo, AutoNavi Map, and Memo shown in FIG. 3(e), the user can tap a switch control of a display function of a UI component of each application, to determine whether to enable the UI component display function of the application. Optionally, the user may enable an application (Music, AutoNavi Map, or Memo) that currently needs to be projected to and displayed on a destination device, and may keep a chat-type private application (WeChat, Weibo, Alipay, Huawei Video, or the like) that does not need to be enabled currently in a disabled state. The mobile phone may display an interface 306 shown in FIG. 3(f).

Figure 3G:
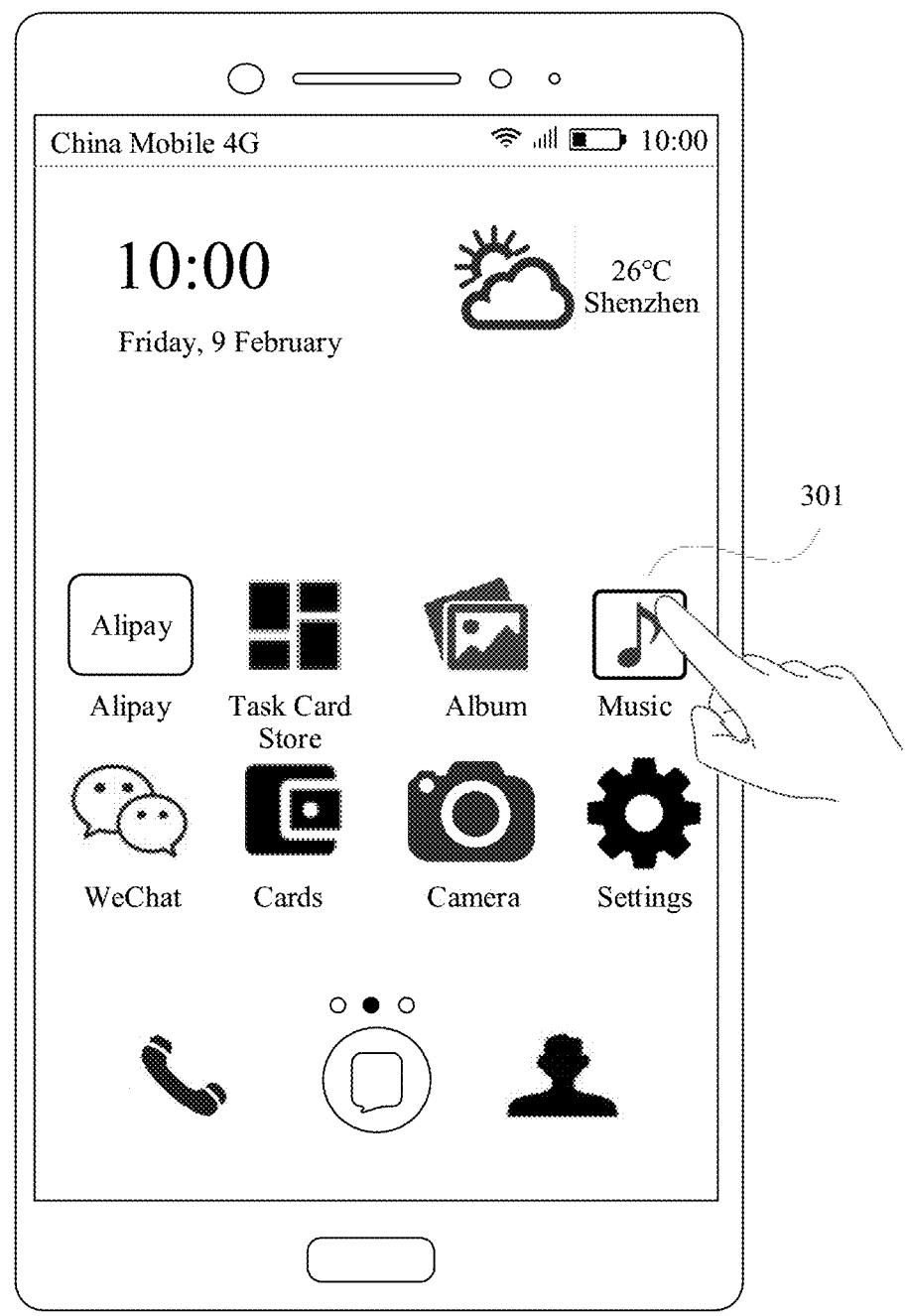
Figure 3H:
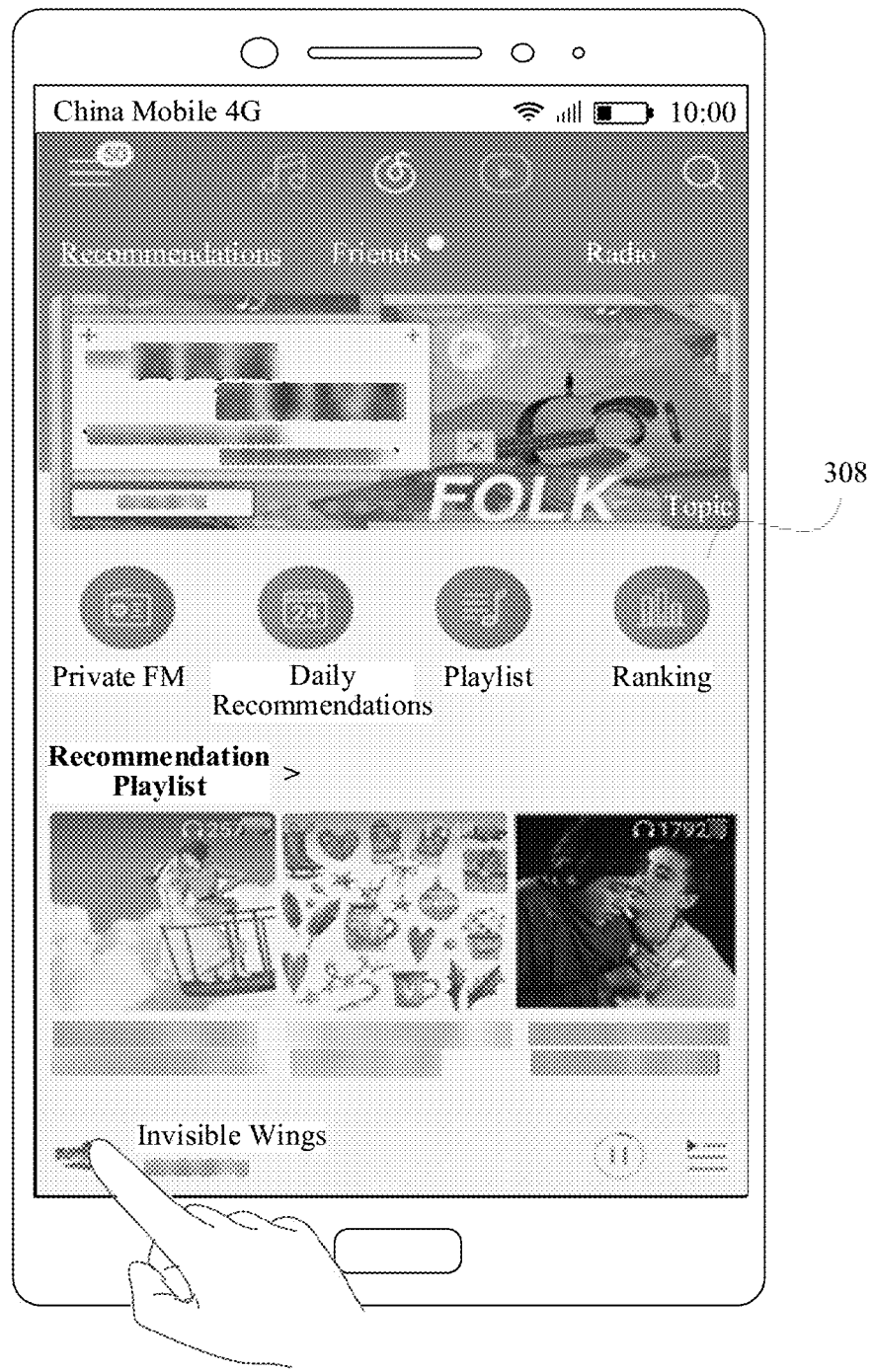

After setting the application that needs to be displayed on the destination device, the user may enter the application in which a UI component display function is already enabled. FIG. 3(g) shows a home screen 301 of the mobile phone, and a tap operation of the user is performed on the Music application on the home screen 301. In response to the tap operation of the user, the mobile phone enters a display interface 308 of the Music application shown in the FIG. 3(h). A tap operation of the user is performed on the display interface 308. In response to the tap operation of the user, the mobile phone enters the music play interface 309 shown in FIG. 3(i).

Figure 3I:
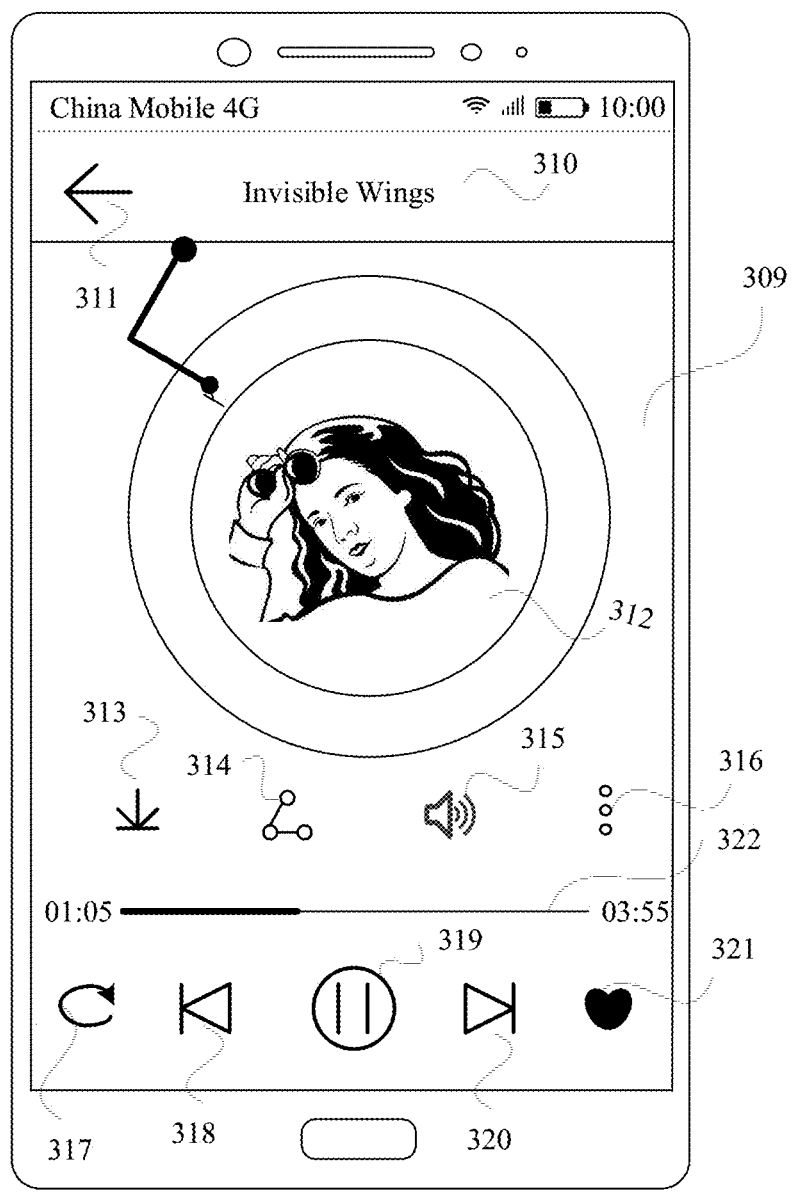

As shown in FIG. 3(i), the play interface 309 may include a plurality of function areas. Each function area includes different function controls, and one or more function controls form a user interface (UI) component. In other words, each UI component is a set of one or more function controls or a custom function control on the application interface. In descriptions of this embodiment of this application, the play interface 309 of the Music application includes a plurality of function controls. As shown in FIG. 3(i), the function controls may include a Song Name display control 310, a Return control 311, a Lyric display control 312, a Download control 313, and a Share control 314, a Volume Adjustment control 315, a Song Details control 316, a Loop Setting control 317, a Previous Song selection control 318, a Playing control 319, a Next Song selection control 320, and a Favorites control 321.

Figure 3K:
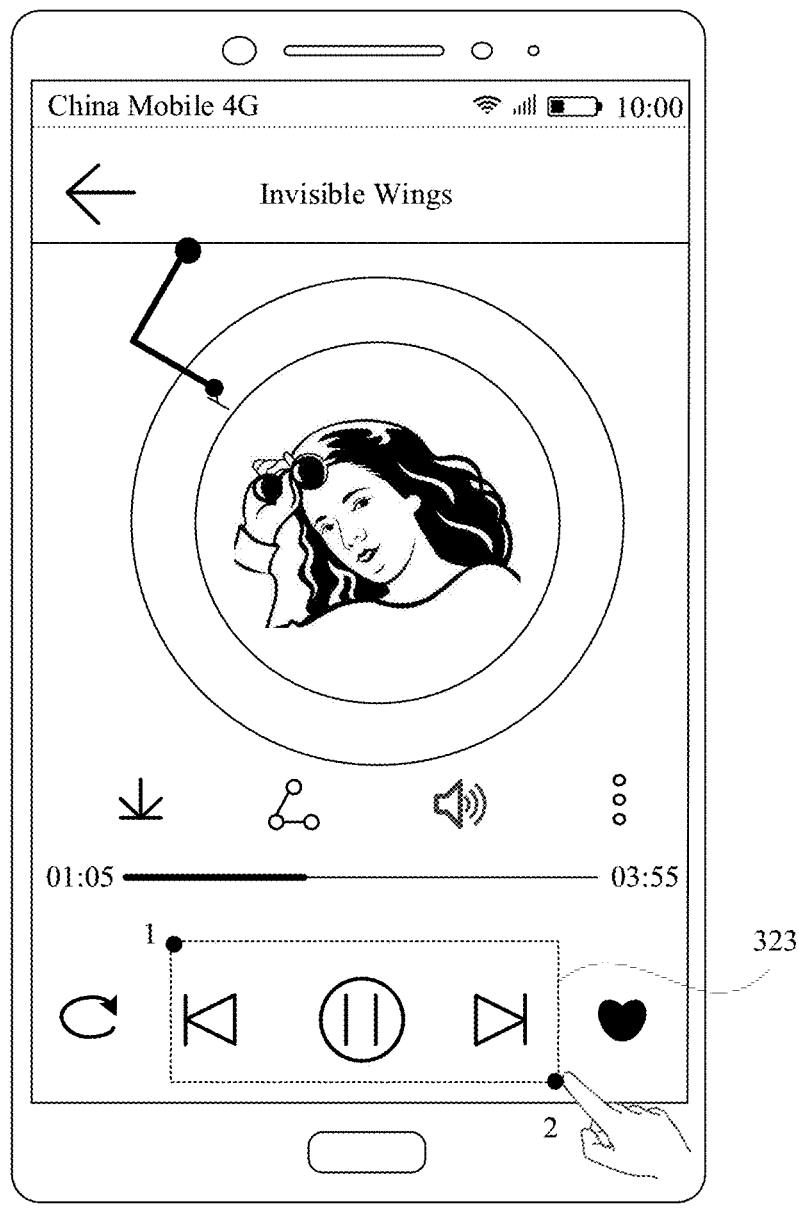

In a possible implementation, the user may select, on the play interface 309 through gesture selection, the UI component that needs to be displayed on the destination device. As shown in FIG. 3(k), on the play interface of the Music application of the mobile phone, the user may select, on the destination screen, according to a display screen size of the destination device and a use requirement of the user for a function control on the interface, a function control that needs to be displayed on the destination device, to form the UI component. For example, that the user selects an area shown in a dashed box on the music play interface may be understood as that the user selects the Previous Song selection control, the Playing control, and the Next Song selection control. An operation of selecting the area shown in the dashed box may be a sliding operation of the user along two position coordinates of a diagonal line of the area shown in the dashed box, for example, a sliding operation from a start coordinate position 1 in an upper left corner of the dashed box shown in the figure to a coordinate position 2 in a lower right corner of the area, or a sliding operation from a start coordinate position 2 in a lower right corner of the dashed box to a coordinate position 1 in an upper left corner of the area. This is not limited in this application.

Figure 3M:
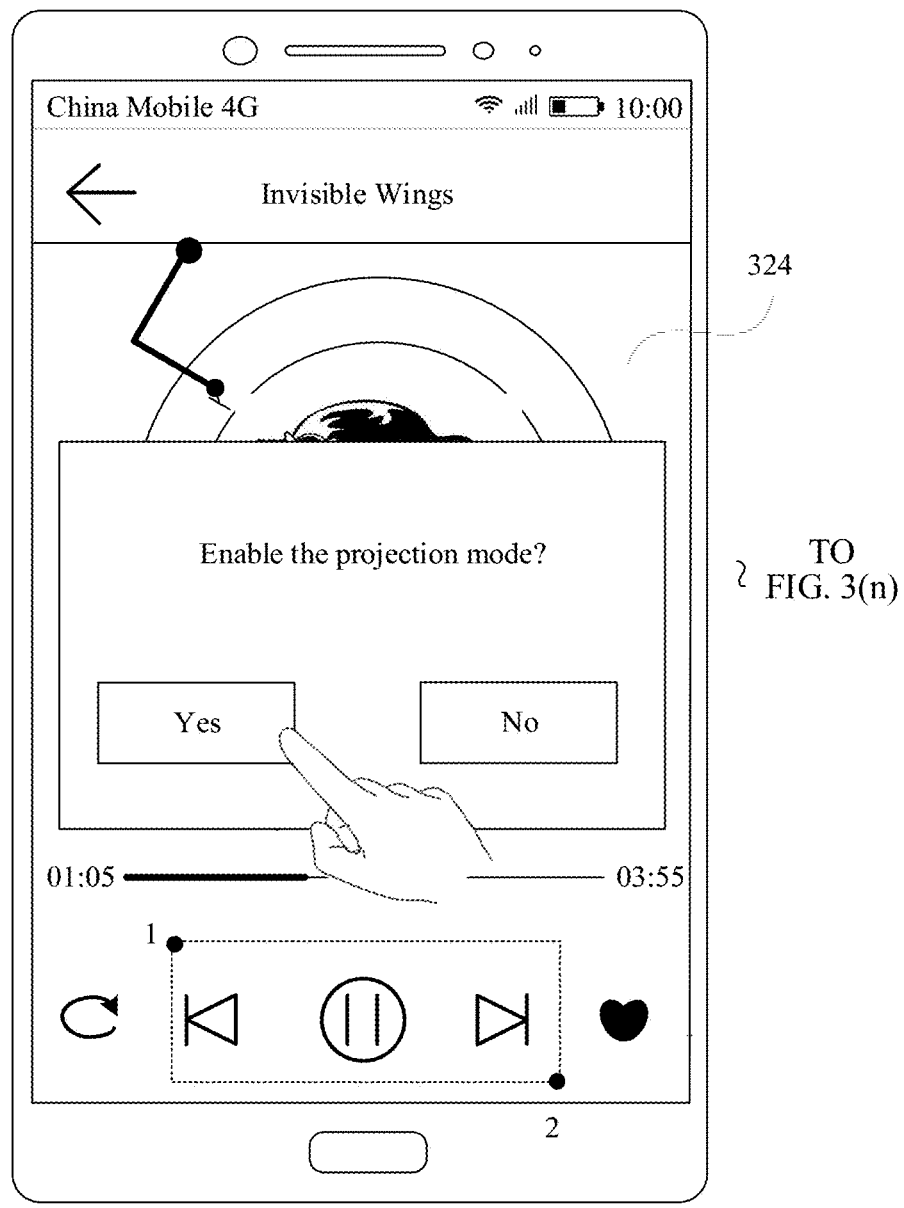
Figure 3N:
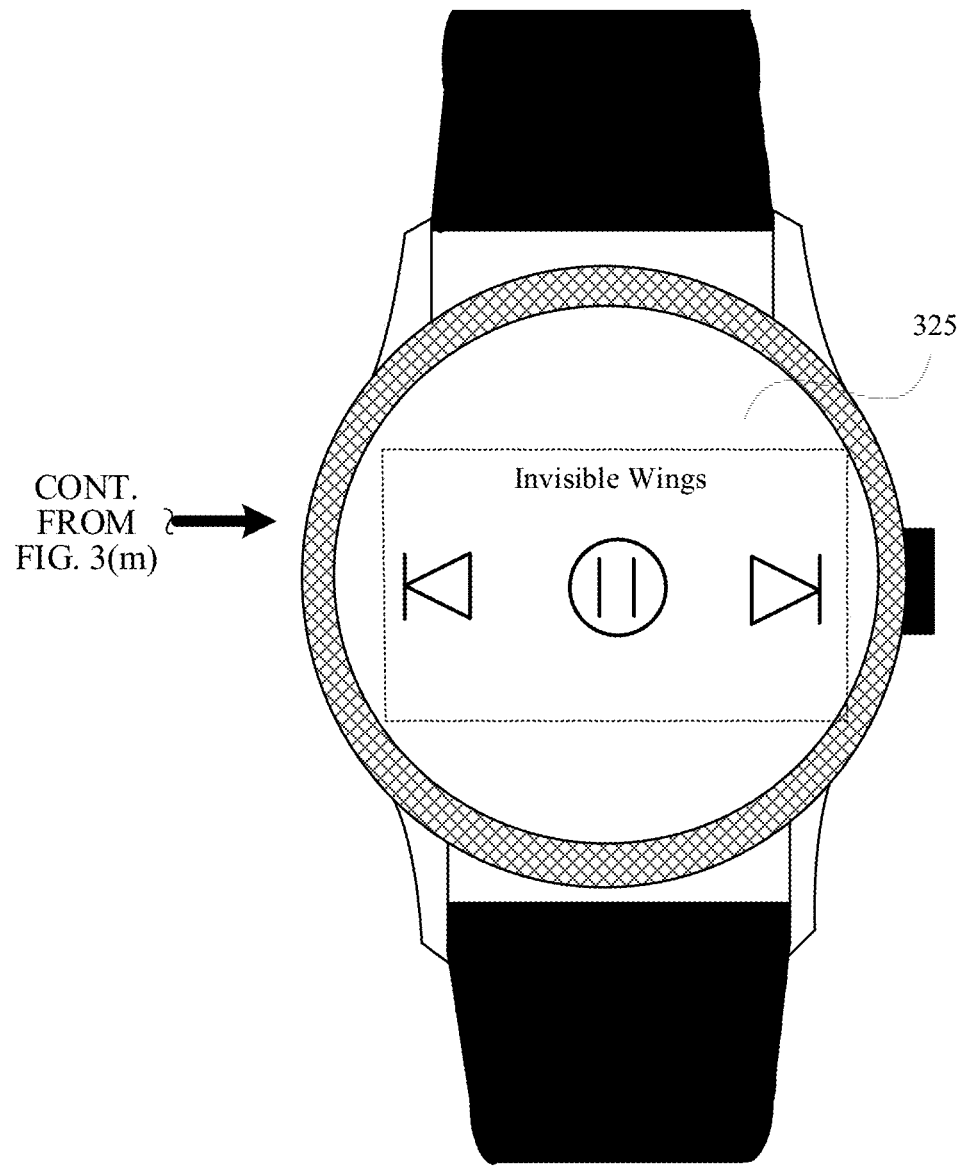

When the user selects the UI component that needs to be displayed on the destination device, where the UI component includes three function controls: the Previous Song selection control, the Playing control, and the Next Song selection control, in response to the selection operation of the user, the mobile phone displays a confirmation dialog box for enabling the projection mode. FIG. 3(m) shows a display interface 324 of the mobile phone. In the displayed confirmation dialog box for enabling the projection mode, there are a "Yes" selection control and a "No" selection control. After the user taps "Yes", the selected UI component may be displayed on a display interface of the smartwatch, as shown in FIG. 3(n).

The foregoing describes a method for enabling the display of the UI component of the mobile phone in this application. The projection function of the Music application is first enabled in the Setting application of the mobile phone, then the function control included in the UI component that needs to be displayed on the smartwatch is selected in the Music application, and finally, the selected UI component is determined to be displayed on the display interface of the smartwatch.

In another possible implementation, the UI component display function in this application may be enabled by identifying a gesture of the user in an application.

Figure 4A:
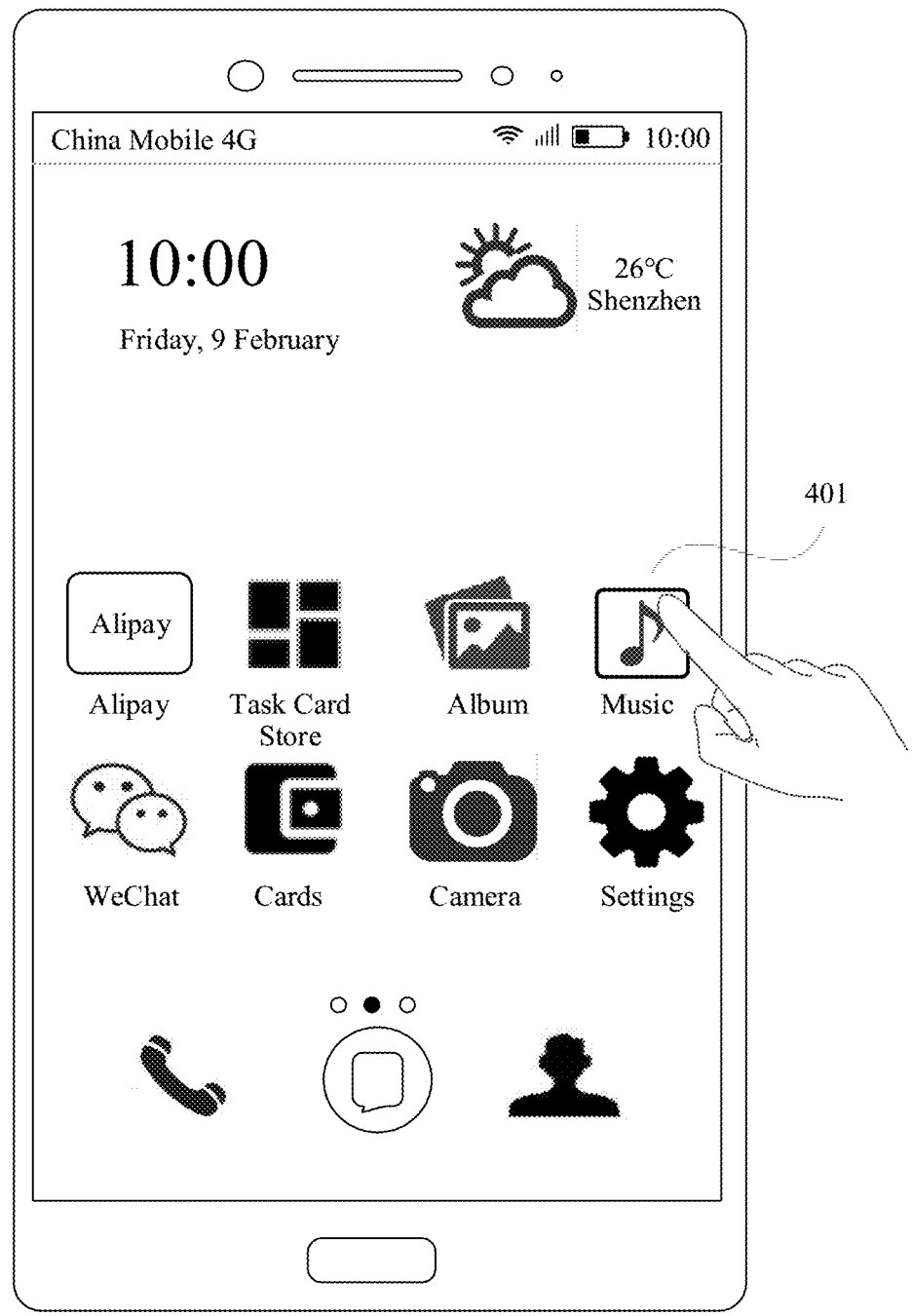
FIG. 4(a) to FIG. 4(i), FIG. 4(k), FIG. 4(m) and FIG. 4(n) are schematic diagrams of another example of enabling a UI component display function of a mobile phone according to an embodiment of this application.
Figure 4B:
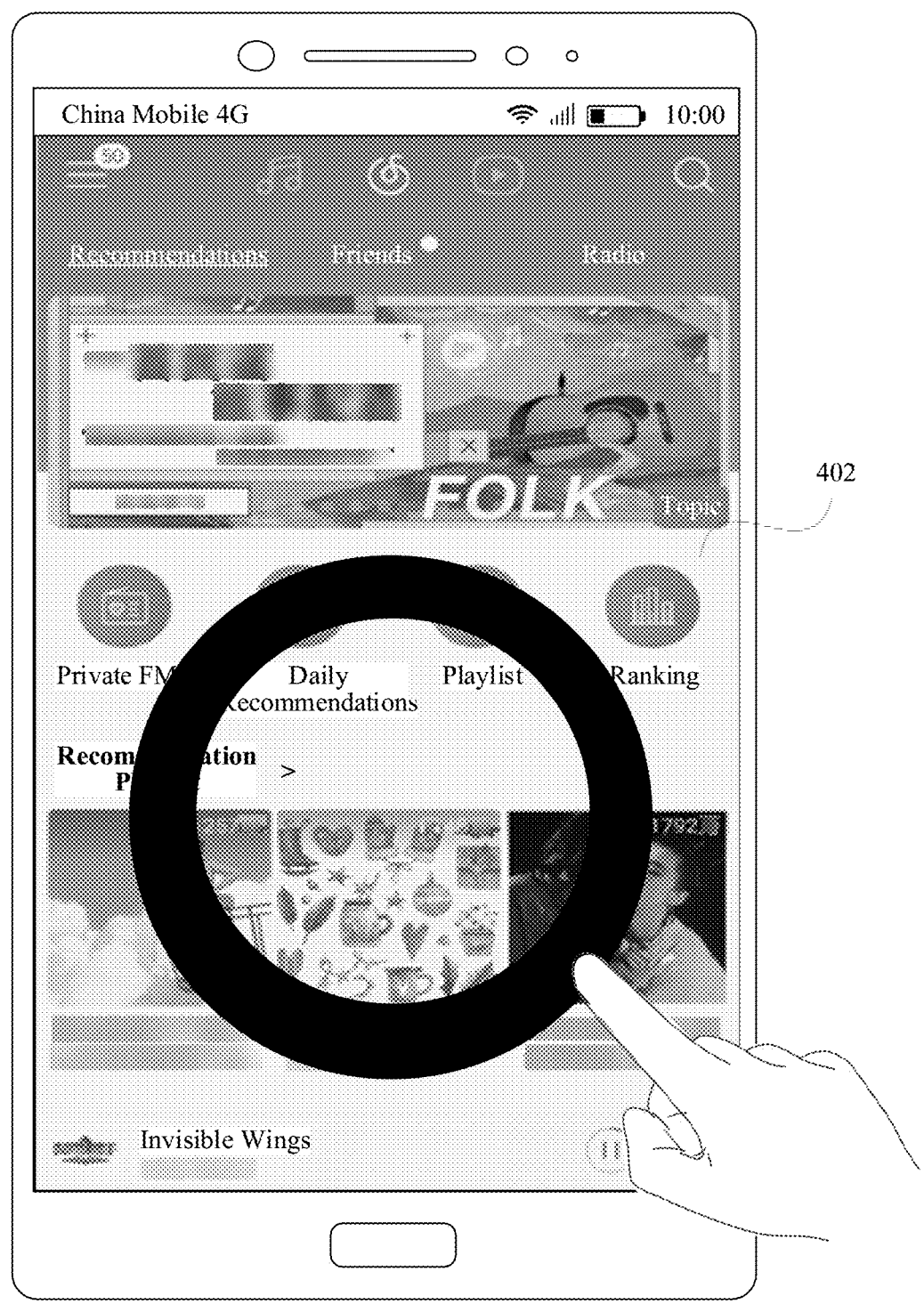
Figure 4C:
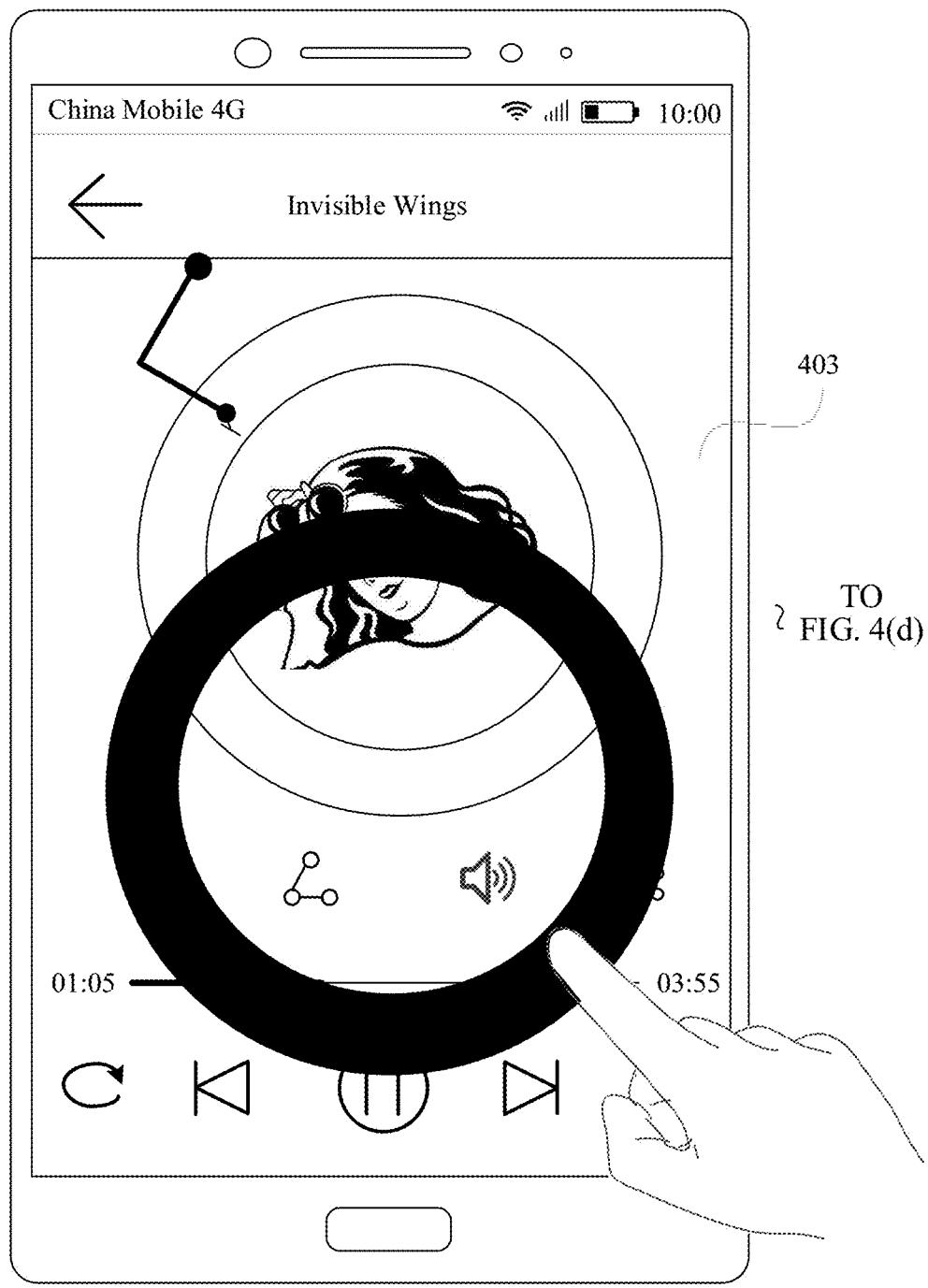

For example, FIG. 4(a) to FIG. 4(i), FIG. 4(k), FIG. 4(m) and FIG. 4(n) are schematic diagrams of another example of enabling the UI component display function of the mobile phone according to an embodiment of this application. FIG. 4(a) shows a home screen 401 of the mobile phone. Screen content included in the home screen 401 is described above in FIG. 3(a) to FIG. 3(i), FIG. 3(k), FIG. 3(m) and FIG. 3(n). For brevity, details are not described herein again. FIG. 4(b) is a home screen 402 of a Music application displayed after a user performs a tap operation shown in FIG. 4(a). FIG. 4(c) is a play interface 403 of the Music application. The user may perform a first operation on the home screen 402 of the Music application or the play interface 403 of the Music application. The first operation may be used to trigger the mobile phone to enable the UI component display function. In response to the first operation performed by the user, the mobile phone may display a confirmation dialog box 404 for enabling a projection mode. The confirmation dialog box 404 for enabling the projection mode includes a "Yes" selection control and a "No" selection control. After the user taps "Yes", the mobile phone may enter a display projection setting interface 405 shown in FIG. 4(e).

Optionally, the first operation may be a sliding operation of a finger of the user on the interface or another touch operation, or the first operation may be a sliding operation of a finger joint of the user on the interface or another touch operation. For example, the first operation may be a closed circle slid by the user shown in FIG. 4(b) and FIG. 4(c), or another possible shape such as an unclosed "C" shape. The first operation of the user is not limited in this application.

Figure 4D:
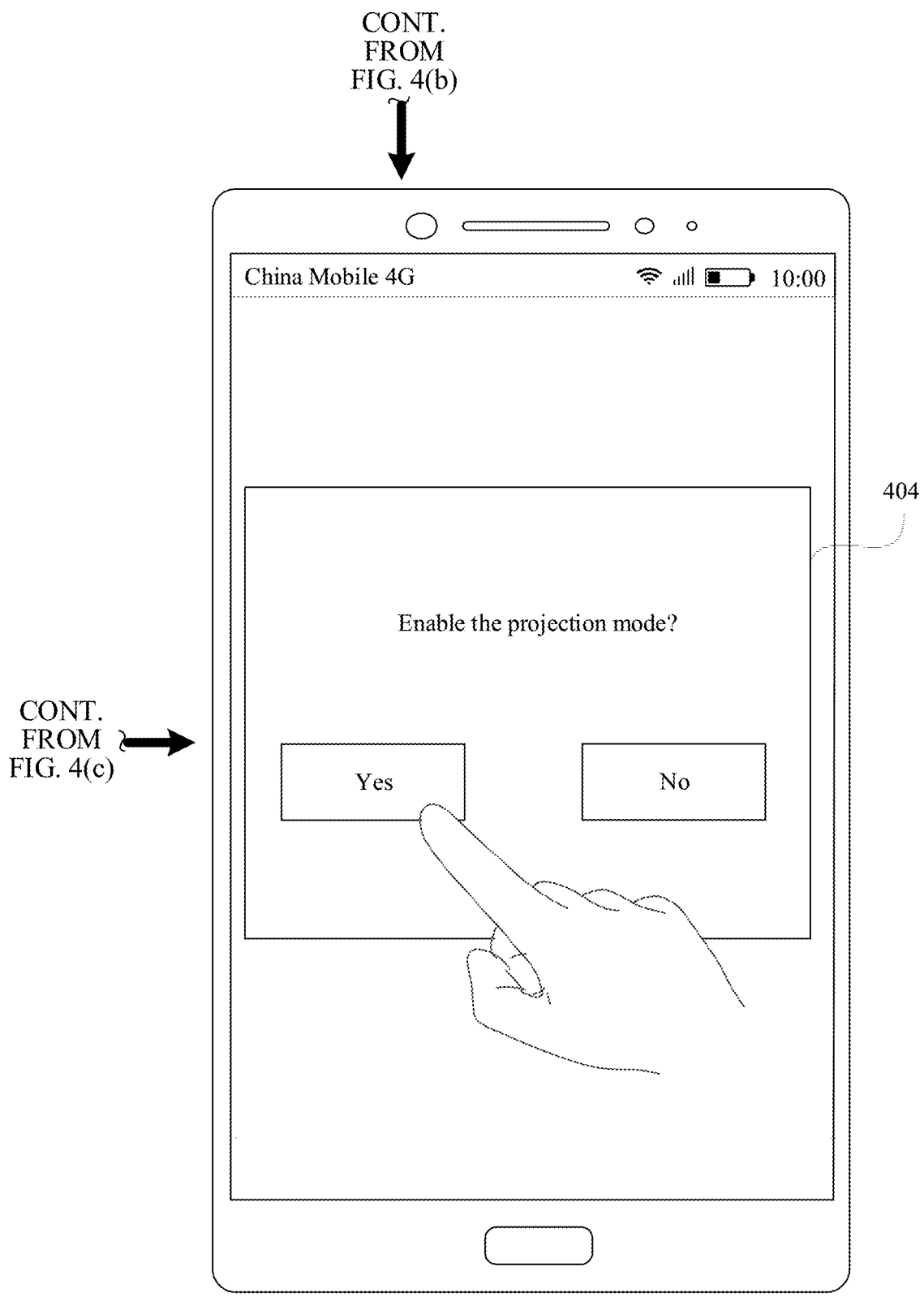
Figure 4E:
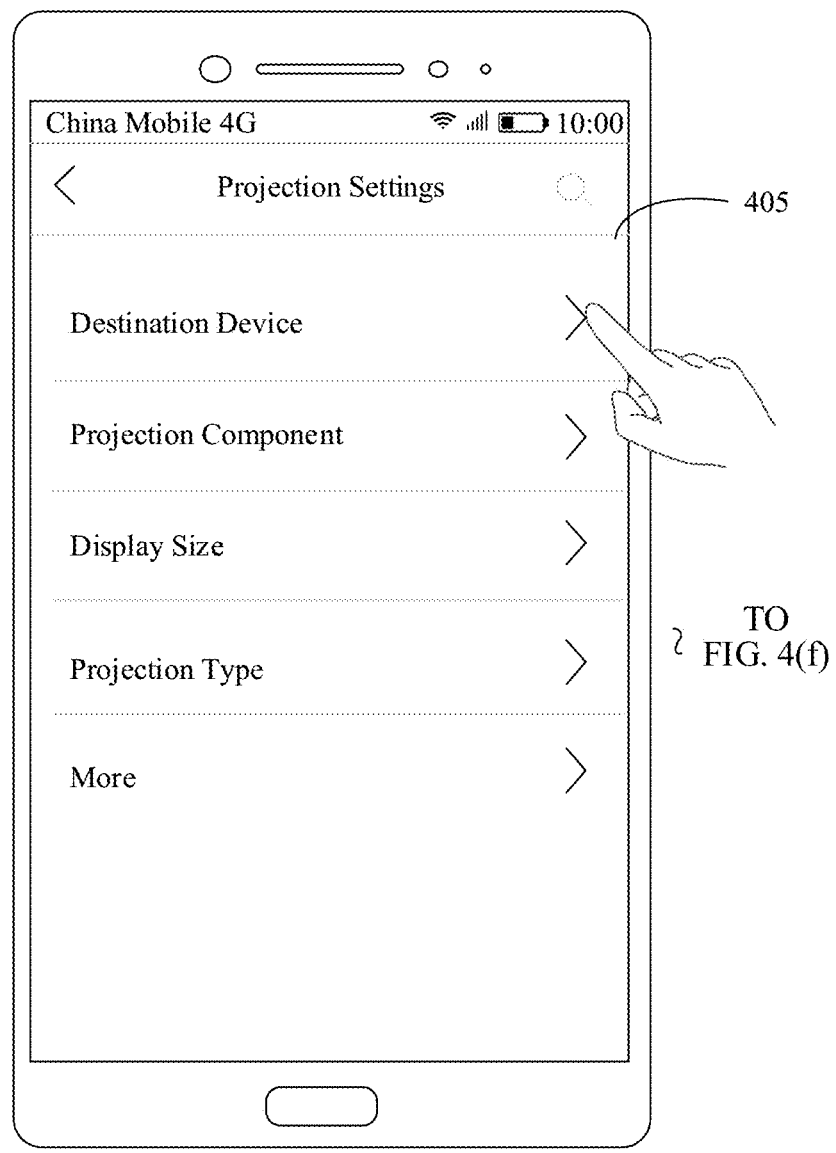
Figure 4F:
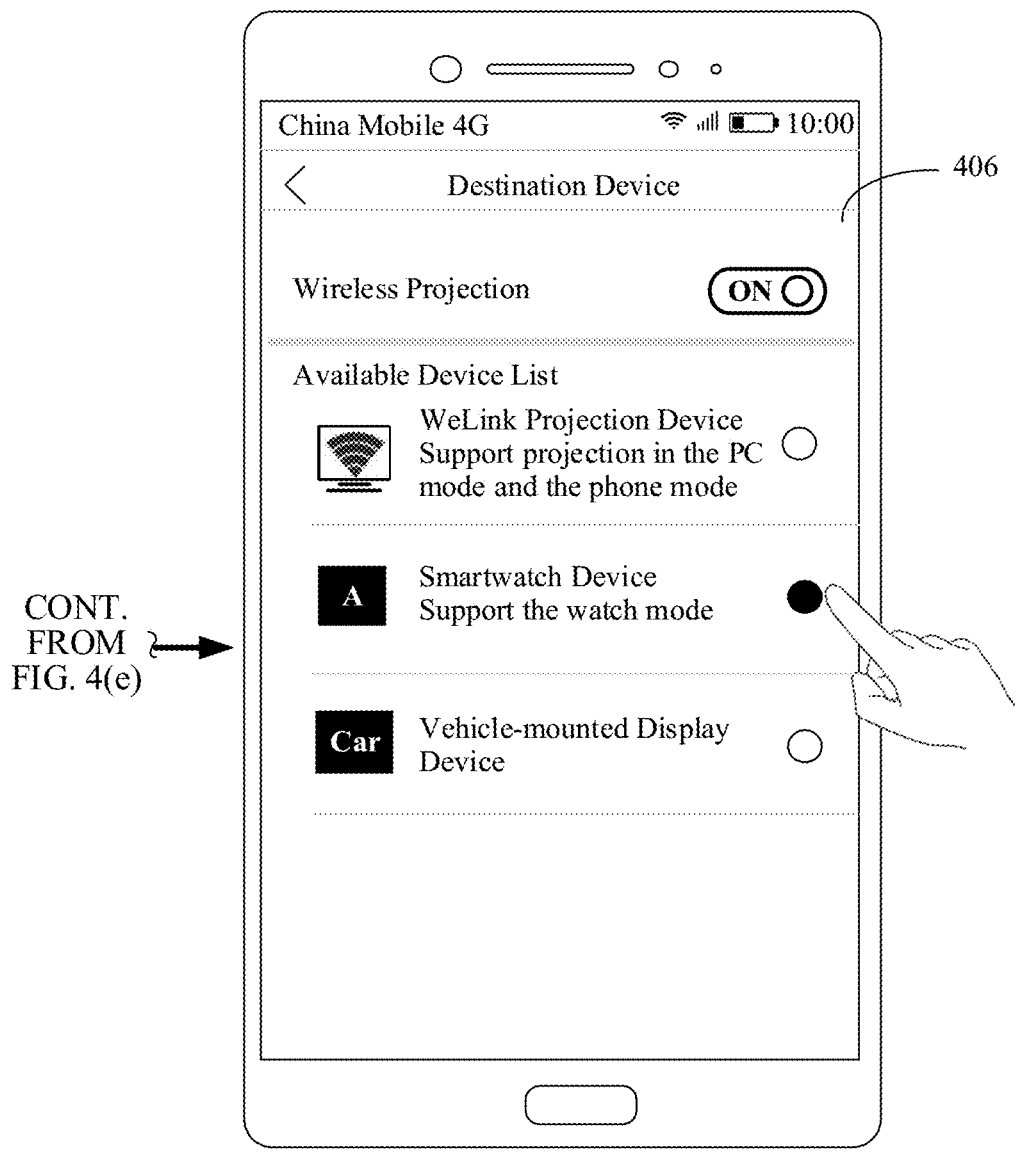

As shown in FIG. 4(e), the projection setting interface 405 may include a plurality of setting menus in a process of displaying the UI component on the destination device. For example, the setting menus may be a Destination Device setting menu, a Projection Component setting menu, a Display Size setting menu, a Projection Type setting menu, and the like. When the user performs an operation of tapping the Destination Device setting menu shown in FIG. 4(e) to enter a display interface 406 shown in FIG. 4(f), the user may select at least one destination device from an available device list included in the display interface 406. For example, the user may select a smartwatch device, or may select a plurality of devices such as a watch device and a vehicle-mounted display device at the same time. A quantity of destination devices in a display process of the UI component is not limited in this application.

Figure 4G:
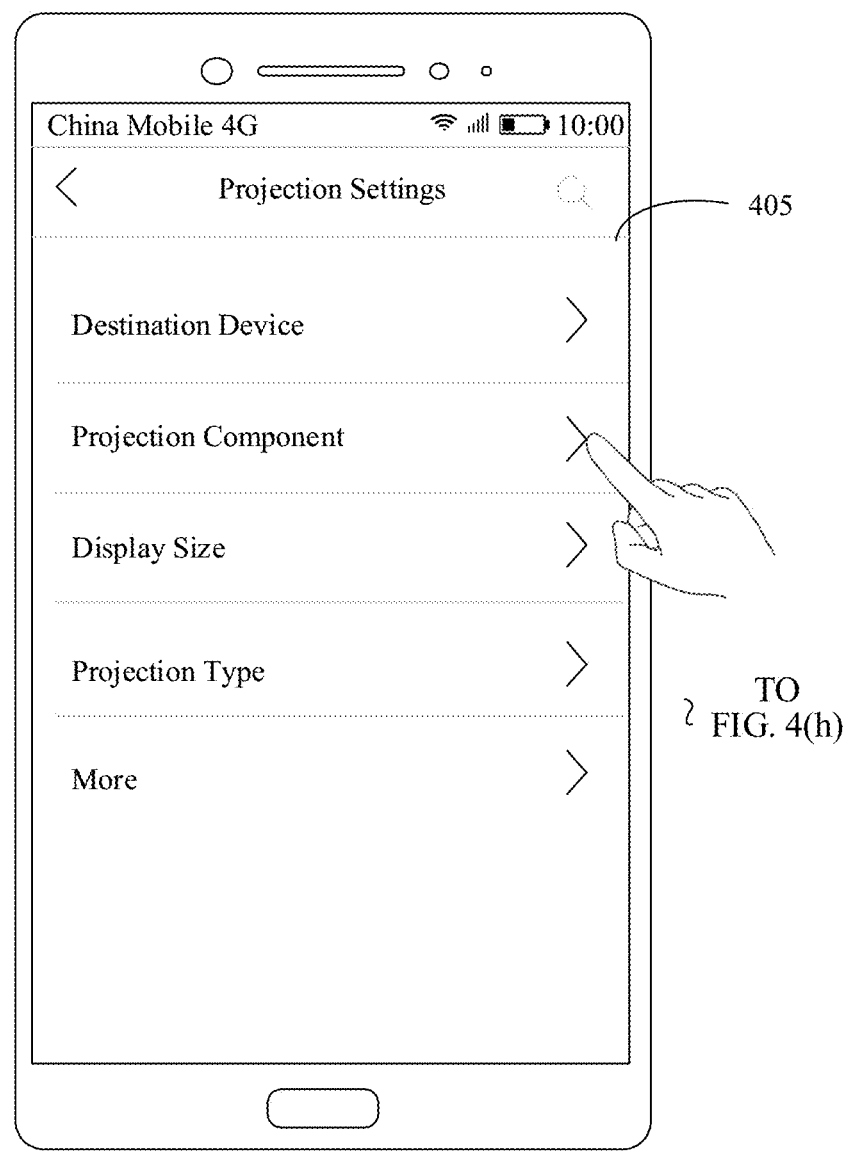
Figure 4H:
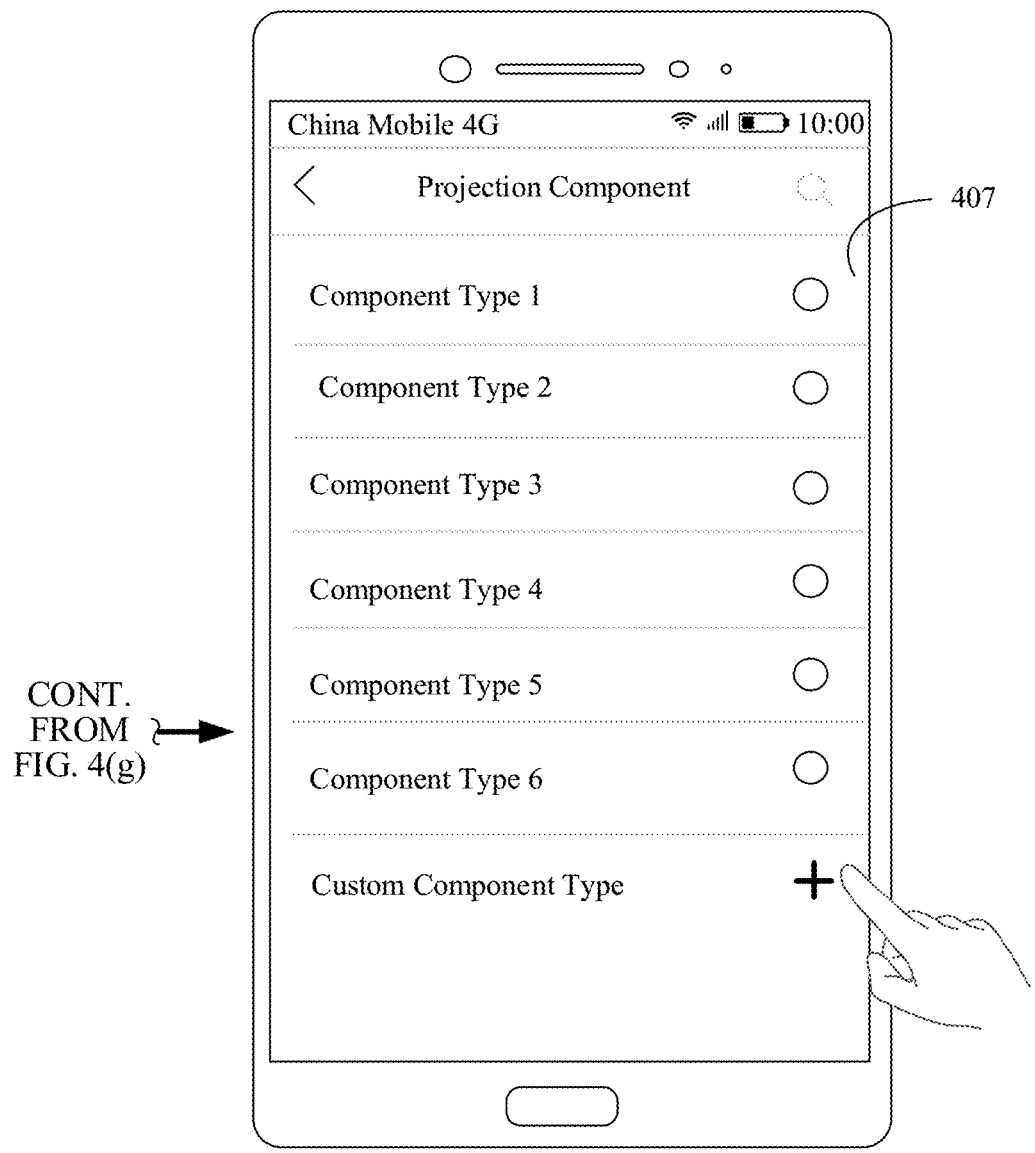

In addition, as shown in FIG. 4(g), the user may tap the Projection Component setting menu on the projection setting interface 405, to enter a projection component selection interface 407 shown in FIG. 4(h). The projection component selection interface 407 may include a plurality of component types. A component type 1 to a component type 7 shown in the projection component selection interface 407 may be different UI components preconfigured by a system. Each component type includes different quantities of function controls of different types. For example, the component type 1 may include a Music Playing control 319 and a Previous Song selection control 318. The user may tap any component type, to display a function control included in the component type on a display interface of the destination device.

The projection component selection interface 407 may further include a Custom Component Type addition menu, as shown in FIG. 4(h). The user may tap the Custom Component Type addition menu to enter a UI component selection interface 408 shown in FIG. 4(i). In the UI component selection interface 408, all limited function controls of the Music application may be displayed in a list in a small icon or a text box, or the like. The user may tap a small icon or a text box of each function control, select at least one function control, and tap a Save control, to save the selected function control as a UI component of the custom component type 1. A display interface 409 of the mobile phone may be shown in the figure.

It should be understood that any UI component type on the interface 409 may accept an operation of the user, such as adding, modifying, or deleting. For example, when the user creates the custom component type 1 this time, the custom component type 1 may be in the projection component list in next setting. The user may delete or modify the custom component type 1 by long pressing the custom component type 1. This is not limited in this application.

Figure 4I:
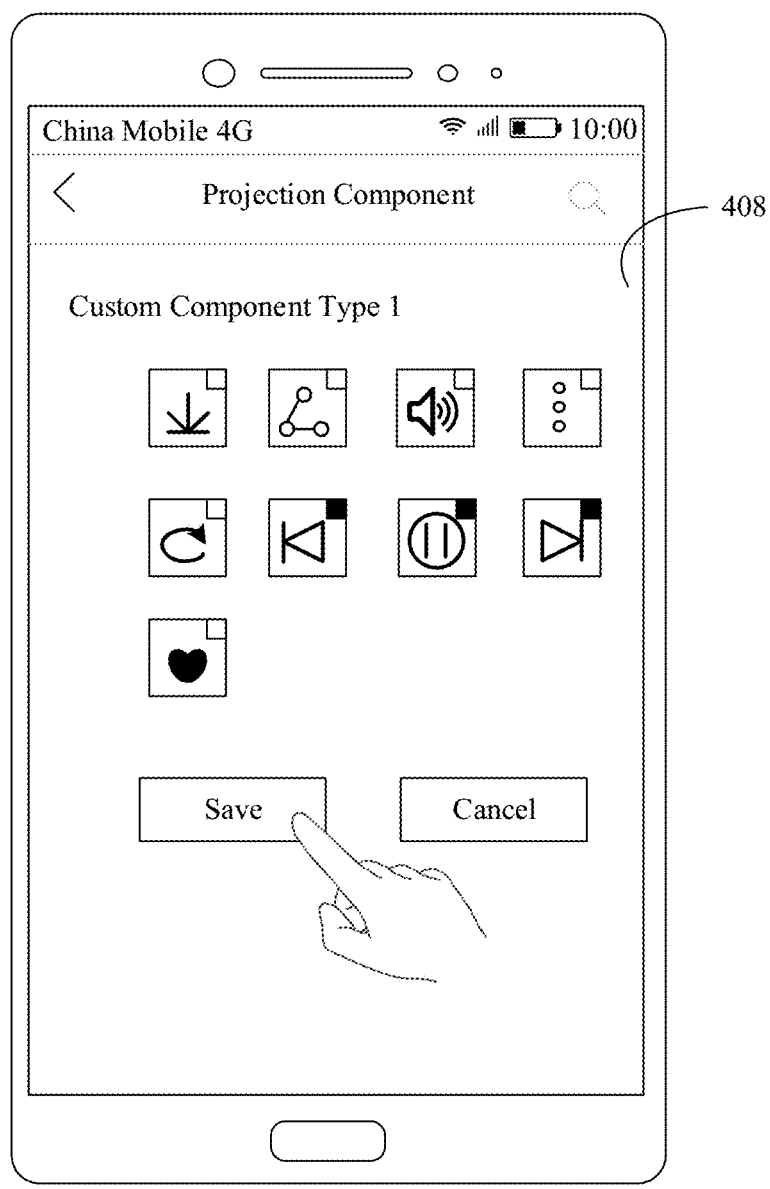
Figure 4K:
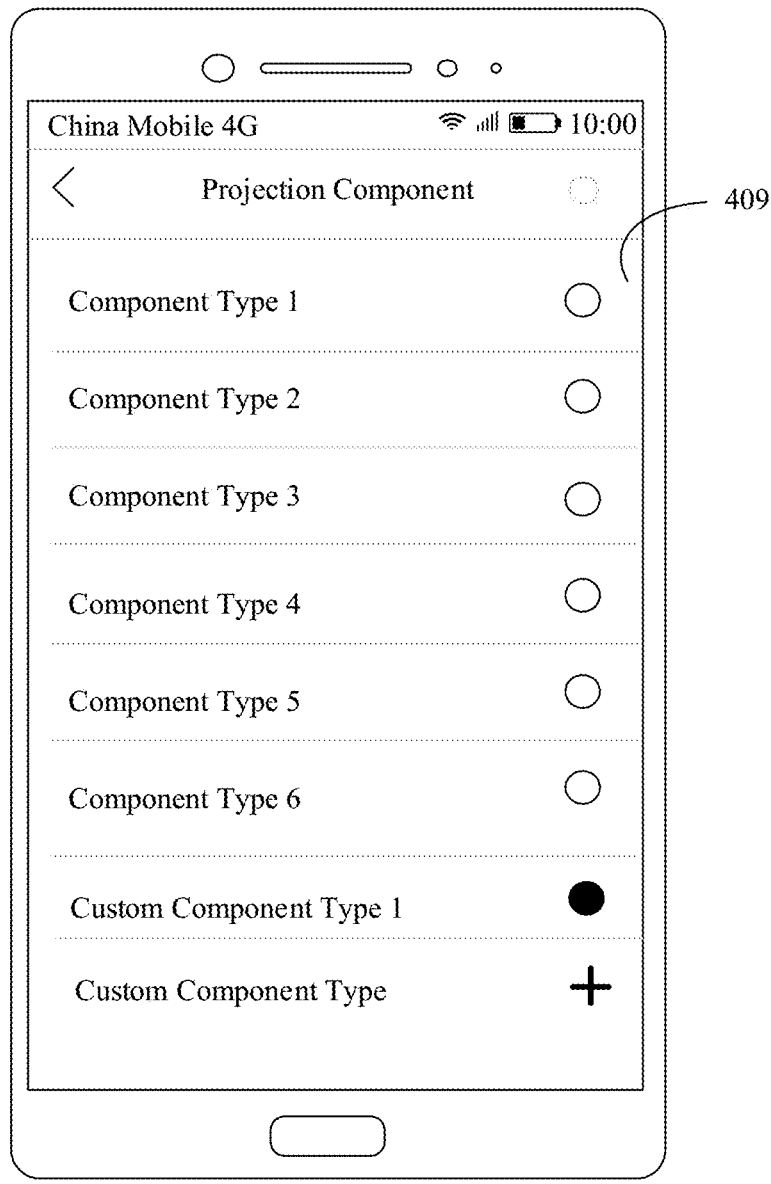
Figure 4M:
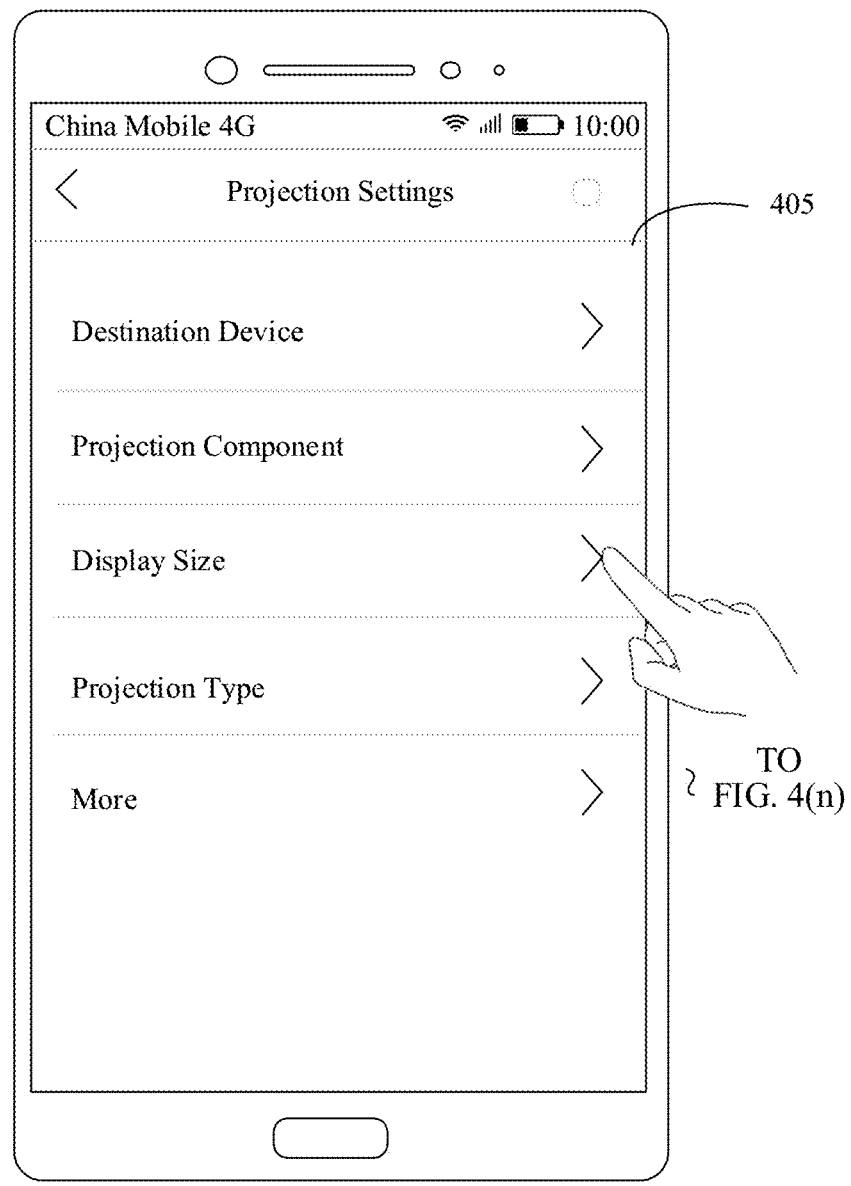
Figure 4N:
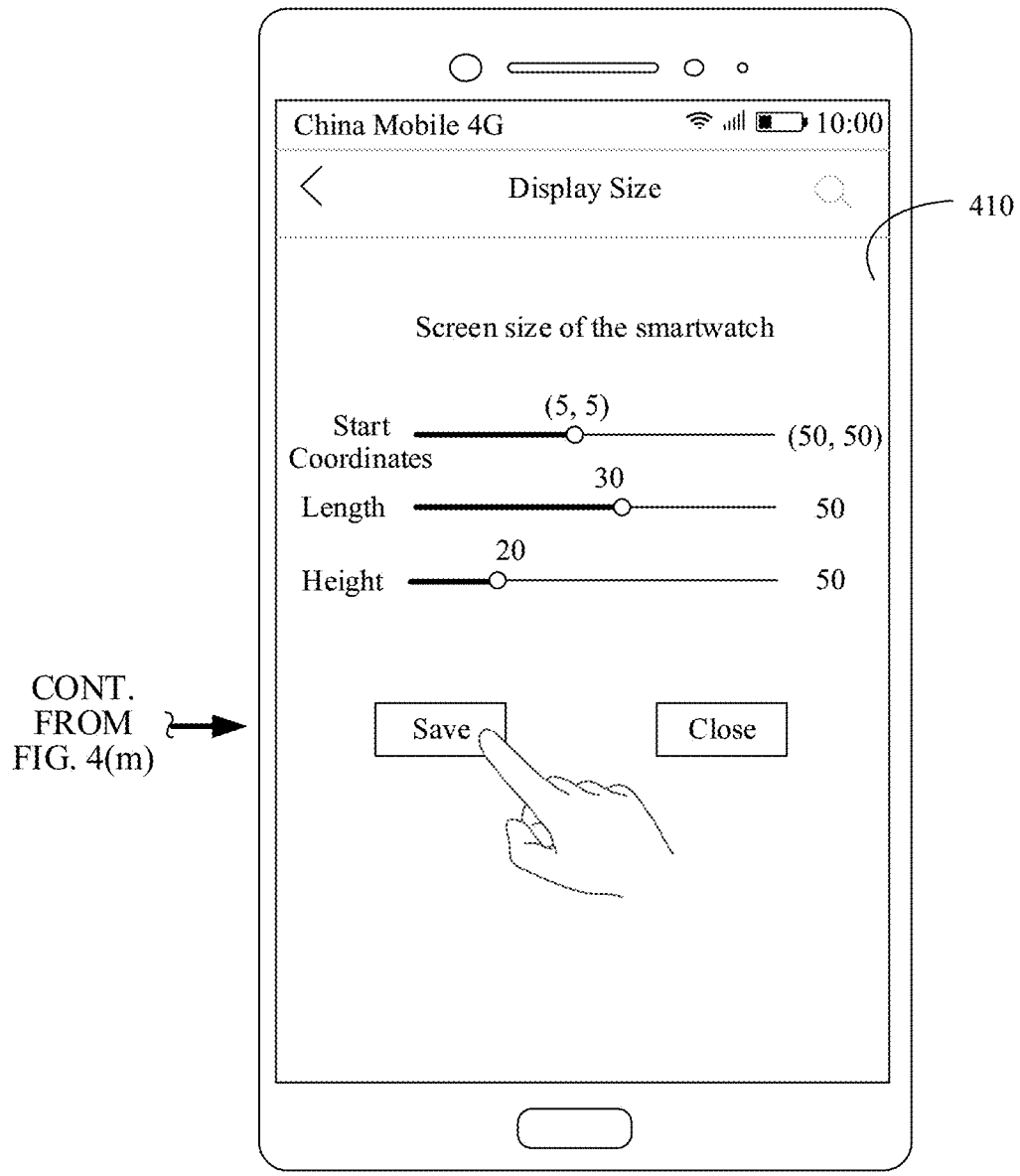

As shown in FIG. 4(m), the user may tap the Display Size setting menu on the projection setting interface 405, to enter a display size setting interface 410 of the destination device shown in FIG. 4(n). The setting interface 410 may include Start Coordinates setting, Display Box Size setting, Height setting, and the like about the destination device. When the user selects the destination device in the destination device setting interface 406, for example, the user selects the smartwatch, the user may set, based on a size of an output interface of the smartwatch, a size of the UI component displayed on the output interface of the smartwatch, and save the setting. FIG. 4(n) shows only the interface for setting the display size on the mobile phone when the destination device is the smartwatch. When the user selects a plurality of destination devices, more setting interfaces may be included. This is not limited in this application.

It should be understood that the foregoing enumerated setting menus may be set by the user in the Music application, or may be set when the user displays the selected UI component on the destination device after the user determines, as shown in FIG. 4(d), to enable the projection mode interface and selects the destination device, and the user may set the display size of the UI component and the like on a destination device end. This is not limited in this application. After the foregoing operations are performed, the UI component selected by the user may be displayed on the display interface of the smartwatch.

In another possible implementation, the UI component display function of the electronic device may be further enabled by using another third-party application. For example, a heterogeneous projection application developed by Huawei may be used to set the UI component that needs to be displayed on the destination device. This is not limited in this application.

Figure 5A:
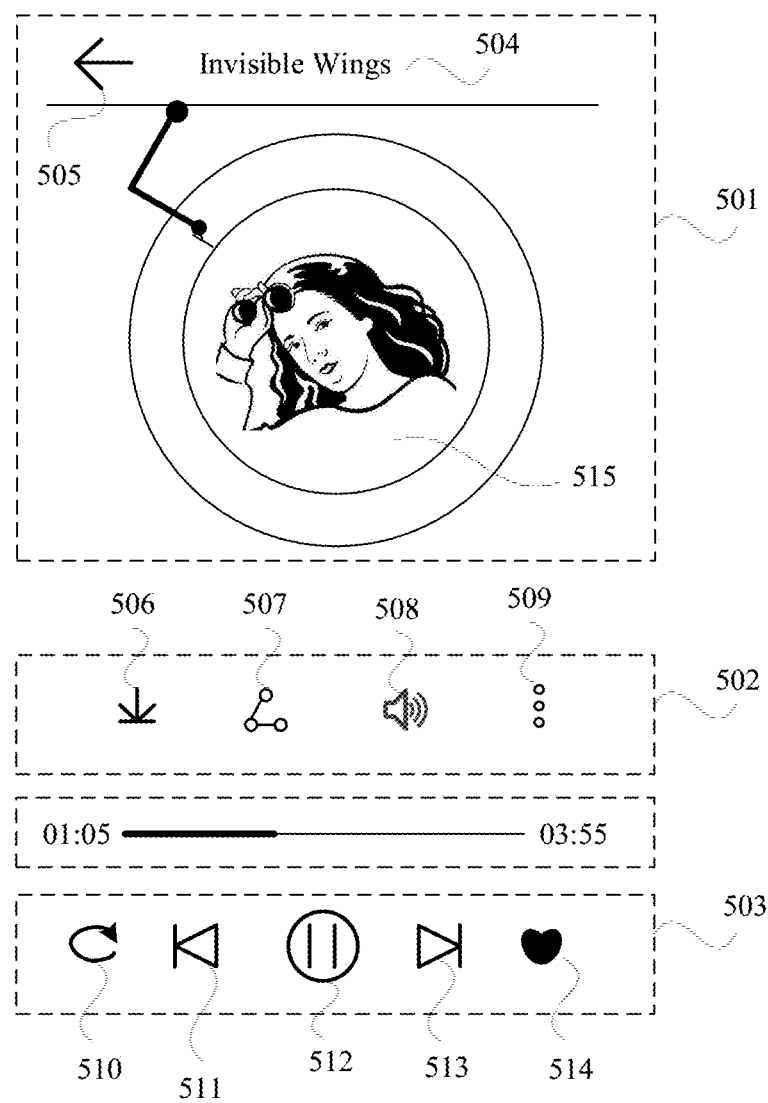
FIG. 5(a) to FIG. 5(d) are schematic diagrams of an example of a graphical user interface used to display a UI component according to an embodiment of this application.
Figure 5B:
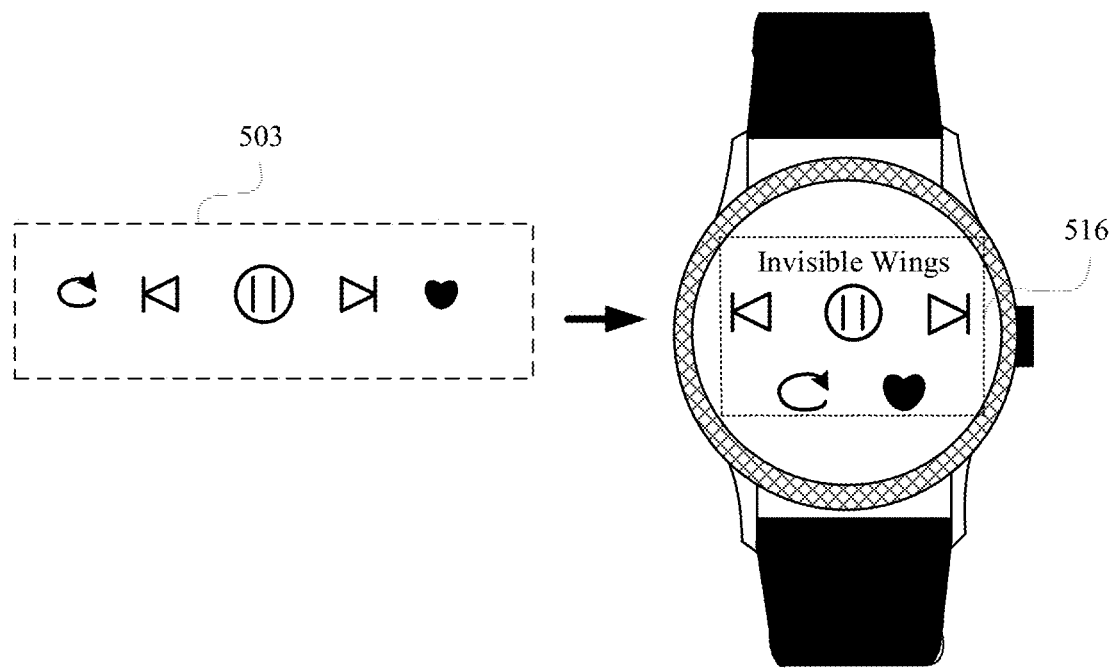
Figure 5C:
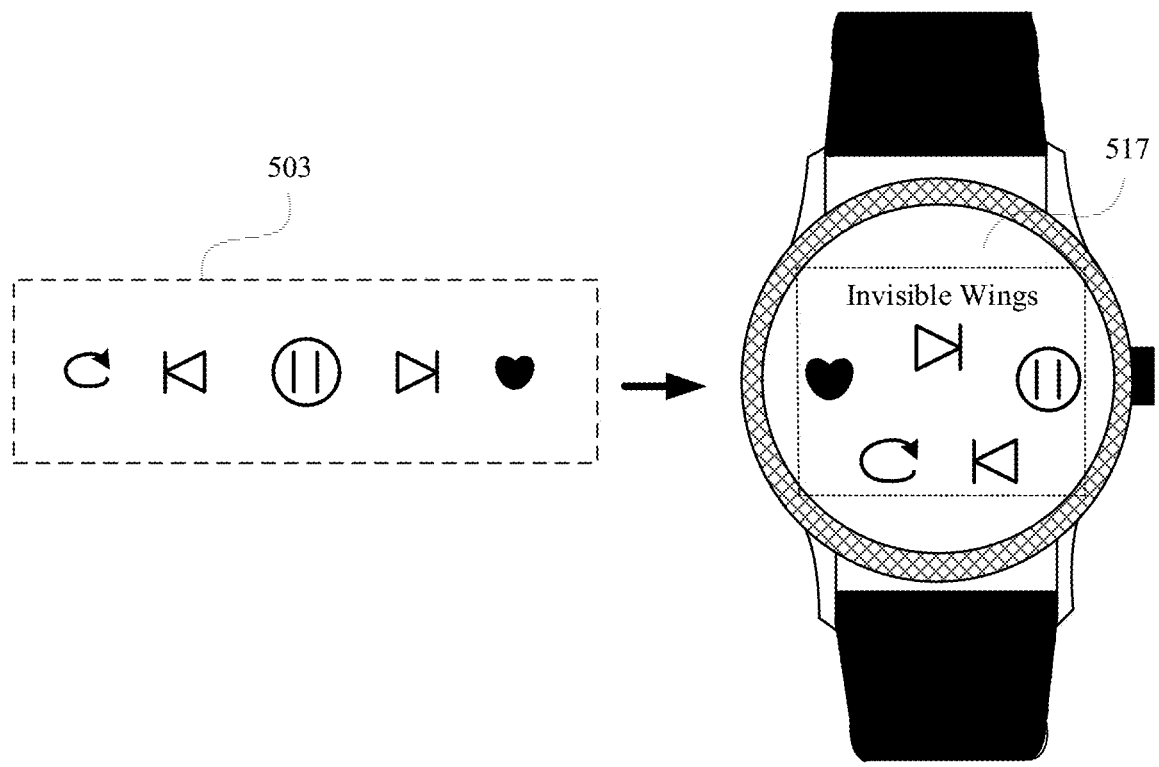
Figure 5D:
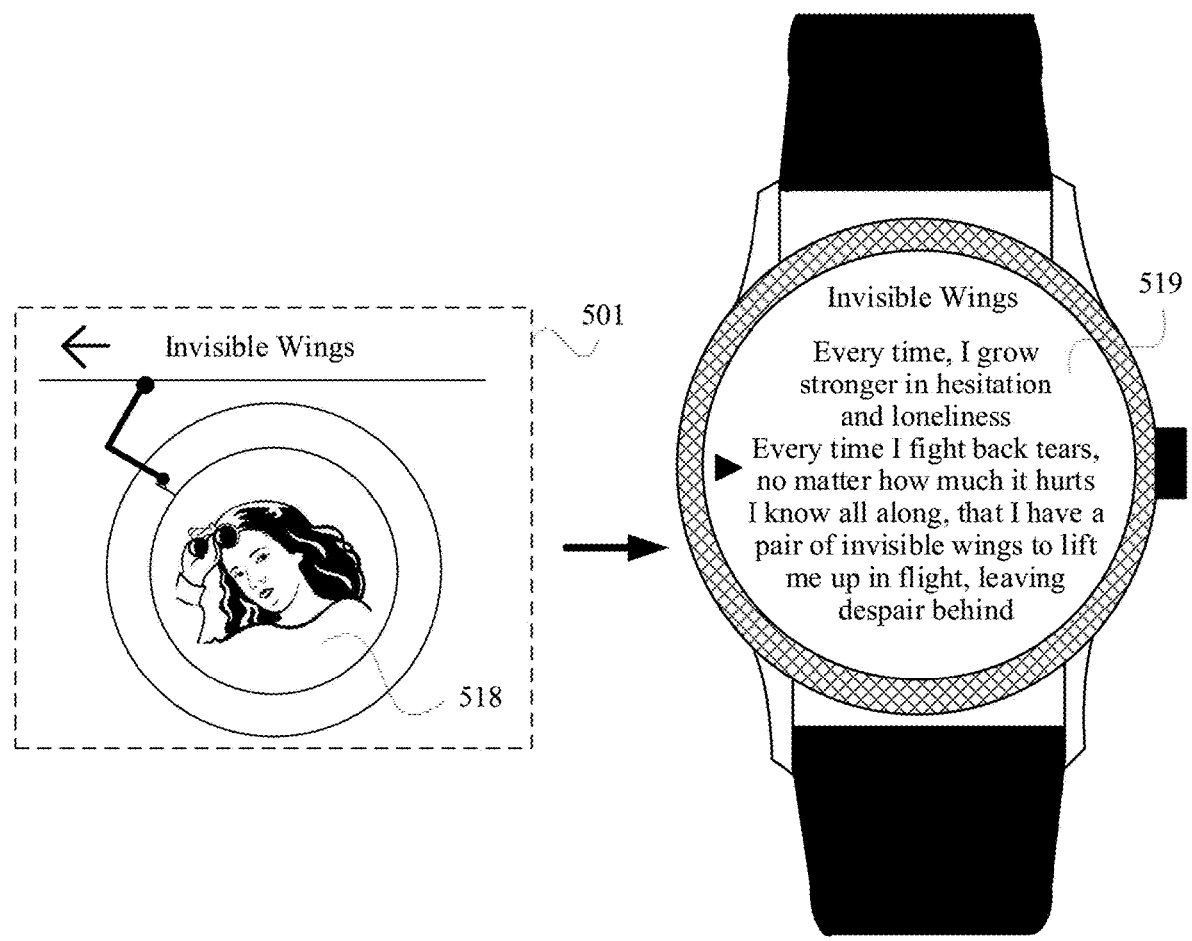

FIG. 5(a) to FIG. 5(d) are schematic diagrams of an example of a graphical user interface used to display a UI component according to an embodiment of this application. In this application, a mobile phone is used as a source device, and a Music application of the mobile phone is used as an example to describe in detail a method for displaying a UI component according to this application. As shown in FIG. 5(a), a plurality of function controls included in a play interface 309 of the Music application of the mobile phone are divided into three function areas, for example, a function area 501, a function area 502, and a function area 503 shown in FIG. 5(a). As shown in FIG. 5(c), function controls in the function area 501 may include an area in which a Song Name display control 504, a Return control 505, and a Lyric display control 515 are located. Function controls in the function area 502 may include an area in which a Download control 506, a Share control 507, a Volume Adjustment control 508, and a Song Details control 509 are located. Function controls in the function area 503 may include a Loop Setting control 510, a Previous Song selection control 511, a Playing control 512, a Next Song selection control 513, and a Favorites control 514.

The mobile phone is used as the source device, and a smartwatch is used as a destination device. According to a method for displaying a UI component by using a UI component provided in this application, any one or more function controls of the play interface 309 of the Music application of the mobile phone may be combined into an independent operation interface, to display on an output device (for example, a display) of the smartwatch. Alternatively, all function controls in any one of the function area 501, the function area 502, and the function area 503 of the play interface 309 of the music application of the mobile phone are combined into one independent operation interface, to display on an output device of the smartwatch.

For example, as shown in FIG. 5(b), the function controls included in the function area 503 of the play interface 309 of the Music application of the mobile phone is displayed on a smartwatch end, and a display interface 516 of the smartwatch end may include all the function controls in the function area 503. In descriptions of this embodiment of this application, a combination of all function controls displayed on a destination device end is referred to as an "atomization component". For example, if the function area 503 is displayed on the display interface of the smartwatch, a combination of all the function controls included in the function area 503 is an example of an atomization component. A display area of the atomization component on the smartwatch is referred to as an atomization component display area.

Optionally, in addition to displaying the combination of all the function controls included in the function area 503, the display interface 516 at the smartwatch end may further include a display area of a name of a song that is being played by the Music application of the mobile phone, that is, the Song Name display control 504.

In a possible implementation, in a process in which all the function controls in the function area 503 are displayed on the destination device, an electronic device may perform different combination and arrangement based on a size of the display interface of the destination device and a shape of the display interface of the destination device. For example, in this embodiment of this application, the display interface of the smartwatch is smaller than the display interface of the mobile phone, namely, the source device, and the display interface of the smartwatch usually presents as a circle. All the function controls in the function area 503 may be presented in an arrangement manner on the display interface 516 shown in FIG. 5(b), and the controls are arranged clockwise. Alternatively, all the function controls in the function area 503 may be presented in an arrangement manner on a display interface 517 shown in FIG. 5(c), and the controls are arranged counterclockwise. A dashed-line box on each of display interfaces of the smartwatch in FIG. 5(b) and FIG. 5(c) is the atomization control display area 319 described above.

It should be understood that, in addition to the control arrangement manners shown in the figure, there may be different arrangement manners. Alternatively, a function control may be dragged according to a user's intention, for example, the user long presses and drags a function control to a target area. An arrangement manner of the function controls on the display interface of the destination device and a manner of changing a display position of the function controls are not limited in this application.

It should be further understood that, in the foregoing embodiment, a display process from the source device to the destination device is described by using the function area 503 including a plurality of function controls as an example. In addition, any function control in the play interface 309 of the Music application of the mobile phone may be separately displayed on the display interface of the smartwatch, for example, a display interface 519 shown in FIG. 5(d). The display interface of the smartwatch end may display only the Lyric display area 515. A quantity and types of function controls displayed on the display interface of the destination device are not limited in this application.

According to the foregoing method for displaying the UI component by using the UI component, some functions of an application service of the source device may be separated as an independent operation interface, and the operation UI component is displayed at the destination device end. In a scenario in which the user is inconvenient to use the source device but the destination device, application operation or control is more convenient. This improves user experience.

In a possible implementation, a plurality of function controls of a plurality of application services of the source device may be combined to form an operation interface that integrates the plurality of function controls, and the operation UI component is displayed at the destination device end.

Figure 6:
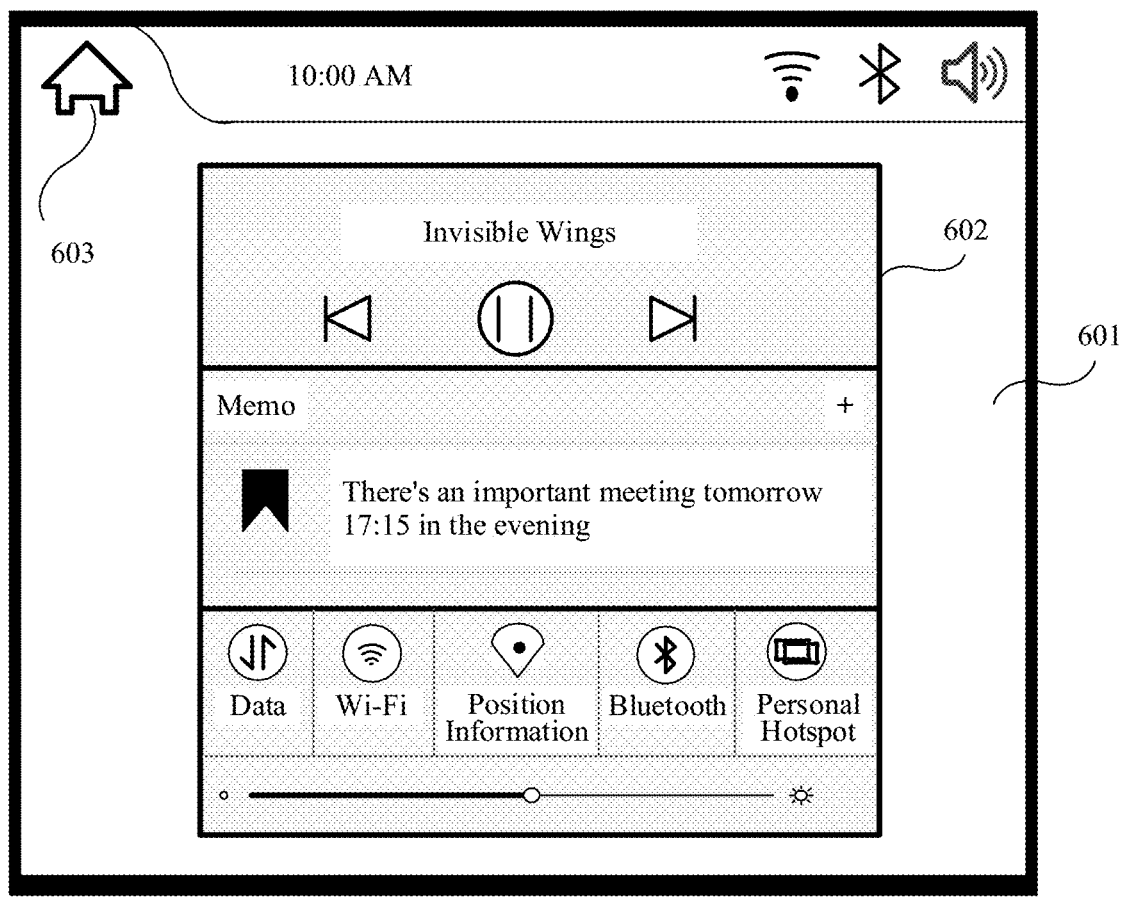
FIG. 6 is a schematic diagram of an example of a combination of a plurality of function controls of a plurality of application services according to an embodiment of this application.

As an example instead of a limitation, FIG. 6 is a schematic diagram of an example of a combination of the plurality of function controls of the plurality of application services according to an embodiment of this application. A mobile phone is used as the source device, and a control panel of a vehicle-mounted terminal is used as the destination device. As shown in FIG. 6, the control panel 601 of the vehicle-mounted terminal displays the combination of some function controls of a Music application, a Memo application, and a Setting management application of the mobile phone on an operation interface 602. It should be understood that, a size and a shape of a display interface of the destination device may be considered in the method. For example, the control panel of the vehicle-mounted terminal is usually larger than a display interface of the mobile phone.

Specifically, as shown in FIG. 6, the operation interface 602 may include a Previous Song selection control, a Playing control, a Next Song selection control that are of the Music application on the mobile phone; a Reminder Item recorded by the Memo application and a Memo addition control; and a Data Network control, a Wi-Fi control, and a Position Information control, a Bluetooth control, a Personal Hotspot, and a brightness adjustment control that are of the Setting management application. In other words, the function controls in the operation interface 602 may come from a same application, or different applications, and may be freely combined. It should be understood that a type and a quantity of applications included in the operation interface 602 and a type and a quantity of function controls in each application are not limited in this application.

It should be further understood that a position area in which a function control of each application on the operation interface 602 is located may be adjusted based on user's habit, and a shape and a size of the operation interface 602 may also be changed based on user's adjustment. Optionally, when a user does not set the shape and the size of the operation interface, a system may consider by default that the shape and the size of the operation interface 602 are displayed based on previous setting of the user, or perform scaling at a same ratio based on the shape and the size of the display interface of the destination device to form the operation interface 602.

For example, in FIG. 5(a) to FIG. 5(d), when the Music application of the mobile phone is displayed on the smartwatch, the operation interface may be similar to the display interface of the smartwatch and present a circle. In FIG. 6, when the Music application of the mobile phone is displayed on the control panel of the vehicle-mounted terminal, an area presented by function controls of the Music application on the operation interface may be similar to the display interface of the control panel of the vehicle-mounted terminal and present a rectangle. This is not limited in this application.

The method for displaying the UI component by using the UI component shown in FIG. 5(a) to FIG. 5(d) and the method for displaying a UI component by using the UI component shown in FIG. 6 are described by using an example from the source device to the destination device. It should be understood that the foregoing method for displaying the shared UI component may be applied to a plurality of terminal devices. For example, an operation interface of an atomization component formed by combining some function controls of a plurality of applications of a mobile phone is simultaneously displayed on a smartwatch and a control panel of a vehicle-mounted terminal. A quantity of terminal devices in a process of displaying the UI component is not limited in this application.

According to a method for displaying a UI component provided in embodiments of this application, a display mode of an inherent interface of the application may be changed. The inherent interface of the application is partially split, and transmitted between the plurality of terminal devices. In the method, the user can view functions of the plurality of applications on one interface, and the user is supported to perform operations on the plurality of applications at the same time. In addition, the split interface can adapt to a plurality of display screen sizes of the terminal devices, to implement more perfect display and improve user experience.

According to the descriptions of the foregoing embodiments, the UI component is displayed from the source device to the destination device. For any method for displaying the UI component by using the UI component described above, the operation interface is displayed on the destination device. According to the method for displaying a UI component by using the UI component provided in embodiments of this application, the user may perform an operation on the operation interface at the destination device end. The operation result may be transferred to the source device end, to ensure operation consistency between the destination device and the source device. Therefore, an execution process of the application of the source device is controlled on the operation interface of the destination device.

Figure 7A:
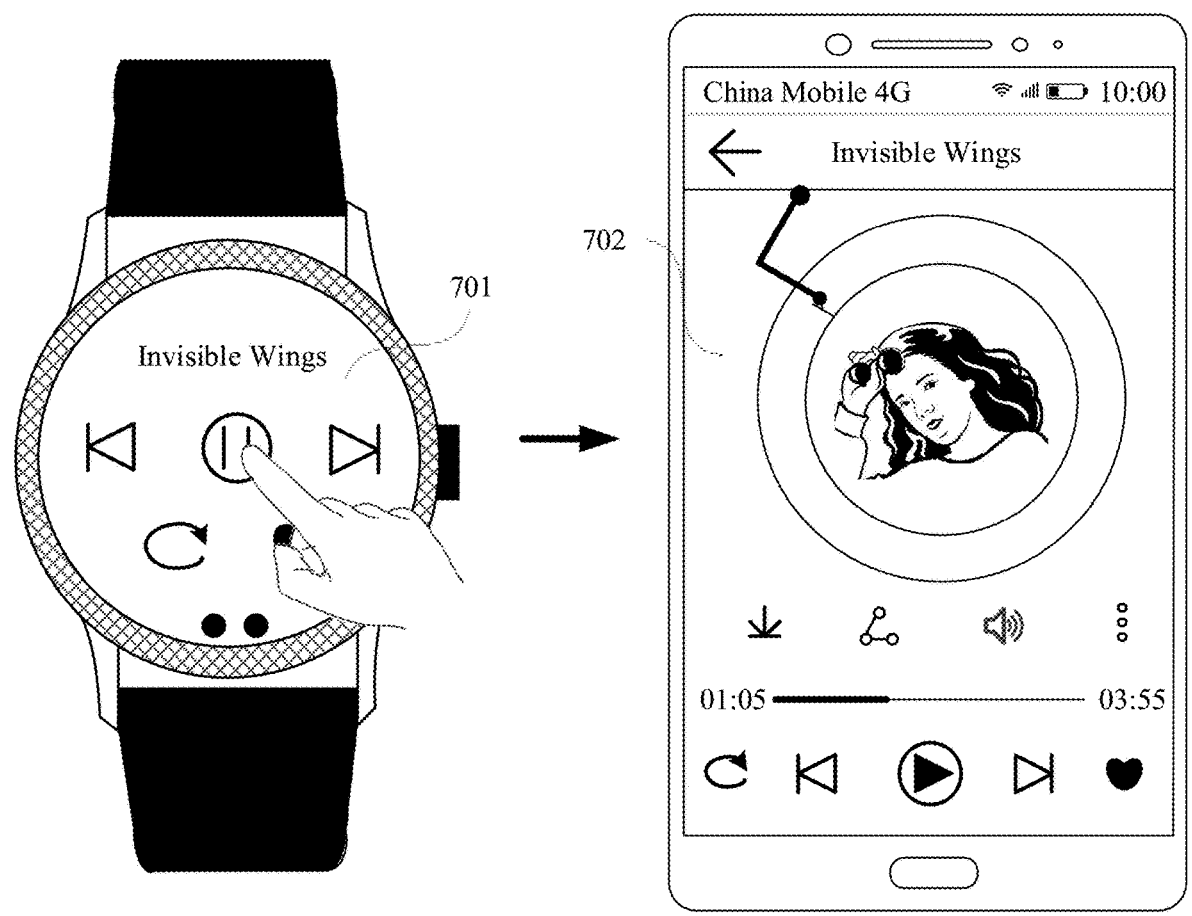
FIG. 7(a) and FIG. 7(b) are schematic diagrams of an example of a display interface of a destination device according to an embodiment of this application.
Figure 7B:
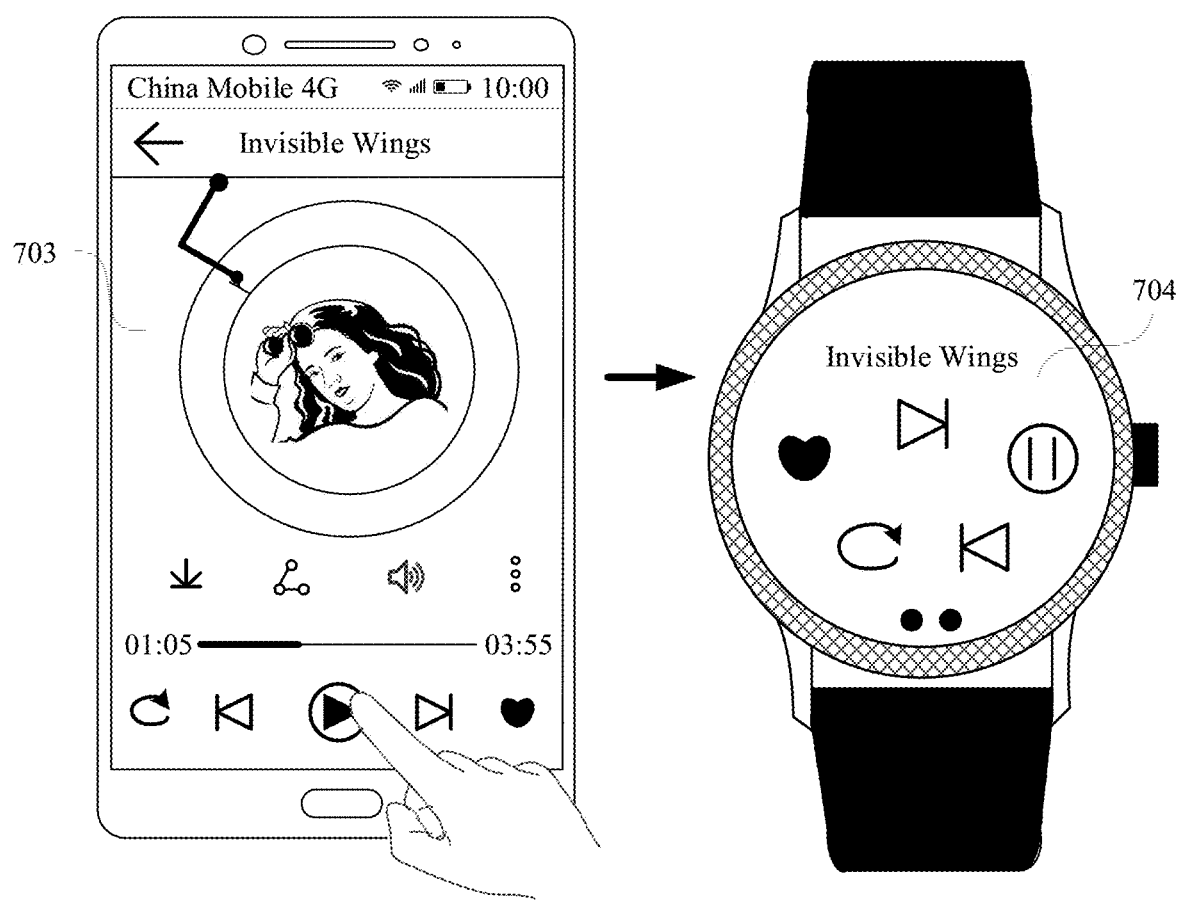

FIG. 7(a) and FIG. 7(b) are schematic diagrams of an example of operation sharing according to an embodiment of this application. FIG. 7(a) shows an operation interface 701, of some function controls of a Music application of a mobile phone, presented on a smartwatch. When music on the mobile phone is being played, a user performs an operation shown in FIG. 7(a). The operation may include an operation that the user taps a Playing control of the Music application. In response to the tap operation of the user, the Playing control of the Music application on the operation interface 701 of the smartwatch presents a stop state. Correspondingly, a Playing interface 702 of the music of the mobile phone also stops playing.

When the Playing control of a music play interface 703 of the mobile phone presents a playing top state, the user performs an operation shown in FIG. 7(b). The operation may include a tap operation performed by the user on the Playing control of the Music application. In response to the tap operation of the user, the Playing control in the play interface 703 of the Music application of the mobile phone changes to a playing state. Correspondingly, the Playing control of the Music application in the operation interface 701 of the smartwatch also changes to a playing state.

It should be understood that the foregoing uses an example in which the Music application of the mobile phone is displayed at a smartwatch end, to describe a case in which the user may perform a corresponding operation at a mobile phone end and the smartwatch end, to control the Music application. Likewise, for the operation interface 602 formed by combining the plurality of function controls of the plurality of applications in FIG. 6, the user may perform an operation on any function control in the operation interface 402 on the control panel of the vehicle-mounted terminal, and may transfer the operation result to the mobile phone end, to correspondingly control the application of the mobile phone.

According to the foregoing solution, a display mode of an inherent interface of an application may be changed in a process of displaying the UI component from the source device to the destination device. The inherent interface of the application is partially split, and transmitted between a plurality of terminal devices. In the method, the user can view functions of a plurality of applications on one interface, and the user is supported to perform operations on the plurality of applications at the same time. The user can perform an operation on an operation interface at a destination device end. An operation result is transmitted to the source device for execution, to ensure operation consistency between the source device and the destination device. In addition, the split interface can adapt to a plurality of display screen sizes of the terminal devices, to implement more perfect display and improve user experience. For example, during housekeeping or cooking, it is inconvenient to use a mobile phone to change music that is being played or set a play mode, but can set to display some function controls of a music application of the mobile phone on an output device of a smartwatch. The user may tap a control such as Next on the output device of the smartwatch to change the song that is being played, or tap a Stop control to stop music playing. This greatly facilitates use of the user. Various possible application scenarios are not limited in this application.

When a display interface of the destination device is smaller than a display interface of the source device, all display interfaces of the destination device may be used to display a combination of function controls. For example, when the display interface of the smartwatch displays all the function controls in the function area 503 of the Music application of the mobile phone, an original display interface of the smartwatch and a currently displayed interface of function controls of the mobile phone may be different display interfaces, that is, a display interface in which the atomization component is located is an independent display interface of the destination device. If the user needs to switch to the original display interface of the smartwatch, a specific switching operation needs to be performed.

Figure 8A:
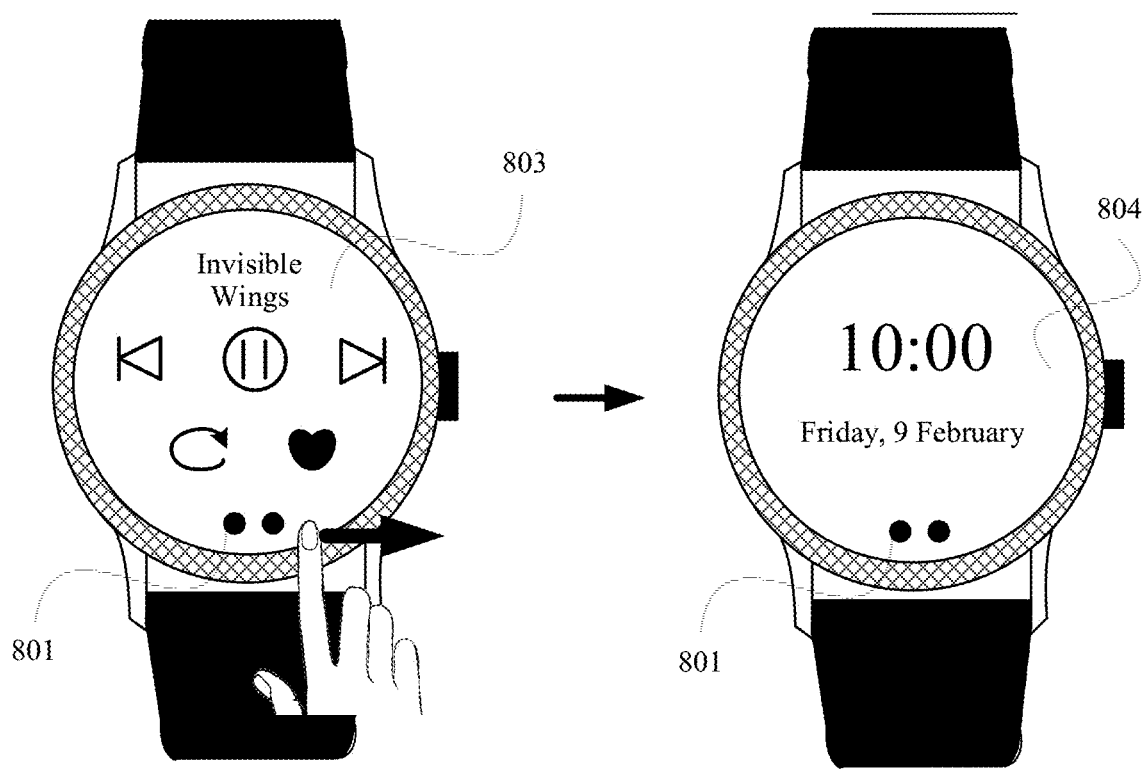
FIG. 8(a) and FIG. 8(b) are flowcharts of an example of a method for displaying a UI component of a source device on a destination device according to an embodiment of this application.
Figure 8B:
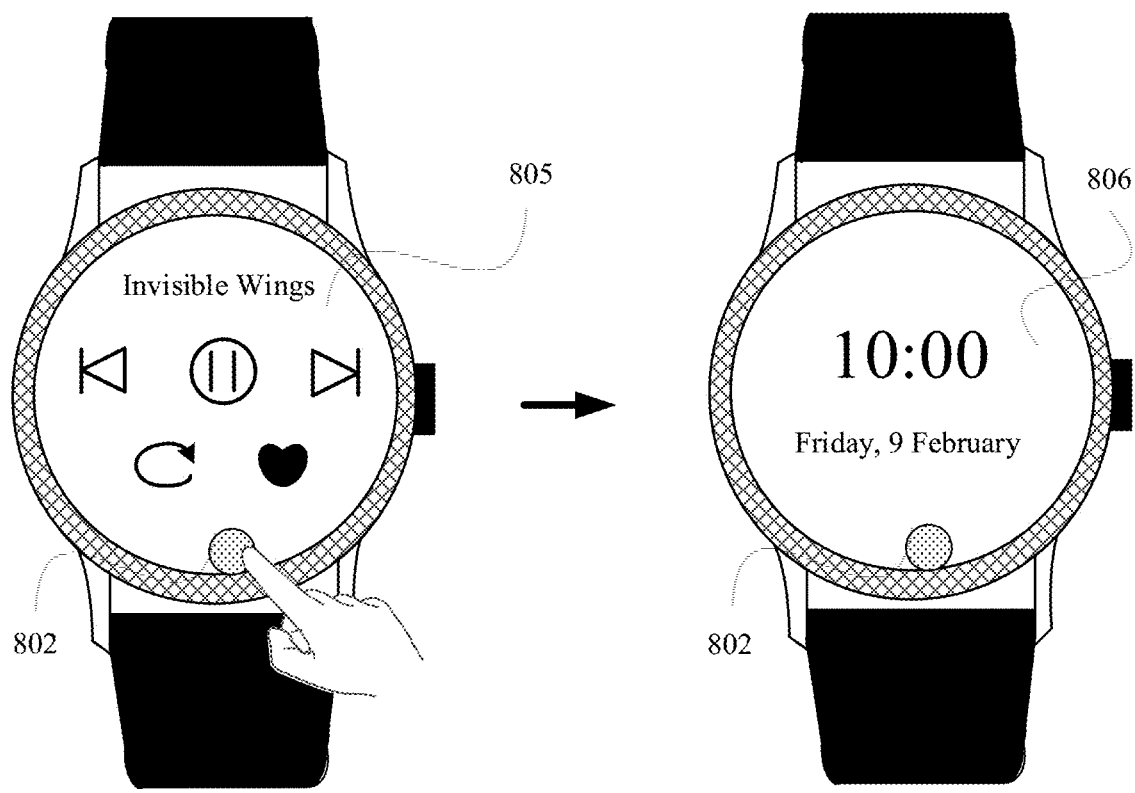

FIG. 8(a) and FIG. 8(b) are schematic diagrams of an example of interface switching according to an embodiment of this application. In a possible implementation, an interface of a destination device may be switched by sliding the screen by a user.

For example, as shown in FIG. 8(a), a display interface 803 of a smartwatch includes a switching control 801 used to switch the display interface. The user performs an operation shown in FIG. 8(a). The operation may include a sliding operation performed by the user on the display interface 803 of the smartwatch. In response to the sliding operation of the user, the display interface 803 of the smartwatch is switched to a home screen 804 of the smartwatch. The home screen may be an interface that is shown in FIG. 8(a) and that is used to display a clock and a date.

It should be understood that, a direction of the sliding operation of the user in FIG. 8(a) is not limited in this embodiment of this application. For example, the display interface 803 may be switched to the home screen 804 of the smartwatch through either left sliding or right sliding. This is not limited in this application.

Alternatively, as shown in FIG. 8(b), a display interface 805 of the smartwatch includes a floating control 802 used to switch the display interface. The user performs an operation shown in FIG. 8(b). The operation may include a tap operation performed by the user on the floating control 802 on the display interface 805 of the smartwatch. In response to the tap operation of the user, the display interface 805 of the smartwatch is switched to a home screen 806 of the smartwatch. The home screen may be an interface that is shown in the home screen 806 and that is used to display a clock and a date.

It should be understood that, in FIG. 8(b), the operation of tapping the floating control 802 by the user may implement back and forth switching between the display interface 805 of the smartwatch and the home screen 806 of the smartwatch. For example, when the smartwatch presents the display interface 805, the user may tap the floating control 802 to switch to the home screen 806 of the smartwatch. Likewise, when the smartwatch presents the home screen 806, the user may tap the floating control 802 to switch to the display interface 805 of the smartwatch.

It should be further understood that the foregoing enumerated home screen 806 of the smartwatch may further include other display content. In addition, there may be another interface switching manner. This is not limited in this application.

The foregoing method for displaying the UI component by using the UI component may provide many conveniences for the user. For example, in a scenario in which a mobile phone plays music, in many cases, after the music is played, the mobile phone of a user may not be around the user. For example, in different scenarios such as when the user is running or is cooking and cleaning, the user cannot conveniently control operations such as music playing, stop, next song, and adding to favorites by using a function control of the Music application of the mobile phone. However, if the music can be controlled by performing an operation on the smartwatch, much high convenience can be provided for the user. This brings good user experience. However, because a display interface of the smartwatch is small, the smartwatch cannot display all the interface of the Music application. There are several common music operations, and the smartwatch does not need to display the complete music interface either. A method for displaying the UI component by using the UI component provided in this application can perfectly resolve a problem in this application scenario. Some function controls of the Music application are displayed at a smartwatch end. The user can control playing, stop, next song, favorites and the like of the music on the mobile phone by using the operation on the smartwatch. This provides a portable service, facilitates a user operation, and improves user experience.

In a possible implementation, the size of the atomization component display area may be adjusted based on a display screen size of the destination device.

Figure 9A:
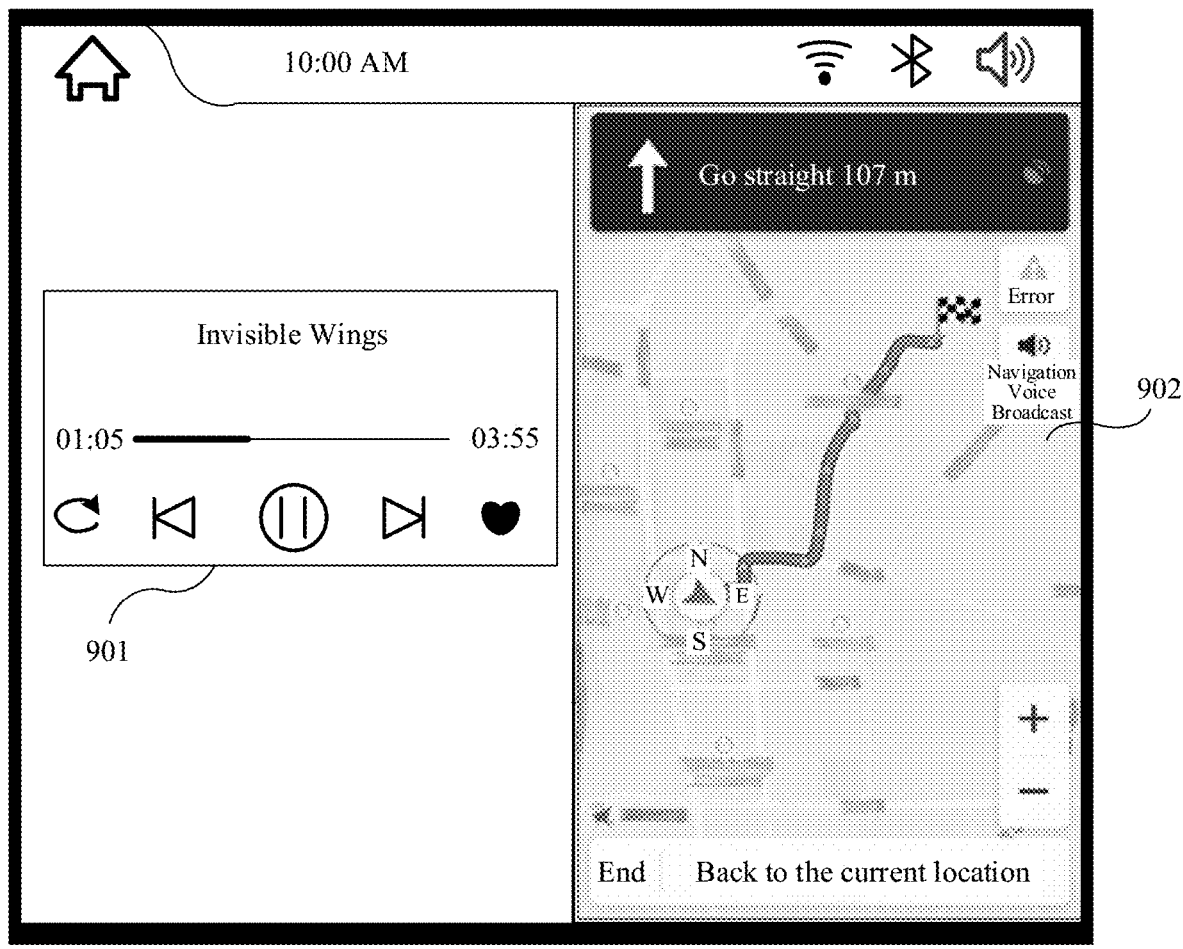
FIG. 9(a) and FIG. 9(b) are schematic diagrams of an example of a display interface of a destination device according to an embodiment of this application.
Figure 9B:
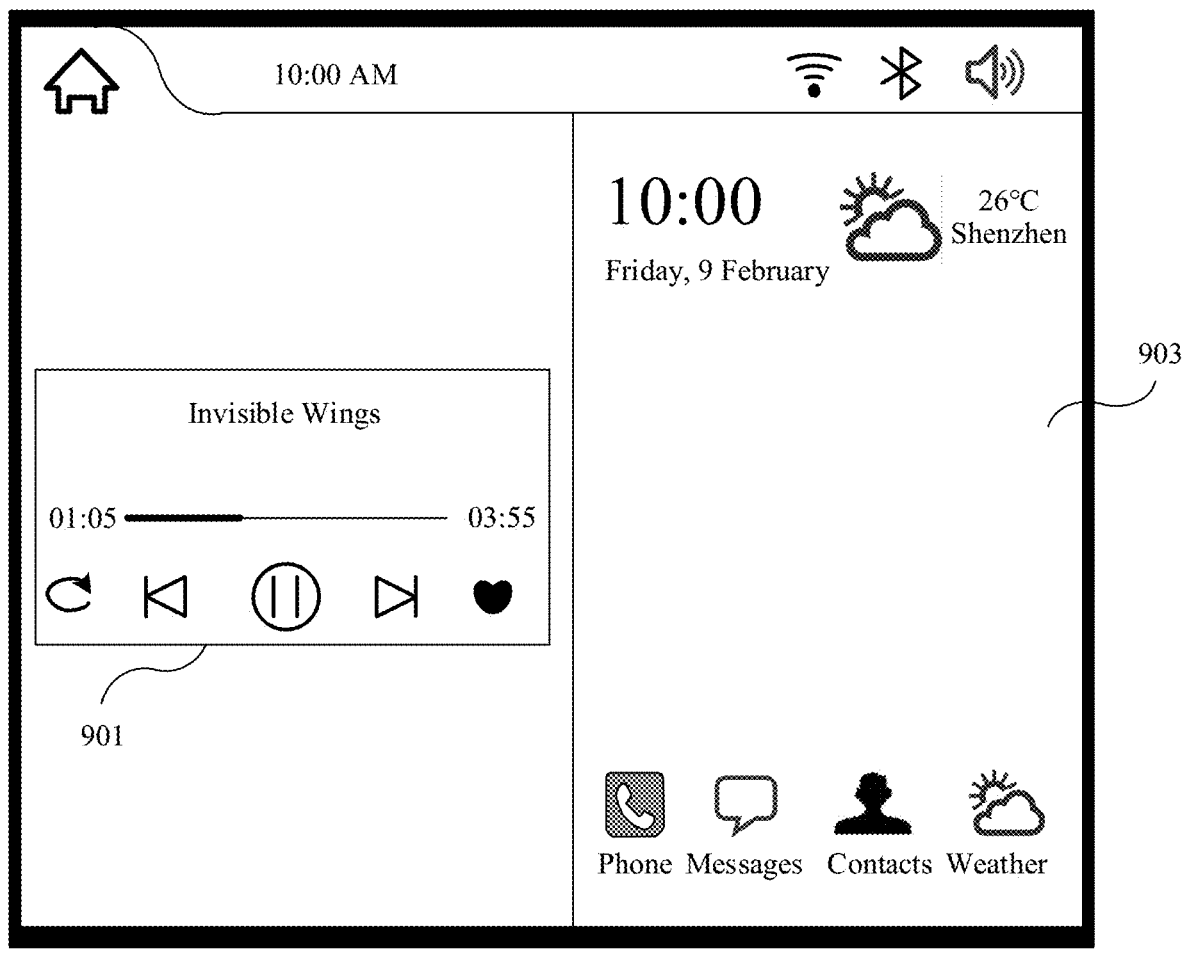

FIG. 9(a) and FIG. 9(b) are schematic diagrams of an example of a display interface of a destination device according to an embodiment of this application. A mobile phone is used as a source device, and a control panel of a vehicle-mounted terminal is used as the destination device. An area of the control panel of the vehicle-mounted terminal is usually greater than an area of a display interface of the mobile phone. As shown in FIG. 9(a), an atomization component display box 901 of a Music application of the mobile phone may be scaled, and only occupies a part of the area of the control panel of the vehicle-mounted terminal.

Optionally, another area of the control panel of the vehicle-mounted terminal may simultaneously display an application of a vehicle-mounted system, for example, a vehicle-mounted navigation interface 902 in FIG. 9(a), or another area of the control panel of the vehicle-mounted terminal may simultaneously display another interface of the mobile phone, for example, a home screen 903 of the mobile phone in FIG. 9(b), or a display interface of another application of the mobile phone. This is not limited in this application.

A method for displaying a UI component by using the UI component provided in this application is described with reference to the accompanying drawings. In the method, a part of the original application interface of the source device may be split into different function controls or a combination of a plurality of function controls. The different function controls or the combination of the plurality of function controls are or is used to generate a new operation interface. The operation interface may be displayed on the another destination device. An operation is performed on any function control included in the operation interface of the destination device, and an operation result is transmitted to the source device for execution, to ensure operation consistency between the source device and the destination device. In the method, a user interface and a service can be freely transmitted between the plurality of terminal devices; a bottleneck between different devices is broken; and the original application interface is partially split, and transmitted between the plurality of terminal devices. The split interface can more easily adapt to a plurality of screen sizes of the terminals and achieve more perfect display. The new operation interface displayed at the destination device end may include function controls of a same application or function controls of different applications. This breaks a boundary between different applications, so that the user can view the functions of the plurality of applications on one interface, and perform the operations on the plurality of applications at the same time. Therefore, all operations are transmitted to an original application service of the source device. The user may control the application service on both the source device and the destination device at the same time. This facilitates use and improves user experience.

The foregoing describes in detail the man-machine interaction embodiments of this application with reference to FIG. 3(a) to FIG. 9(b). To better understand a method for displaying a UI component provided in this application, the following describes a specific implementation process.

Figure 10:
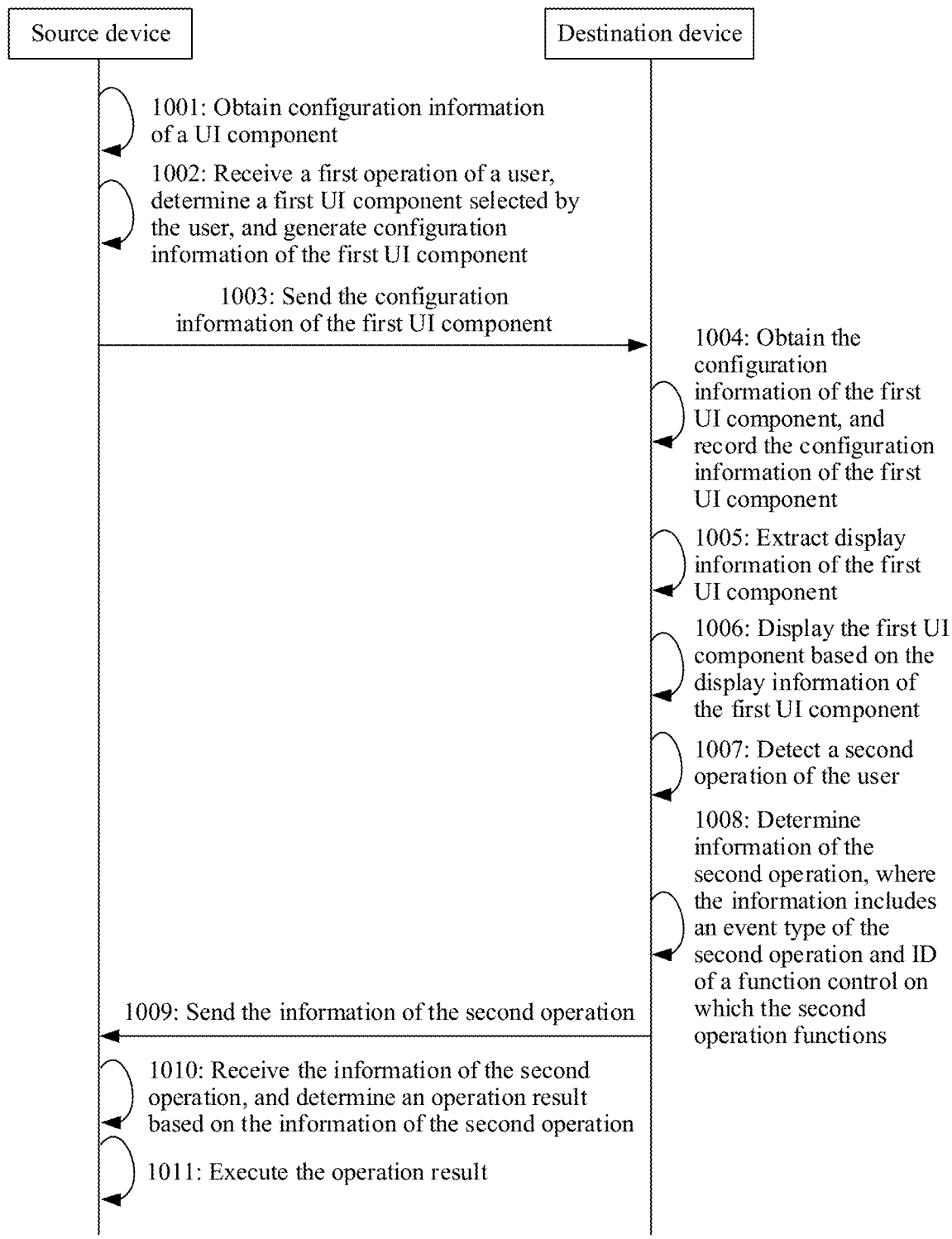
FIG. 10 is a schematic interaction diagram of displaying a UI component between a source device and a destination device according to an embodiment of this application.

From a perspective of a source device and a destination device, FIG. 10 is a schematic interaction diagram of displaying a UI component between the source device and the destination device according to an embodiment of this application. An interaction process includes the following content.

S1001: The source device obtains configuration information of the UI component.

For example, the configuration information of the UI component includes configuration information of each function control in the UI component. The configuration information of each function control may include information such as a name, a function, and an identifier ID of the function control.

Optionally, the configuration information of each function control may further include position information of the function control on a display interface of the source device, for example, coordinate information of a start point in an upper left corner of the function control, and a display width and a display height of the function control.

Optionally, the configuration information of each function control further includes information used to identify whether the function control supports displaying on the destination device.

The source device obtains the foregoing information of each function control. The source device extracts the foregoing information of each function control in the UI component in a process of generating the UI component, to display the UI component on the destination device.

It should be understood that a process of S1001 may be in a development process of an application, or when the source device installs the application, the source device may obtain configuration information of a limited quantity of function controls included in the application, and configuration information of a plurality of UI components formed by different combinations of different quantities of function controls. This is not limited in this application.

For example, when a user installs a Music application, the source device may obtain configuration information of all limited function controls of the Music application and configuration information of a plurality of UI components formed by different combinations of different quantities of function controls. Alternatively, when the user performs the operation shown in FIG. 3(k), and selects three function controls, a mobile phone may obtain configuration information of the three function controls to register a first UI component.

S1002: The source device receives a first operation of a user, determines a first UI component selected by the user, and generates configuration information of the first UI component.

For example, the user selects some function controls shown in FIG. 3(k) to form the first UI component, and the source device may obtain the configuration information of the first UI component. The first operation is an operation that the user selects the first UI component to be displayed on the first interface.

For another example, as shown in FIG. 4(h), FIG. 4(i), and FIG. 4(k), the user selects the first UI component from the list with the plurality of UI components of the first application. The first operation is an operation that the user selects the first UI component from the UI component list.

It can be learned from S1001 that the configuration information of the first UI component may be generated in the development process of the application, and the source device obtains the configuration information of the first component after receiving a selection operation of the user. Alternatively, after the user selects the three function controls, the source device separately extracts configuration information of the three function controls, and generates the configuration information of the first UI component based on configuration information of the three function controls.

S1003: The source device sends the configuration information of the first UI component to the destination device. When the user determines to enable a UI component display function provided in this application and determines the destination device, for example, when the selected destination device is the smartwatch described in FIG. 3(a) to FIG. 3(i), FIG. 3(k), FIG. 3(m) and FIG. 3(n), the source device sends the obtained configuration information of the first UI component to the destination device.

S1004: The destination device obtains the configuration information of the first UI component, and records the configuration information of the first UI component.

S1005: The destination device extracts display information of the first UI component based on the configuration information of the first UI component.

S1006: Display the first UI component based on the display information of the first UI component.

The destination device determines the display information of the first UI component based on the configuration information of the first UI component, for example, the display information includes a type and a quantity of displayed function controls, a display size, arrangement of the function controls, a screen size, and the like; and then displays the first UI component on an output interface of the destination device based on the display information. In the foregoing process, the first UI component that is formed by the three function controls, of the Music application, selected by the user and that is shown in FIG. 3(k) may be displayed on the display interface of the smartwatch.

In a process of displaying the first UI component from the source device to the destination device, the display information of the first UI component needs to be determined, for example, a display size and a display position of the first UI component. In this application, the size and the position of the first UI component displayed on the interface of the destination device may be set in different manners.

Manner 1

The display information of the first UI component is generated at a source device end.

Specifically, this application provides a software development kit (SDK), so that an application developer may generate a configuration file of the first UI component by using a setting interface provided in a development process of a source application. Content and a related sequence that may be included in the configuration file may be expressed as:

```
"name": "runButton" (Name of a function control)
"ID": -1221681311_t_", (ID of a function control)
"src":{
"left": 414, (Start pixel in an upper left corner)
"top": 1971, (Pixel at top of a vertex)
"width": 252, (Pixel of a display width)
"heght": 252, (Pixel of a display height)
},
"dest": {(Destination device)
"left": 10, (Start pixel in an upper left corner of a display interface of a destination device)
"top": 10 (Pixel at top of a vertex of a display interface of a destination device)
"width": 10, (Pixel of a display width of a display interface of a destination device)
"heght": 10, (Pixel of a display height of a display interface of a destination device)
},
"translationx": 50, (Translation pixel in an x direction on a display interface of a destination device)
"translationy": 0, (Translation pixel in a y direction on a display interface of a destination device)
"scalex": 1.0, (Scaling pixel in an x direction on a display interface of a destination device)
"scaley": 1.0, (Scaling pixel value in a y direction on a display interface of a destination device)
"rotatedegree": -90, (Rotation angle on a display interface of a destination device)
"clipSize": 0, (Name of a function control)
"canTouch": true (whether to be touched)
},
```

The content of the configuration file is not described here.

In Manner 1, the content of the configuration file may be used as the configuration information, and is sent by the source device to the destination device. The destination device obtains content of the "dest" part, and can determine how to display the first UI component on the display interface of the destination device.

Manner 2

The display information of the first UI component is determined at a destination device end.

Specifically, the source device sends the configuration information of the first UI component to the destination device. The configuration information may not include the "dest" part. In other words, the destination device may obtain a display status of function controls in the first UI component on an application interface of the source device. Then, the destination device scales the first UI component based on a size of the display interface of the destination device, and displays all the function controls in the first UI component.

When the first UI component is displayed on the destination device, all the function controls may be arranged based on a shape and the size of the display interface of the destination device, for example, related descriptions in FIG. 5(a) to FIG. 5(d). Details are not described herein again.

S1007: The destination device detects a second operation of the user.

S1008: The destination device determines operation information of the second operation, where the information includes an event type of the second operation and ID of a function control on which the second operation functions.

S1009: The destination device sends the operation information of the second operation to the source device.

S1010: The source device receives the operation information of the second operation sent by the destination device, and determines an operation result based on the operation information of the second operation.

S1011: The source device executes the operation result.

S1007 to S1010 is a process in which after the first UI component is displayed on the display interface of the smartwatch, an operation of the user may be received on the display interface of the smartwatch, and the operation result is sent to the mobile phone, to control music playing of the mobile phone from the display interface of the smartwatch. This implements operation synchronization between the mobile phone and the watch. For example, refer to the process in FIG. 7(a) and FIG. 7(b).

In a specific implementation process, a method for displaying a UI component by using the UI component provided in this application may be implemented based on collaboration of three modules. Specifically, the three modules include a UI component registration management module, a service management module, and a UI component display module.

1. UI Component Registration Management Module

The UI component registration management module is located in an application of the source device, and is responsible for registration and management of the UI component and final execution of remote invocation.

Registration of the UI component indicates that the source device determines each function control included in the first UI component selected by the user. Specifically, the source device may know configuration information of a limited quantity of function controls of an application, for example, information such as a name, a function, position information on an original display interface, a display size, and a type of each function control. In addition, the configuration information of each function control further includes information used to identify whether the function control supports displaying on the destination device. The source device may obtain configuration information of one or more function controls based on the one or more function controls selected by the user, and the source device records the one or more function controls selected by the user as the first UI component.

Management of the UI component indicates that after the source device receives the one or more function controls selected by the user, the UI component registration management module may obtain the configuration information of the one or more function controls. For example, if a user selects three function controls of a Music application, the UI component registration management module may invoke configuration information of the three function controls. When a combination of the three function controls is already recorded as the first UI component, the UI component registration management module may directly invoke the configuration information of the first UI component.

Remote invocation of the UI component may be understood as that after the first UI component is displayed on the display interface of the destination device, any function control in the first UI component may be operated on the destination device. When the destination device sends the operation result to the source device, the UI component registration management module of the source device executes the operation result.

Optionally, this application provides a set of SDK, so that the UI component can be registered and managed during development of a source application.

For example, the UI component registration management module of the Music application of the source device may obtain configuration information of a limited quantity of function controls in the Music application. For the first UI component generated by using the three function controls selected by the user, the software development kit SDK may be used to generate the configuration information of the first UI component, that is, obtain the configuration information of the three function controls selected by the user, and generate the configuration information of the first UI component based on the configuration information of the three function controls, to complete a registration process of the first UI component.

Specifically, the user selects the first UI component formed by the three function controls, and initiates a registration request for the first UI component to the UI component registration management module of the Music application of the source device. The UI component registration management module receives the registration request for the first UI component, extracts the configuration information of the three function controls of the Music application, and generates the configuration information of the first UI component. The configuration information of the first UI component may include information such as names, functions, position information on the original display interface, display sizes, and types of the three function controls included in the first UI component. Position information of a function control on an original display interface may include coordinate information of a start point in an upper left corner of the function control, a display width and a display height of the function control, and the like. In addition, the configuration information of each function control further includes information used to identify whether the function control supports displaying on the destination device.

The registration process of the first UI component is completed above. When developing an application, an application developer uses the SDK to set UI controls that can be used for projection in the application. For example, the SDK provides an XML configuration file to set the UI controls that can be used for projection in the configuration file. When the application developed by using the SDK is installed on a terminal device, an operating system of the terminal device may conveniently obtain, by using the configuration file, information about the UI controls that can be used for projection in the application.

At the same time, the SDK registers a broadcast receiver in the application. The broadcast receiver is configured to: listen to various broadcast commands sent by the service management module, and invoke internal logic of the module to send an update message of the UI component when the user needs to change the function controls included in the displayed UI component; and when the user needs to tap a function control on the output interface of the destination device, send an operation result of tapping the function control on the application to the source device, so as to finally perform a remote operation.

It should be understood that, the source device configured with the UI component registration management module may register a limited quantity of function controls included in all applications, and internally register one or more UI components. Each UI component includes one or more function controls of the application, or each UI component includes a set of user-defined function controls.

It should be further understood that the UI component registration management module may obtain information about some function controls in an inherent interface of an application. When the user selects the function controls to form the first UI component, the UI component registration module may register the configuration information of the first UI component based on the information about the selected function controls. For each UI component, the UI component registration management module may configure information such as a name, a function, a minimum display size, a maximum display size, and a type of the UI component. The foregoing information of each UI component is collectively referred to as configuration information of the UI component. In other words, configuration information of one UI component is used to determine information such as a name, a function, position information on an original display interface, a display size, and a type of each function control included in the UI component.

In a process of displaying the UI component on the destination device, the service management module may obtain the UI component and the configuration information of the UI component, to extract the display information of the UI component for displaying on the display interface of the destination device.

When the user needs to change, according to a current use requirement, a UI component displayed on the destination device, for example, when the user selects to display a Previous Song selection control, a Playing control, and a Next Song selection control on a smartwatch, the user also needs to display a Favorites control on the smartwatch. In this process, the UI component registration management module first obtains display information of the to-be-added Favorites control, obtains configuration information of the Favorites control, and sends the display information of the to-be-added Favorites control to the service management module. The service management module obtains the configuration information of the Favorites control, to form configuration information of a new UI component, and sends the configuration information of the new UI component to the destination device. The UI component display module of the destination device obtains display information of the new UI component, and displays the new UI component, to complete the process of updating the interface of the destination device.

When the user operates the UI component on the destination device, the UI component registration management module may receive an operation command sent by the service management module, and each application of the source device performs a final operation.

2. Service Management Module

The service management module is responsible for querying and managing registered UI components of all the applications, updates the configuration information of the UI component, and synchronously displays the UI component on the source device and the destination device. In addition, operation command information of the user on the destination device is transmitted to the source device, and the application of the source device executes the final operation, to ensure operation consistency between the source device and the destination device.

It should be understood that the service management module is located in a middle layer, and plays a role of connecting the UI component display module and the UI component registration management module. In an implementation process, the service management module may be located in a cloud server, or may be located in the source device or the destination device. This is not limited in this application.

Specifically, the service management module may obtain the registered UI component of the application, and obtained content may include the configuration information such as the name, the function, the minimum display size, the maximum display size, and the type of the UI component. In a process of obtaining the configuration information, the service management module sends a global broadcast after being started. After receiving the broadcast, the UI component registration management module sends the registered UI component and the configuration information to the service management module.

In addition, the service management module may update the display interface of the destination device. When the UI component of the source device changes, the component registration management module of the source device sends the configuration information of the new UI component to the service management module, and the service management module sends the updated configuration information of the UI component to the destination device. The destination device displays an interface of the new UI component based on the obtained updated configuration information of the UI component.

The service management module may further transfer the user operation information at the destination device end to the source device, so that the source device executes an operation instruction entered by the user on the destination device. When the user operates the function control in the UI component on the destination device, the operation information is sent by the component display module of the destination device to the service management module. The service management module sends the operation information to the UI component registration management module of the source device end, and the application of the source device performs the final operation.

It should be understood that there is a data center in the service management module, and the data center may record all registered UI components of one or more applications and configuration information of the UI components.

It should be further understood that, for each displayed UI component, the service management module creates a component manager submodule to manage behavior such as updating and an operation of the UI component. When the UI component is no longer displayed at the destination device end, the service management module suspends or hibernates the manager submodule to save system resources. When the UI component display module removes a UI component, the service management module destroys a manager submodule corresponding to the component.

3. UI Component Display Module

The UI component display module is in the destination device. The UI component display module is mainly configured to obtain the configuration information of the UI component from the service management module, select one or more required UI components, and display the selected UI components in a display module of the UI component display module. In addition, the UI component display module may receive an update command from the service management module, and update the display interface of the UI component. The UI component display module may also send various operation command information of the user to the service management module.

The UI component display module is further configured to display the UI component of the source device on the destination device, obtain, by using the service management module, all UI components that meet a requirement of a screen size of a current device, and provide the UI components for the user to select. After the user selects a to-be-displayed component, the UI component display module displays the UI component selected by the user, listens to and receives the update information provided by the service management module, and updates the display information of the UI component in real time. If the user operates the UI component displayed on the destination device, the UI component display module sends the operation command to the service management module. The service management module finally sends the operation command to the component registration management module of the source device, and the application of the source device performs the final operation.

Specifically, the UI component display module may display the one or more UI components based on the screen size of the destination device. In a specific display process, the UI component display module may obtain interface data of the UI component. The interface data may include a plurality of forms such as an extensible markup language (XML), a JavaScript object notation (JSON), and a domain-specific language (DSL). This is not limited in this application.

The UI component display module has an explanation execution interface generation submodule. The interface generation submodule can be configured to directly restore the interface data to the interface of the source device. When the interface is generated, the destination device may further change the interface of the source device to some extent based on the screen size of the destination device. For example, sorting from left to right is changed to sorting from top to bottom, or sorting from left to right is changed to clockwise or counterclockwise circular arrangement, for example, the display process from the mobile phone to the smartwatch shown in FIG. 3(a) to FIG. 3(i), FIG. 3(k), FIG. 3(m) and FIG. 3(n) and FIG. 5(a) to FIG. 5(d). In addition, the UI component display module may display one or more UI components at one time based on the screen size of the current destination device, or combine the UI components and display the UI components on the device screen at the same time. The combined UI components may be a function control combination from one application or a plurality of different applications.

In addition, after all the UI components are displayed on the destination device, operation types of the UI components on the source device can be retained. It should be understood that a tap operation and a long press operation may be performed on one function control in the UI component on the source device, and the tap operation and the long press operation may also be performed on the function control in the UI component on the destination device. If the function control does not accept the tap operation and the long press operation on the source device, the function control also does not accept the tap operation and the long press operation on the destination device.

In the update process of the UI component, the UI component display module needs to connect to the service management module, to receive an update status of the UI component in real time. Once receiving the update information of the UI component sent by the service management module, the UI component display module immediately updates display of the current UI component by using the information of the new UI component.

In an operation process of the UI component, when the user operates a function control in a UI component on the destination device, where the operation includes but is not limited to tapping, double tapping, long press, sliding up and down, and the like, the operation information is transmitted to the service management module. After receiving the operation information, the service management module transmits the operation information to the component registration management module of the source device, and the application of the source device finally executes the final operation. If the UI component is updated after execution, the display of the UI component on the destination device is also updated according to a UI component update policy in this update.

Figure 11A:
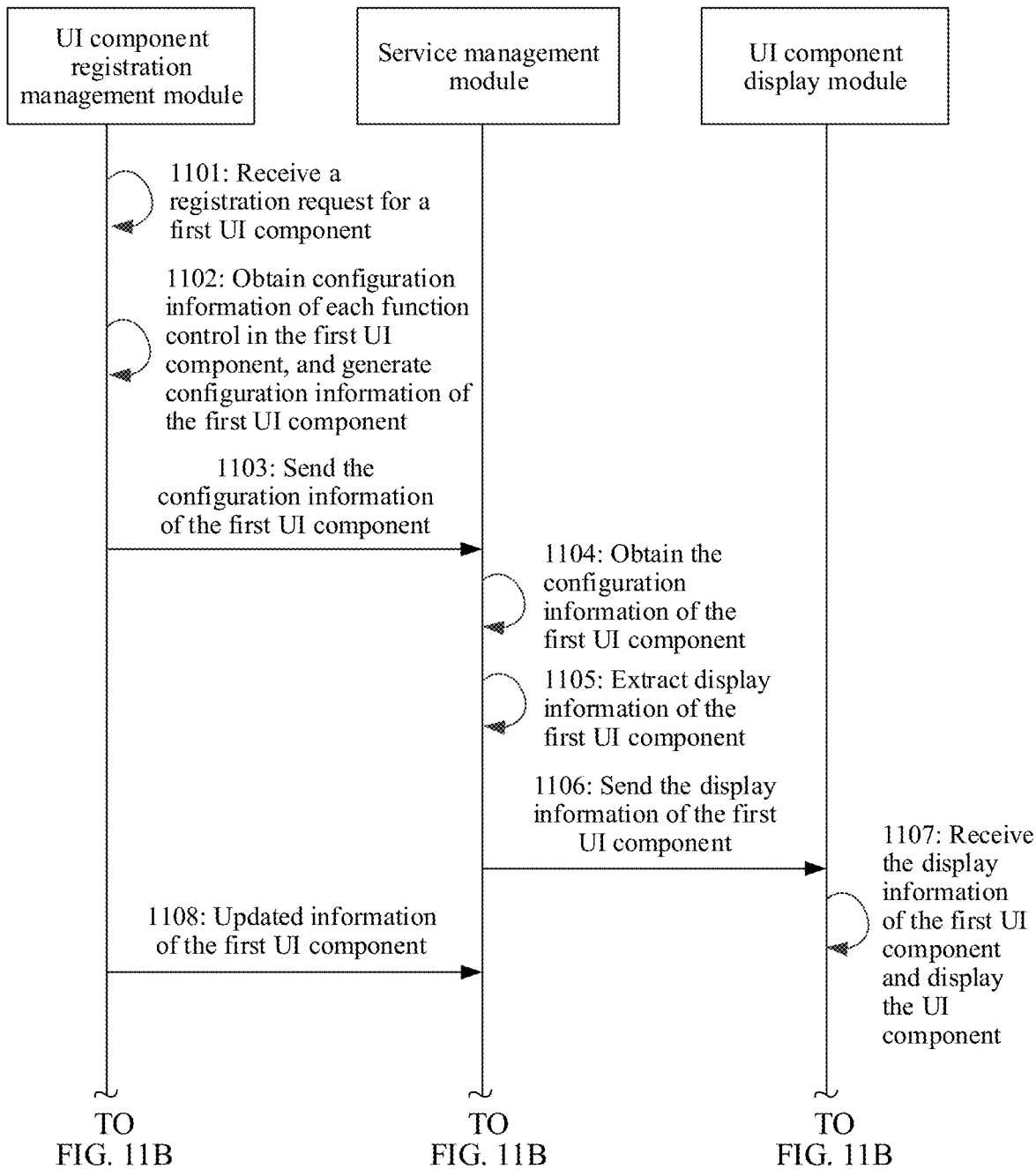
FIG. 11(a) and FIG. 11(b) are flowcharts of an example of performing a method for displaying a UI component according to an embodiment of this application.
Figure 11B:
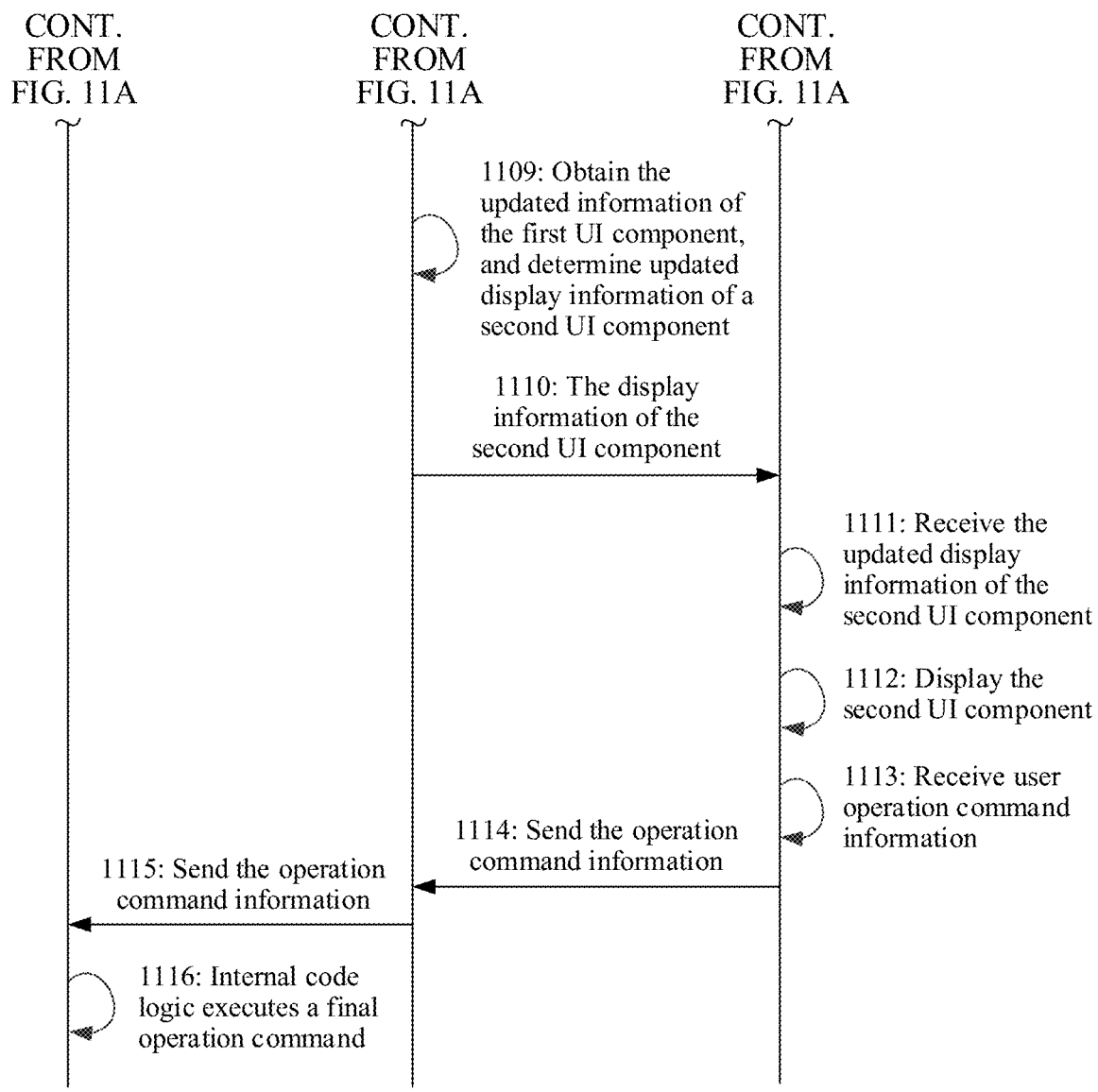

The foregoing describes three modules and functions of the three modules in the process of displaying the UI component on the source device by using the UI component on the destination device provided in this embodiment of this application. FIG. 11(a) and FIG. 11(b) are flowcharts of an example of performing a method for displaying a UI component on a source device by using a UI component on a destination device according to an embodiment of this application. With reference to the three modules described above, a display process of the UI component in the execution procedure shown in FIG. 11(a) and FIG. 11(b) may include the following content.

1101: The UI component registration management module receives a registration request for a first UI component of an application on a source device.

1102: The UI component registration management module generates configuration information of the first UI component based on the registration request for the first UI component.

For example, the configuration information of the first UI component includes configuration information of each function control in the first UI component. The configuration information of each function control may include information such as a name, a function, position information on an original display interface, a display size, and a type of the function control. The position information on the original display interface may include coordinate information of a start point in an upper left corner of the function control, a display width and a display height of the function control. In addition, the configuration information of each function control further includes information used to identify whether the function control supports displaying on the destination device. It should be understood that, in the related description of FIG. 10, the configuration information of the first UI component may be generated in the development process of the application. In other words, steps 1101 and 1102 have been completed in the development process of the application, and the configuration information of the first UI component is generated. Alternatively, when a user selects a plurality of function controls on an application running interface, the user initiates the registration request for the first UI component to the UI component registration management module. The UI component registration management module receives the registration request for the first UI component, extracts configuration information of the plurality of function controls included in the first UI component, and generates the configuration information of the first UI component. This is not limited in this application.

1103: The UI component registration management module sends the configuration information of the first UI component to the service management module.

1104: The service management module receives the configuration information of the first UI component sent by the UI component registration management module, and obtains the configuration information of the first UI component.

1105: The service management module extracts display information of the first UI component.

1106: The service management module sends the display information of the first UI component to the UI component display module.

1107: The UI component display module receives the display information of the first UI component, and displays the first UI component.

1108: The UI component registration management module obtains updated information of the first UI component, and sends the updated information of the first UI component to the service management module.

1109: The service management module obtains the updated information of the first UI component, and determines updated display information of a second UI component.

1110: The service management module sends the updated display information of the second UI component to the UI component display module of the destination device.

1111: The UI component display module receives the updated display information of the second UI component.

1112: The UI component display module displays the second UI component.

1113: The UI component display module receives user operation command information.

1114: The UI component display module sends the operation command information to the service management module.

1115: The service management module sends the operation command information to the UI component registration management module of the source device.

1116: An application of the source device executes a final operation command.

The foregoing steps 1101 to 1107 describe the display process of the UI component from the source device to the destination device, steps 1108 to 1112 describe an update process of the UI component, and steps 1113 to 1116 describe an operation process of the UI component.

In the operation process of the UI component in the foregoing steps 1113 to 1116, the destination device of the user operates the UI component. The destination device receives the user operation command information, and sends the operation command information to the service management module. Then, the service management module sends the operation command information to the UI component registration management module of the source application.

It should be understood that the operation command information transferred herein may include identifier (identification, ID) information of the function control operated by the user and a type of a touch event. In the display process of the UI component from the source device to the destination device, a first function control in the UI component has one piece of first ID information in the display interface of the source device, and also has one piece of second ID information in the display interface of the destination device. The two pieces of ID information of the first function control are unique and one-to-one mapped. When the user performs a touch operation on the first function control in the UI component of the destination device, for example, the foregoing enumerated tapping, long press, or sliding, the destination device may determine a type of the touch operation based on the touch operation of the user, generate touch event information of the first function control, transfer the first ID information and the touch event information to the UI component registration management module of the source device. When the second ID information corresponding to the first ID information is determined, the first function control of the source device is determined, and a result of the touch event is responded to on the first function control, to ensure operation consistency between the source device and the destination device.

It should be understood that implementations of all the foregoing procedures are established based on connection between the three modules. In other words, a method for displaying a UI component by using the UI component is based on a connection architecture established between the source device and the destination device. A plurality of networking manners are supported in this application. FIG. 12(a) to FIG. 12(d) are schematic diagrams of networking manners according to an embodiment of this application. The networking manners include but are not limited to the following enumerated networking manners.

Manner 1

Figure 12A:
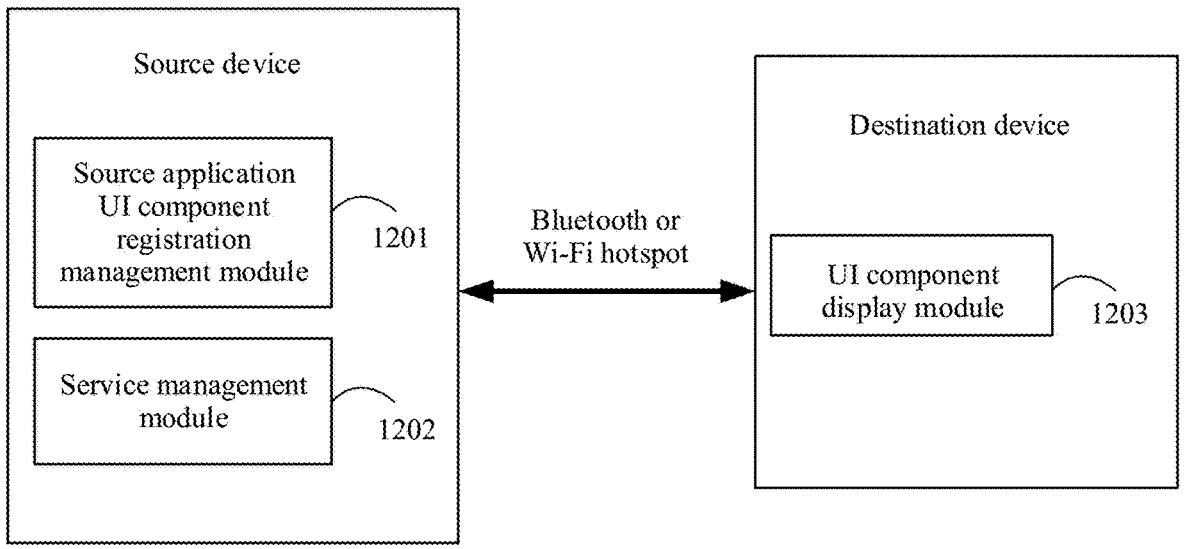
FIG. 12(a) to FIG. 12(d) are schematic diagrams of an example of networking manners according to an embodiment of this application.

As an example instead of a limitation, as shown in FIG. 12(a), a UI component registration management module 1201 is located in a source application of a source device, and a service management module 1202 may also be located in the source device. The source device connects to a destination device through Bluetooth, or connects to the destination device through a Wi-Fi hotspot. For example, the source device accesses a Wi-Fi hotspot of the destination device, or the destination device accesses a Wi-Fi hotspot of the source device. Therefore, connection between a UI component display module 1203, the service management module 1202, and the UI component registration management module 1201 is established. This is not limited in this application.

Manner 2

Figure 12B:
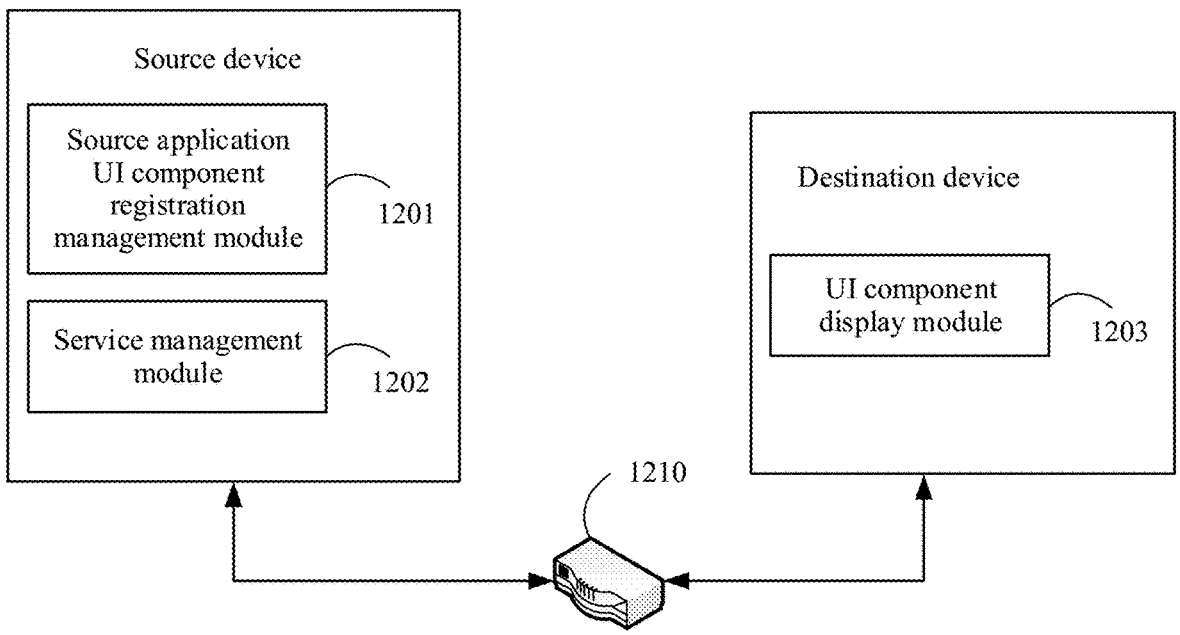

As an example instead of a limitation, as shown in FIG. 12(b), a UI component registration management module 1201 is located in a source application of a source device, and a service management module 1202 may also be located in the source device. The source device and a destination device are connected to a same wireless route node (access point, AP), for example, a route node 1210 shown in FIG. 12(b). Therefore, connection between a UI component display module 1203, the service management module 1202, and the UI component registration management module 1201 is established.

Manner 3

Figure 12C:
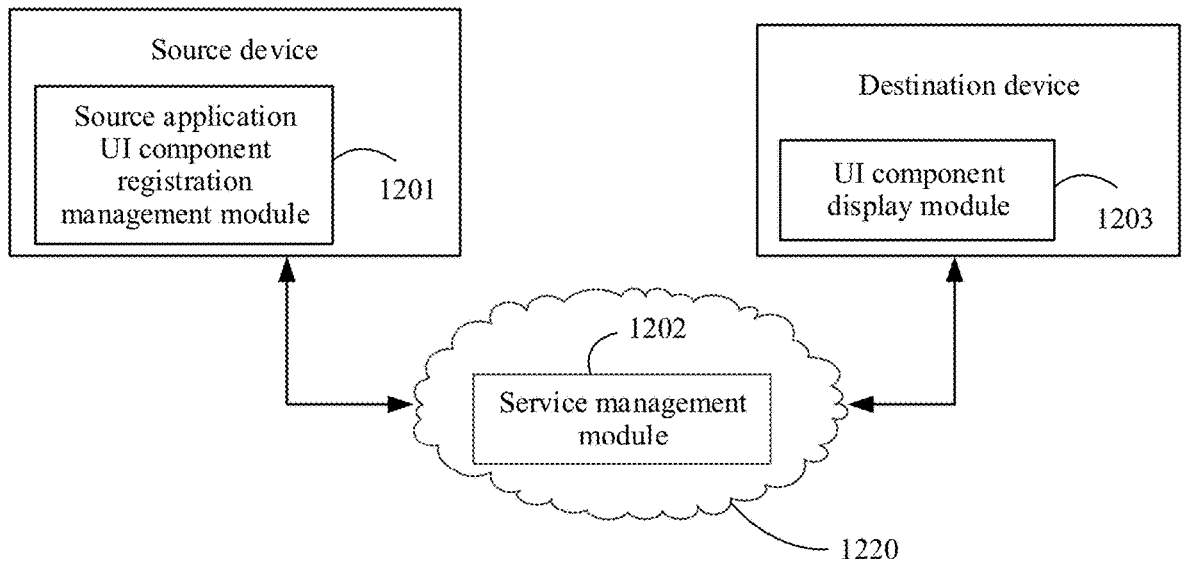

As an example instead of a limitation, as shown in FIG. 12(c), a UI component registration management module 1201 is located in a source application of a source device, and a service management module 1202 may also be located in a cloud server 1220. The source device and a destination device are connected to the same cloud server, for example, the cloud server 1220 shown in the FIG. 12(b). Therefore, connection between a UI component display module 1203, the service management module 1202, and the UI component registration management module 1201 is established.

Figure 12D:
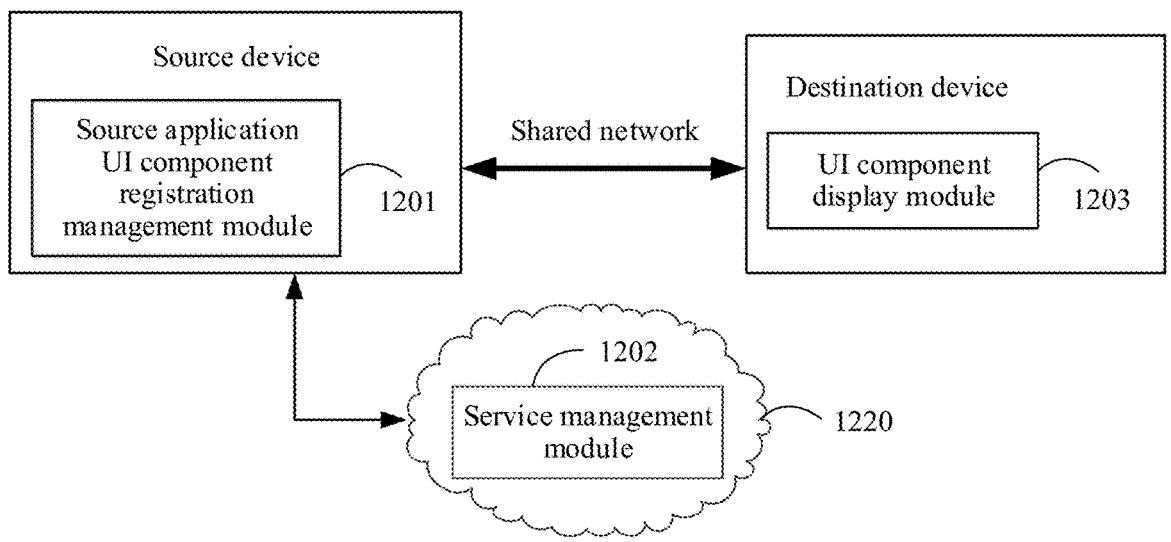

Alternatively, as shown in FIG. 12(d), a UI component registration management module 1201 is located in a source application of a source device, and a service management module 1202 is located in a cloud server 1220. The source device is connected to the same cloud server, and the source device connects to a destination device through a shared network. Therefore, connection between a UI component display module 1203, the service management module 1202, and the UI component registration management module 1201 is established. A network sharing manner may include a manner in which the source device and the destination device are connected to one AP, or the source device and the destination device are connected through the Wi-Fi hotspot. This is not limited in this application.

In the foregoing several manners, the source device connects to the destination device. This ensures connection between the UI component display module 1203, the service management module 1202, and the UI component registration management module 1201, and can implement a method for displaying a UI component provided in this application.

The foregoing steps 1001 to 1006 describe the display process of the UI component from the source device to the destination device. When the UI component is registered, the foregoing describes the set of software development kit SDK provided in this application, so that each UI component can be conveniently registered and managed during development of the source application. In addition, the SDK registers the broadcast receiver in the application. The broadcast receiver is configured to: listen to various broadcast commands sent by the service management module, and invoke internal logic of the module to complete transmission of update of the UI component, to finally perform the remote operation.

For example, a UI component of a Music application is used as an example, an application developer may set configuration information of the UI component by using the software development kit SDK. First, the UI component registration management module may receive the registration request for the UI component of the application on the source device, register the UI component on a running interface of the music application, and generate the configuration information. For example, the configuration information may include position information of an area in which all function controls included in the UI component are located, and the position information may include coordinate information of a start point in an upper left corner of the area, a width and a height of the area, and the like.

Second, it is determined whether the UI component can be displayed on the output interface of the destination device, and information used to identify whether the UI component supports displaying on the destination device is configured in the configuration information of the UI component. The configuration information may include display information and operation information of the UI component. The display information is used to indicate how the display interface of the destination device displays, and the operation information is used to indicate a corresponding operation instruction when the function control is triggered.

The application developer can register the configuration information of the UI component by using the software development kit SDK, so that when using the Music application, the user can directly select the UI component and display the UI component on the destination device. This facilitates a user operation.

In a possible implementation, the UI component that needs to be displayed on the destination device may be further determined through user gesture selection. FIG. 3(m) is a schematic diagram of an example of user gesture selection according to an embodiment of this application. As shown in FIG. 3(m), on a play interface of a Music application of a mobile phone, a user may select, on the destination interface, according to a size of a display interface of a destination device and a requirement of the user for using a function control on the interface, a function control that needs to be displayed on the destination device, to form the UI component. For example, that the user selects an area shown in a dashed box on the music play interface may be understood as that the user selects a Previous Song selection control, a Playing control, and a Next Song selection control. An operation of selecting the area shown in the dashed box may be a sliding operation of the user along two position coordinates of a diagonal line of the area shown in the dashed box, for example, a sliding operation from a start coordinate position 1 in an upper left corner of the dashed box shown in the figure to a coordinate position 2 in a lower right corner of the area, or a sliding operation from a start coordinate position 2 in a lower right corner of the dashed box to a coordinate position 1 in an upper left corner of the area. This is not limited in this application.

Then, the UI component registration management module 1201 registers the selected function controls to form the UI component, and determines the configuration information of the UI component, for example, information such as a name, a function, a minimum display size, a maximum display size, a function, a type of the UI component, and an included function control.

Optionally, the foregoing process may be displayed at a source device end after being determined by the UI component registration management module 1201. The user may perform modification or setting. For example, the user may set, according to the size of the destination device, the display size of the interface displayed by the UI component on the destination device.

In a user gesture selection process, when a selected area includes a part of a display area of a function control, an electronic device may include the function control in the generated UI component, or may exclude the function control from the generated UI component. Alternatively, it is determined, based on a proportion of an area of a selected part of the function control in a total area of the function control, whether the function control is included in the UI component. This is not limited in this application.

According to the foregoing solution, in a registration process of the UI component, the user may participate in the process of selecting the application control included in the UI component. The user may determine, according to a use frequency of the user, whether the UI component needs to include a function control, or the user may set, before the UI component is displayed on the destination device, the display size of the UI component. This is easy to use, and makes the display interface more user-friendly, and improves user experience.

In a possible implementation, in addition to determining the registered UI component from a perspective of the source application developer and in a manner of selecting the function control of the application by the user, the user may further set the registered UI component at the destination device end. The type and the size of the displayed UI component is defined at the destination device end.

For example, when the destination device is a smartwatch, display information of a common UI component of an application may be set at a smartwatch end. For a Music application, the user most commonly uses a Previous Song selection control, a Playing control, and a Next Song selection control. For a UI component formed by the three function controls, a display interface size of the component and a function control arrangement sequence are set at the smartwatch end in advance, for example, the foregoing enumerated clockwise arrangement sequence or counter-clockwise arrangement sequence. When the Music application on a mobile phone is displayed on the smartwatch, the UI component may be displayed by default.

It should be understood that a plurality of UI components may be disposed at the destination device end, and are not limited to the foregoing examples. The user may select, from the plurality of UI components at the destination device end, a UI component that currently needs to be displayed. This is not limited in this application.

The foregoing describes a possible implementation process of a method for displaying a UI component of the source device on the destination device provided in this application. A part of the original application interface of the source device may be split into different function controls or a combination of a plurality of function controls. The different function controls or the combination of the plurality of function controls are or is used to generate a new operation interface. The operation interface may be displayed on the another destination device. An operation is performed on any function control included in the operation interface of the destination device, and an operation result is transmitted to the source device for execution, to ensure operation consistency between the source device and the destination device. In the method, a user interface and a service can be freely transmitted between the plurality of terminal devices; a bottleneck between different devices is broken; and the original application interface is partially split, and transmitted between the plurality of terminal devices. The split interface can more easily adapt to a plurality of screen sizes of the terminals and achieve more perfect display. The new operation interface displayed at the destination device end may include function controls of a same application or function controls of different applications. This breaks a boundary between different applications, so that the user can view the functions of the plurality of applications on one interface, and perform the operations on the plurality of applications at the same time. Therefore, all operations are transmitted to an original application service of the source device. The user may control the application service on both the source device and the destination device at the same time. This facilitates use and improves user experience.

With reference to the foregoing embodiments and related accompanying drawings, an embodiment of this application provides a method for displaying a UI component of a source device on a destination device. The method may be implemented by the electronic device (for example, a mobile phone or a tablet computer) having the touchscreen and the camera in FIG. 1 and FIG. 2. FIG. 13 is a schematic flowchart of the method for displaying a UI component according to the embodiment of this application. The method may be performed by a source device or a chip configured in a source device. As shown in FIG. 13, the method may include the following steps.

1301: The source device determines a first UI component, where the first UI component includes at least one function control of a first application of the source device.

In a possible implementation, the source device displays a first interface, and detects a first operation of a user on the first interface. In response to the first operation, the source device determines the first UI component.

Optionally, the first interface includes at least one function control of the first application, and the first operation is an operation that the user selects the first UI component to be displayed on the first interface.

For example, the first operation is the operation shown in FIG. 3(k). The user selects one area on the music application interface, and determines the function controls in the area, to form the first UI component.

Alternatively, the first interface includes a UI component list of the first application, each UI component in the UI component list includes at least one function control of the first application, and the first operation is an operation that the user selects the first UI component in the UI component list.

For example, the first operation is the operations shown in FIG. 4(g) to FIG. 4(i) and FIG. 4(k). The user selects one component type on the projection component list interface, and determines all the function controls included in the component type, to form the first UI component.

1302: The source device obtains configuration information of the first UI component, where the configuration information of the first UI component is used to indicate a manner of displaying the first UI component on the destination device.

1303: The source device sends the configuration information of the first UI component to the destination device, so that the destination device displays the first UI component based on the configuration information of the first UI component.

Optionally, the configuration information of the first UI component includes first information. The first information is used to indicate display information of each of the at least one function control on the destination device, and the first information includes information about position coordinates, a display width, and a display height of each of the at least one function control on the destination device. The source device may send the first information to the destination device.

For example, as shown in FIG. 4(m) and FIG. 4(n), the first information may include information such as the start coordinates, the length, and the height of the first UI component on the display interface of the smartwatch. The user may modify the enumerated information, to modify the manner of displaying the first UI component on the smartwatch.

Optionally, the configuration information of the first UI component further includes second information. The second information is used to indicate information about an identifier ID of each of the at least one function control.

It should be understood that the source device may know the ID information of each function control of the first application. After determining the first UI component, the source device sends the ID information of each function control included in the first UI component to the destination device. When the user operates any function control in the first UI component on the destination device, the destination device may send both ID information of the function control and an operation event to the source device, so that the source device determines the first function control of the first application based on the ID information of the function control and information about the operation event, and execute a function corresponding to the first function control.

For example, as shown in FIG. 7(a), the user taps the Music Playing control at the smartwatch side to enter the playing stop state. The music is stopped at the mobile phone side, and the control is displayed in the playing stop state.

Alternatively, as shown in FIG. 7(b), when the user taps the Music Playing control at the mobile phone side, the control at the smartwatch side also displays the playing state.

Optionally, the configuration information of the first UI component further includes third information. The third information is used to indicate information about a name and a function of each of the at least one function control.

For example, various information enumerated in the foregoing descriptions of the related configuration file and the related sequence is not described herein again.

Optionally, the configuration information of the first UI component further includes fourth information. The fourth information is information used to identify whether each function control in the first UI component supports displaying on the destination device. The source device determines, based on the fourth information, that each function control in the first UI component supports displaying on the destination device.

Correspondingly, FIG. 14 is a schematic flowchart of another example of a method for displaying a UI component according to an embodiment of this application. As shown in FIG. 14, the method may be performed by a destination device or a chip configured in a destination device. Specifically, the following steps are included.

1401: The destination device receives configuration information of a first UI component sent by a source device, where the configuration information of the first UI component is used to indicate a manner of displaying the first UI component on the destination device, and the first UI component includes at least one function control of a first application of the source device.

1402: The destination device displays the first UI component based on the configuration information of the first UI component.

It may be understood that, to implement the foregoing functions, the source device and the destination device include corresponding hardware and/or software modules for implementing the functions. With reference to algorithm steps of each example described in embodiments disclosed in this specification, this application may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of embodiments of this application.

In the embodiments, division into function modules may be performed on the source device and the destination device based on the foregoing method examples. For example, each function module may be obtained through division corresponding to each function, or two or more functions may be integrated into one processing module. The integrated module may be implemented in a form of hardware. It should be noted that, in the embodiments, division into modules is an example, and is merely a logical function division. In actual implementation, another division manner may be used.

Figure 15:
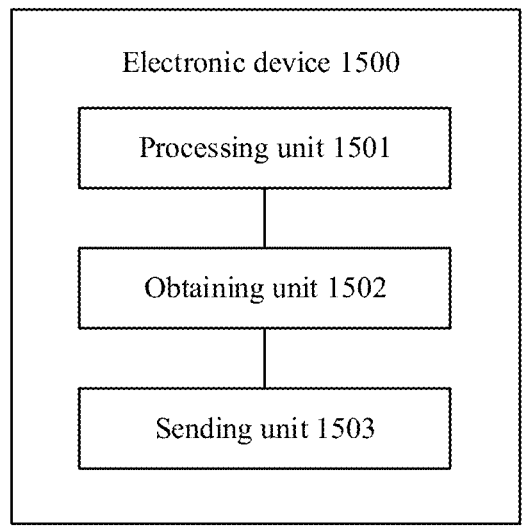
FIG. 15 is a schematic composition diagram of an example of an electronic device according to an embodiment of this application.

When each function module is obtained through division based on each corresponding function, FIG. 15 is a possible schematic composition diagram of an electronic device 1500 in the foregoing embodiment. As shown in FIG. 15, the electronic device 1500 may include a processing unit 1501, an obtaining unit 1502, and a sending unit 1503 when the electronic device 1500 is a source device.

The processing unit 1501 may be configured to support the electronic device 1500 to perform step 1301 and/or another process of technology described in this specification.

The obtaining unit 1502 may be configured to support the electronic device 1500 to perform step 1302 and/or another process of technology described in this specification.

The sending unit 1503 may be configured to support the electronic device 1500 to perform step 1303 and/or another process of technology described in this specification.

Figure 16:
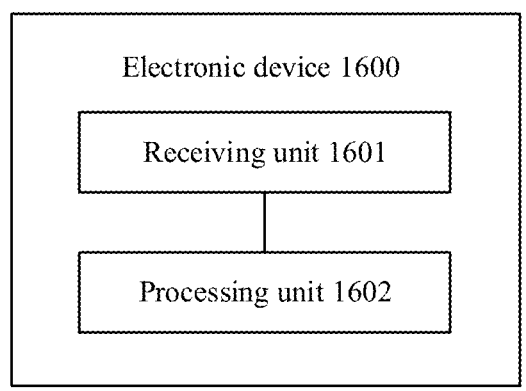
FIG. 16 is a schematic composition diagram of another example of an electronic device according to an embodiment of this application.

FIG. 16 is a possible schematic composition diagram of an electronic device 1600 in the foregoing embodiment. As shown in FIG. 16, the electronic device 1600 may include a receiving unit 1601 and a processing unit 1602 when the electronic device 1600 is a destination device.

The receiving unit 1601 may be configured to support the electronic device 1600 to perform step 1401 and/or another process of technology described in this specification.

The processing unit 1602 may be configured to support the electronic device 1600 to perform step 1402 and/or another process of technology described in this specification.

It should be noted that all related content of the steps in the foregoing method embodiments may be cited in function descriptions of corresponding function modules. Details are not described herein again.

The electronic device provided in the embodiments is configured to perform a method for displaying a UI component. Effects that are the same as those of the foregoing implementation method can be achieved.

When an integrated unit is used, the electronic device may include a processing module, a storage module, and a communications module. The processing module may be configured to control and manage actions of the electronic device, for example, may be configured to support the electronic device to perform the steps performed by the source device and the destination device. The storage module may be configured to support the electronic device to store program code, data, and the like. The communications module may be configured to support communication between the electronic device and another device.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of digital signal processing (DSP) and a microprocessor. The storage module may be a memory. The communications module may be specifically a device, for example, a radio frequency circuit, a Bluetooth chip, or a Wi-Fi chip, that interacts with another electronic device.

In an embodiment, when the processing module is a processor and the storage module is a memory, the electronic device in this embodiment may be a device having the structure shown in FIG. 1.

An embodiment further provides a computer storage medium. The computer storage medium stores computer instructions. When the computer instructions are run on an electronic device, the electronic device is enabled to perform the related method steps, to implement a method for displaying a UI component in the foregoing embodiments.

An embodiment further provides a computer program product. When the computer program product runs on a computer, the computer is enabled to perform the related steps, to implement a method for displaying a UI component in the foregoing embodiments.

In addition, an embodiment of this application further provides an apparatus. The apparatus may be specifically a chip, a component, or a module. The apparatus may include a processor and a memory that are connected. The memory is configured to store computer-executable instructions, and when the apparatus runs, the processor may execute the computer-executable instructions stored in the memory, so that the chip performs a method for displaying a UI component in the foregoing method embodiments.

The electronic device, the computer storage medium, the computer program product, or the chip provided in the embodiments is configured to perform a corresponding method provided above. Therefore, for beneficial effects that can be achieved, refer to the beneficial effects in a corresponding method provided above. Details are not described herein again.

The foregoing descriptions about implementations allow a person skilled in the art to understand that, for the purpose of convenient and brief description, division into the foregoing function modules is taken as an example for illustration. In actual application, the foregoing functions can be allocated to different function modules and implemented according to a requirement, that is, an inner structure of an apparatus is divided into different function modules to implement all or some of the functions described above.

In the several embodiments provided in this application, it should be understood that embodiments of the disclosed apparatus and method may be implemented in other manners. For example, the described apparatus embodiments are merely examples. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve objectives of solutions of embodiments.

In addition, functional units in embodiments of this application may be integrated into one processing unit, or each of the units may exist alone physically, or two or more units are integrated into one unit. The integrated unit may be implemented in the form of hardware, or may be implemented in the form of a software functional unit.

When the integrated unit is implemented in the form of a software functional unit and sold or used as an independent product, the integrated unit may be stored in a readable storage medium. Based on such an understanding, technical solutions of embodiments of this application may be implemented in the form of a software product. The software product is stored in a storage medium and includes several instructions for instructing a device (which may be a single-chip microcomputer, a chip or the like) or a processor to perform all or some of the steps of methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely exemplary implementations of this application, but are not intended to limit the protection scope of this application. Any variation or replacement readily figured out by a person skilled in the art within the technical scope disclosed in this application may fall within the protection scope of this application. The protection scope of this application is subject to the protection scope of the claims.

What is claimed is:

1. A method for displaying a user interface (UI) component of a mobile device on a destination device, wherein the method comprises:
    displaying, by the mobile device, a first interface of a first application executed by the mobile device on a display of the mobile device, wherein the displayed first interface includes one or more function controls of the first application;
    detecting, by the mobile device, a user selection of a first UI component corresponding to the first application, wherein the first UI component comprises the one or more function controls of the first application;
    obtaining, by the mobile device, configuration information of the first UI component, wherein the configuration information of the first UI component indicates a manner for displaying the first UI component on the destination device, and wherein the configuration information of the first UI component includes information about position coordinates, a display width, and a display height of each of the one or more function controls on the destination device; and
    sending, by the mobile device, the configuration information of the first UI component to the destination device to facilitate display of the first UI component corresponding to the first application on the destination device based on the configuration information of the first UI component.

2. The method according to claim 1, wherein the first interface comprises a UI component list of the first application, wherein each UI component in the UI component list comprises at least one respective function control of the first application.

3. The method according to claim 1, wherein the configuration information of the first UI component further comprises identifier information of each of the one or more function controls.

4. The method according to claim 3, wherein the method further comprises:
    receiving, by the mobile device, operation information of a second operation from the destination device, wherein the second operation triggers a first function control in the first UI component displayed on the destination device, and the operation information of the second operation comprises identifier information of the first function control;
    determining, by the mobile device, the first function control based on the identifier information of the first function control; and
    executing, by the mobile device, a function corresponding to the first function control.

5. The method according to claim 4, wherein the second operation triggers the first function control in the first UI component to be displayed on the destination device in a first state, and wherein the function corresponding to the first function control corresponds to a function corresponding to the first state of the first function control, wherein the first function control is displayed in the first state.

6. The method according to claim 1, wherein the configuration information of the first UI component further indicates information about a name and a function of each of the one or more function controls.

7. The method according to claim 1, wherein the configuration information of the first UI component further identifies whether each function control in the first UI component is displayable on the destination device; and
    wherein the method further comprises: determining, by the mobile device, that each function control in the first UI component is displayable on the destination device.

8. A mobile device, comprising:
    one or more processors; and
    one or more memories having processor-executable instructions stored thereon for displaying a user interface (UI) component of a mobile device on a destination device;
    wherein the one or more processors are configured to execute the processor-executable instructions to facilitate the following be performed by the mobile device:
    displaying a first interface of a first application executed by the mobile device on a display of the mobile device, wherein the displayed first interface includes one or more function controls of the first application;
    detecting a user selection of a first UI component corresponding to the first application, wherein the first UI component comprises the one or more function controls of the first application;
    obtaining configuration information of the first UI component, wherein the configuration information of the first UI component indicates a manner for displaying the first UI component on the destination device, and wherein the configuration information of the first UI component includes information about position coordinates, a display width, and a display height of each of the one or more function controls on the destination device; and
    sending the configuration information of the first UI component to the destination device to facilitate display of the first UI component corresponding to the first application on the destination device based on the configuration information of the first UI component.

9. The mobile device according to claim 8, wherein the first interface comprises a UI component list of the first application, wherein each UI component in the UI component list comprises at least one respective function control of the first application.

10. The mobile device according to claim 8, wherein the configuration information of the first UI component further comprises identifier information of each of the one or more function controls.

11. The mobile device according to claim 10, wherein the one or more processors are further configured to execute the processor-executable instructions to facilitate the following be performed by the mobile device:
receiving operation information of a second operation from the destination device, wherein the second operation triggers a first function control in the first UI component displayed on the destination device, and the operation information of the second operation comprises identifier information of the first function control;
determining the first function control based on the identifier information of the first function control; and
executing a function corresponding to the first function control.

12. The mobile device according to claim 11, wherein the second operation triggers the first function control in the first UI component to be displayed on the destination device in a first state, and wherein the function corresponding to the first function control corresponds to a function corresponding to the first state of the first function control, wherein the first function control is displayed in the first state.

13. The mobile device according to claim 8, wherein the configuration information of the first UI component further indicates information about a name and a function of each of the one or more function controls.

14. The mobile device according to claim 8, wherein the configuration information of the first UI component further identifies whether each function control in the first UI component is displayable on the destination device; and
wherein the one or more processors are further configured to execute the processor-executable instructions to facilitate the following be performed by the mobile device: determining, by the mobile device, that each function control in the first UI component is displayable on the destination device.

15. One or more non-transitory computer-readable mediums having processor-executable instructions stored thereon for displaying a user interface (UI) component of a mobile device on a destination device, wherein the processor-executable instructions, when executed, facilitate:
displaying, by the mobile device, a first interface of a first application executed by the mobile device on a display of the mobile device, wherein the displayed first interface includes one or more function controls of the first application;
detecting, by the mobile device, a user selection of a first UI component corresponding to the first application, wherein the first UI component comprises the one or more function controls of the first application;
obtaining, by the mobile device, configuration information of the first UI component, wherein the configuration information of the first UI component indicates a manner for displaying the first UI component on the destination device, and wherein the configuration information of the first UI component includes information about position coordinates, a display width, and a display height of each of the one or more function controls on the destination device; and
sending, by the mobile device, the configuration information of the first UI component to the destination device to facilitate display of the first UI component corresponding to the first application on the destination device based on the configuration information of the first UI component.

16. The one or more non-transitory computer-readable mediums according to claim 15, wherein the first interface comprises a UI component list of the first application, wherein each UI component in the UI component list comprises at least one respective function control of the first application.

17. The one or more non-transitory computer-readable mediums according to claim 15, wherein the configuration information of the first UI component further comprises identifier information of each of the one or more function controls.

18. The one or more non-transitory computer-readable mediums according to claim 17, wherein the processor-executable instructions, when executed, further facilitate:
receiving, by the mobile device, operation information of a second operation from the destination device, wherein the second operation triggers a first function control in the first UI component displayed on the destination device, and the operation information of the second operation comprises identifier information of the first function control;
determining, by the mobile device, the first function control based on the identifier information of the first function control; and
executing, by the mobile device, a function corresponding to the first function control.

19. The one or more non-transitory computer-readable mediums according to claim 18, wherein the second operation triggers the first function control in the first UI component to be displayed on the destination device in a first state, and wherein the function corresponding to the first function control corresponds to a function corresponding to the first state of the first function control, wherein the first function control is displayed in the first state.

20. The one or more non-transitory computer-readable mediums according to claim 15, wherein the configuration information of the first UI component further indicates information about a name and a function of each of the one or more function controls.

* * * * *